US009987714B2

(12) United States Patent
Henderson et al.

(10) Patent No.: US 9,987,714 B2
(45) Date of Patent: *Jun. 5, 2018

(54) AUTOMATED INSTALLATION OF FRANGIBLE ELEMENTS

(71) Applicant: The Boeing Company, Chicago, IL (US)

(72) Inventors: Raymond Neil Henderson, Renton, WA (US); Edward John Batt, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/692,325

(22) Filed: Apr. 21, 2015

(65) Prior Publication Data

US 2015/0224612 A1    Aug. 13, 2015

Related U.S. Application Data

(63) Continuation-in-part of application No. 14/036,495, filed on Sep. 25, 2013.

(51) Int. Cl.
*B23P 19/06* (2006.01)
*B21J 15/02* (2006.01)
(Continued)

(52) U.S. Cl.
CPC .............. *B23P 19/06* (2013.01); *B21J 15/022* (2013.01); *B21J 15/142* (2013.01); *B21J 15/32* (2013.01);
(Continued)

(58) Field of Classification Search
CPC ................ B23P 19/005; B23P 2700/01; Y10T 29/53096; Y10T 29/53091; Y10T 29/53991; Y10T 29/53996; Y10T 29/49908; Y10T 29/53078; Y10T 29/53774; Y10T 29/49622;
(Continued)

(56) References Cited

U.S. PATENT DOCUMENTS 4,454,650 A   6/1984  Silver
4,593,583 A   6/1986  Singleton
(Continued)

FOREIGN PATENT DOCUMENTS

EP    2628565 A1    8/2013

OTHER PUBLICATIONS

Batt, "Automated Installation of Frangible Elements," U.S. Appl. No. 14/036,495, filed Sep. 25, 2013, 66 pages.
(Continued)

*Primary Examiner* — David Bryant
*Assistant Examiner* — Lee A Holly
(74) *Attorney, Agent, or Firm* — Yee & Associates, P.C.

(57) ABSTRACT

A method and apparatus for installing a frangible collar onto a fastener installed in a hole using an end effector in which rotation of the fastener is not restricted by the hole. Rotation of the fastener may be restricted using the end effector. A frangible collar may be installed onto the fastener by an element installer of the end effector while the while restricting rotation of the fastener. A frangible portion of the frangible collar may be sheared off by torqueing the frangible portion using the end effector.

37 Claims, 39 Drawing Sheets

(51) Int. Cl.
  *B21J 15/14* (2006.01)
  *B21J 15/32* (2006.01)
  *F16B 31/02* (2006.01)

(52) U.S. Cl.
  CPC ......... *B23P 2700/01* (2013.01); *F16B 31/021* (2013.01); *Y10T 29/49885* (2015.01); *Y10T 29/49954* (2015.01)

(58) Field of Classification Search
  CPC ......... Y10T 29/49948; Y10T 29/49885; Y10T 29/49954; Y10Y 29/49956; B21J 15/32; B21J 15/022; B21J 15/142; B21D 39/00; F16B 31/021
  See application file for complete search history.

(56) References Cited

U.S. PATENT DOCUMENTS

| | | | |
|---|---|---|---|
| 4,955,119 A | 9/1990 | Bonomi et al. | |
| 5,265,317 A | 11/1993 | Angel | |
| 7,537,255 B2 | 5/2009 | Key et al. | |
| 8,430,001 B2 | 4/2013 | Ortiz | |
| 8,651,046 B1* | 2/2014 | Davancens | B05C 5/0212 118/300 |
| 2002/0050043 A1 | 5/2002 | Sarh et al. | |
| 2008/0155807 A1 | 7/2008 | Toh et al. | |
| 2009/0260413 A1 | 10/2009 | Tomchick | |
| 2011/0197410 A1 | 8/2011 | Estep et al. | |
| 2012/0186405 A1 | 7/2012 | Ortiz | |
| 2013/0212883 A1* | 8/2013 | Soto Martinez | B23P 19/005 29/897.2 |
| 2014/0026719 A1* | 1/2014 | Stanfield | B25B 23/0085 81/13 |

OTHER PUBLICATIONS

International Search Report and Written Opinion, dated Nov. 20, 2014, regarding Application No. PCT/US2014/050888, 12 pages.

Final Office Action, dated Aug. 10, 2016, regarding U.S. Appl. No. 14/036,495, 18 pages.

Office Action, dated Jun. 1, 2017, regarding U.S. Appl. No. 14/036,495, 22 pages.

Office Action, dated Jan. 11, 2016, regarding U.S. Appl. No. 14/036,495, 31 pages.

\* cited by examiner

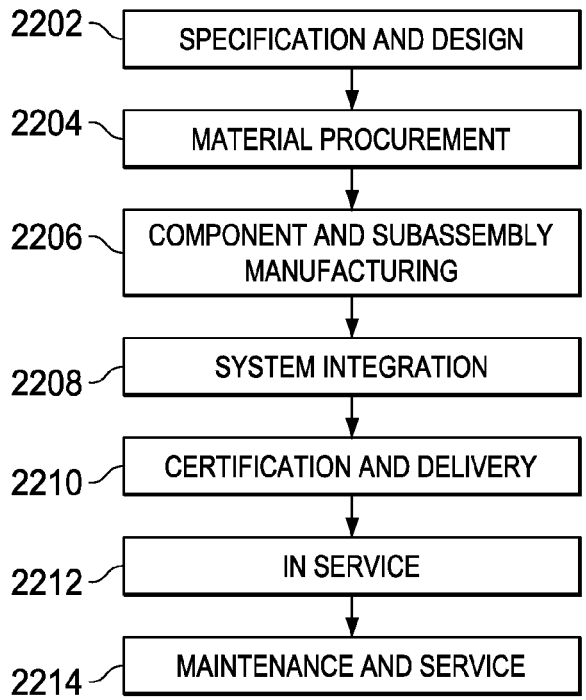
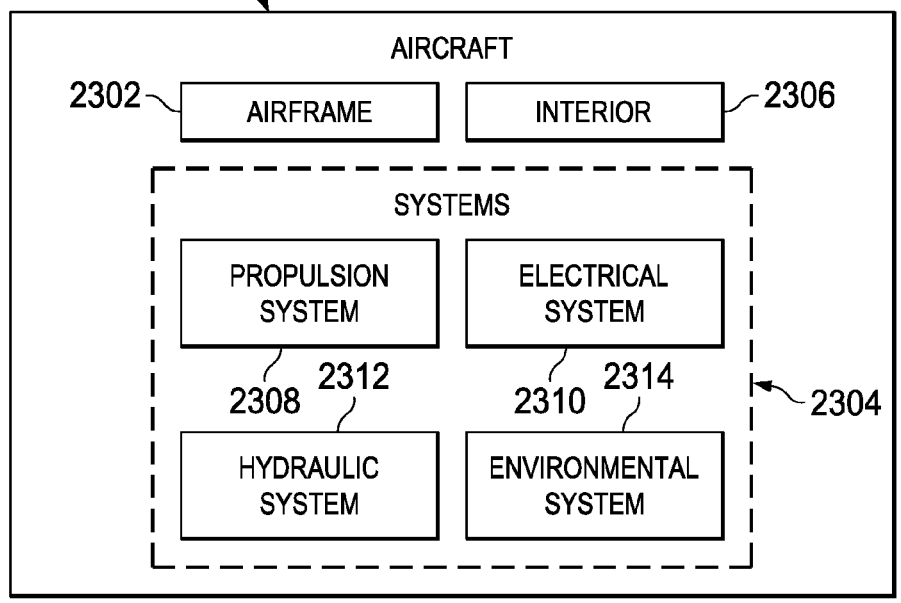

AUTOMATED INSTALLATION OF FRANGIBLE ELEMENTS

CROSS-REFERENCE TO RELATED APPLICATION

This application is a Continuation-in-Part application of U.S. patent application Ser. No. 14/036,495, filed Sep. 25, 2013, and entitled "Automated Installation of Frangible Elements," which is incorporated herein by reference.

BACKGROUND INFORMATION

1. Field

The present disclosure relates generally to the installation of fastener elements and, in particular, to automating the installation of fastener elements. Still more particularly, the present disclosure relates to a method and apparatus for automating the installation of frangible elements, such as frangible collars.

2. Background

During manufacturing, different types of fastener elements may be installed in various types of objects. For example, without limitation, fastener elements, such as bolts, may be used to join a stackup of two or more parts together. Other fastener elements, such as collars, may then be used to secure and hold the parts together. In some cases, these collars may be referred to as nuts.

In some industries, such as the aerospace industry, fastener elements in the form of frangible collars may be used. As used herein, a "frangible collar" may be a collar having one portion of the collar that is designed to break off from another portion of the collar at a selected torque. The portion that is designed to break off may be referred to as the nut of the frangible collar, while the portion that remains may be referred to as the collar.

As one example, when a frangible collar is being threaded onto a threaded bolt, the nut portion of the frangible collar may break off once a selected torque has been reached to leave the collar portion of the frangible collar threaded onto the threaded bolt. The use of frangible collars may allow a collar and bolt to be assembled without having to control the torque applied by a torque wrench to ensure that the applied torque is within specified tolerances.

With some currently available methods for installing frangible collars, the nuts that break off from the collars may become foreign object debris (FOD). This foreign object debris may cause undesired effects within a manufacturing environment. For example, without limitation, when the nut portion of a frangible collar breaks off from the collar portion of the frangible collar, the nut portion may break off in an uncontrolled manner and/or in an undesired direction. In particular, the nut portion may break off and impact a piece of equipment or machinery within the manufacturing environment in an undesired manner.

Further, some currently available methods for installing frangible collars require that the installation be performed manually. For example, without limitation, these methods may require that a human operator or human-operated machinery thread a frangible collar onto a bolt. However, performing this type of installation manually may be more time-consuming and labor-intensive than desired.

In certain industries, manufacturing is moving towards automated manufacturing. It may be desirable to have a system for automating the installation of frangible collars such that the integration of robotic automation and the manual installation of frangible collars may not be needed in future manufacturing environments. Therefore, it may be desirable to have a method and apparatus that take into account at least some of the issues discussed above, as well as other possible issues.

SUMMARY

An illustrative embodiment of the present disclosure may provide a method for installing a frangible collar onto a fastener installed in a hole using an end effector in which rotation of the fastener is not restricted by the hole. Rotation of the fastener may be restricted using the end effector. A frangible collar may be installed onto the fastener by an element installer of the end effector while the while restricting rotation of the fastener. A frangible portion of the frangible collar may be sheared off by torqueing the frangible portion using the end effector.

Another illustrative embodiment of the present disclosure may provide a method for installing a frangible collar over a fastener associated with an object. The frangible collar may be loaded, by a loading device of an end effector, into an element installer of the end effector. The frangible collar may be installed, by the element installer, onto the fastener associated with the object. The fastener may be installed in a clearance fit hole in the object.

A further illustrative embodiment of the present disclosure may provide an apparatus. The apparatus may comprise an element loader and an element installer. The element loader may be configured to hold a number of elements. The element loader may be a part of the end effector. The element installer may receive an element in the number of elements from the element loader and install the element onto a member associated with an object. The element loader may be part of the end effector.

A yet further illustrative embodiment of the present disclosure may provide an end effector. The end effector may comprise an element loader and an element installer. The element loader may comprise a loading device rotatable relative to an element delivery system and the element installer. The element installer comprises a rotatable member axially movable relative to a fastener and rotatable about an axis of the fastener. The rotatable member encompasses an element to install on the fastener.

A yet further illustrative embodiment of the present disclosure may provide an end effector. The end effector may comprise a rotatable member, a hex key, and an actuation system. The rotatable member may have a cavity. The hex key may extend through at least a portion of the cavity. The actuation system may be associated with the hex key.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 22 is an illustration of an aircraft manufacturing and service method in the form of a block diagram in accordance with an illustrative embodiment;

FIG. 23 is an illustration of an aircraft in the form of a block diagram in which an illustrative embodiment may be implemented;

DETAILED DESCRIPTION

The illustrative embodiments recognize and take into account different considerations. For example, the illustrative embodiments recognize and take into account that it may be desirable to have a system for automating the installation of frangible collars. Further, the illustrative embodiments recognize and take into account that it may be desirable to have a system for automating the capture and discarding of the nut portions of frangible collars that break away from the collar portions of the frangible collars.

The illustrative embodiments recognize and take into account that it may be desirable to have a system for automating the installation of frangible collars on fasteners in clearance fit holes. Clearance fit holes may be holes in which a shaft may rotate or slide freely within the hole. A clearance fit may also be referred to as a "sliding fit." The illustrative embodiments recognize and take into account that it may be desirable to have clearance fit holes rather than interference fit holes. An interference hole may be a hole in which the external dimension of the shaft to be inserted into the hole slightly exceeds the internal dimension of the hole. For example, a clearance fit hole in a thin sheet of metal may prevent the metal from deforming. An interference fit hole in a thin sheet of metal may distort the sheet metal due to the strain induced into the sheet metal by inserting a fastener, which is larger than the hole it is inserted into.

The illustrative embodiments further recognize and take into account that it may be desirable to have a system for installing frangible collars on fasteners in large objects, such as a body of an aircraft. The illustrative embodiments recognize and take into account that conventional installation of frangible collars on fasteners in large objects may have an operator on one side of the object and an operator on another side of the object. For example, a first operator may be on the exterior of a body of an aircraft while a second operator may be within the body of the aircraft.

The illustrative embodiments also recognize and take into account that it may be desirable to have a system that installs a fastener into a clearance fit hole in an object prior to installing a frangible collar. The illustrative embodiments further recognize and take into account that it may be desirable to have a system to prepare the fastener prior to installing a frangible collar. For example, the illustrative embodiments recognize and take into account that it may be desirable to have a system to apply sealant prior to installing a frangible collar.

Figure 1:
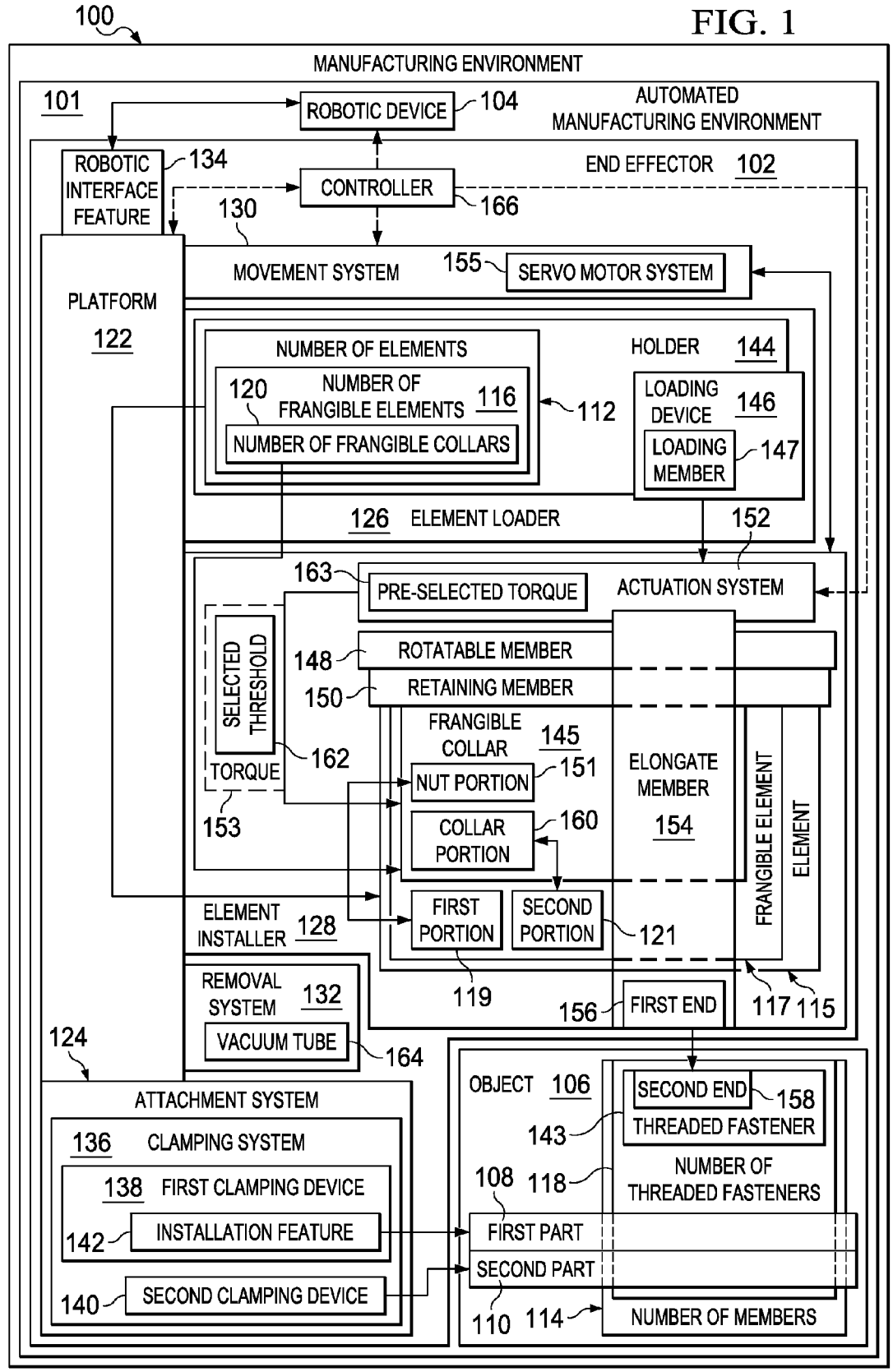
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. In this illustrative example, manufacturing environment 100 may be an environment in which different types of parts may be manufactured and/or assembled. Manufacturing environment 100 may take the form of automated manufacturing environment 101 in this example.

As depicted, end effector 102 may be used within automated manufacturing environment 101. End effector 102 may be configured to be moved and, in some cases, operated by, robotic device 104. Robotic device 104 may be implemented in a number of different ways. Depending on the implementation, robotic device 104 may take the form of a robotic arm, a robotic vehicle, or some other type of robotic device.

End effector 102 may be associated with robotic device 104. As used herein, when one component is "associated" with another component, the association is a physical association in the depicted examples.

For example, without limitation, a first component, such as end effector 102, may be considered to be associated with a second component, such as robotic device 104, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

In this illustrative example, end effector 102 may be configured to install fastener elements on object 106. Object 106 may take a number of different forms. For example, without limitation, object 106 may be a single part, a sub-assembly, or an assembly of parts. In this illustrative example, object 106 may be a stackup of parts that includes, for example, without limitation, first part 108 and second part 110. End effector 102 may be configured to install number of elements 112 onto number of members 114 already installed in object 106.

As used herein, a "number of" items may be one or more items. In this manner, number of elements 112 may include one or more elements. Further, number of members 114 may include one or more members.

In one illustrative example, number of members 114 may be inserted through openings in both first part 108 and second part 110 to join these two parts together. Number of elements 112 may be installed onto number of members 114 to secure number of members 114 to first part 108 and second part 110 such that first part 108 and second part 110 may remain joined together.

Number of elements 112 may take the form of number of frangible elements 116 in this illustrative example. For example, frangible element 117 in number of frangible elements 116 may be an example of one implementation for element 115 in number of elements 112. As used herein, a "frangible element," such as frangible element 117, may have first portion 119 configured to break off from second portion 121 of frangible element 117 once a torque being applied to frangible element 117 has reached a selected threshold.

In one illustrative example, number of members 114 may be implemented as number of threaded fasteners 118. In particular, a member in number of members 114 may be implemented as a threaded fastener in number of threaded fasteners 118, such as threaded fastener 143. Threaded fastener 143 may take the form of a threaded bolt, a screw, or some other type of threaded fastener.

In this example, number of frangible elements 116 may be implemented as number of frangible collars 120 configured to be threaded onto number of threaded fasteners 118. Frangible collar 145 may be an example of a frangible collar in number of frangible collars 120. In particular, frangible collar 145 may be an example of one implementation for frangible element 117. As depicted, frangible collar 145 may have nut portion 151 configured to break away from collar portion 160 of frangible collar 145 in response to torque 153 that is being applied to frangible collar 145 reaching selected threshold 162. Nut portion 151 and collar portion 160 of frangible collar 145 may be examples of first portion 119 and second portion 121, respectively, of frangible element 117.

End effector 102 may be used to automate the process of installing number of frangible collars 120 on number of threaded fasteners 118. As depicted, end effector 102 may include platform 122, attachment system 124, element loader 126, element installer 128, movement system 130, and removal system 132. Attachment system 124, element loader 126, element installer 128, movement system 130, and/or removal system 132 may be associated with platform 122.

In this illustrative example, robotic interface feature 134 may be associated with platform 122. Robotic interface feature 134 may be an interface for use in attaching end effector 102 to robotic device 104. Robotic device 104 may be used to move end effector 102 relative to object 106. For example, without limitation, robotic device 104 may move platform 122 of end effector 102 to position end effector 102 relative to object 106.

Attachment system 124 may be used to attach end effector 102 to object 106 such that end effector 102 remains in a fixed position relative to object 106 during the installation of number of frangible collars 120. In one illustrative example, attachment system 124 may take the form of clamping system 136. Clamping system 136 may include first clamping device 138 and second clamping device 140. First clamping device 138 may engage first part 108 of object 106, while second clamping device 140 may engage second part 110 of object 106. In this manner, first clamping device 138 and second clamping device 140 may together clamp to object 106.

In some cases, first clamping device 138 may include installation feature 142. Installation feature 142 may be used to install a threaded fastener, such as threaded fastener 143, in object 106, while first clamping device 138 and second clamping device 140 are clamped to the stackup of first part 108 and second part 110. Installation feature 142 may take the form of, for example, without limitation, a hollow portion, or channel, through which threaded fastener 143 may be inserted and then installed through first part 108 and second part 110.

Once threaded fastener 143 has been installed, a frangible collar, such as frangible collar 145, may be installed onto threaded fastener 143. Element loader 126 and element installer 128 may be used to perform this installation.

As depicted, element loader 126 may include holder 144 and loading device 146. In one illustrative example, holder 144 may be implemented as a structure configured to hold multiple frangible collars. In particular, holder 144 may hold a set of frangible collars, from which frangible collar 145 may then be selected for installation. Loading device 146 may be used to load frangible collar 145 held by holder 144 onto element installer 128. Loading device 146 may include, for example, without limitation, loading member 147 that may be actuated to load frangible collar 145 onto element installer 128.

Element installer 128 may include rotatable member 148, retaining member 150, actuation system 152, and elongate member 154. Rotatable member 148 may be configured to receive frangible collar 145. Retaining member 150 may be configured to retain frangible collar 145 and secure frangible collar 145 to rotatable member 148. For example, without limitation, loading device 146 may be used to load frangible collar 145 onto rotatable member 148 through retaining member 150 such that retaining member 150 can form some type of fit with frangible collar 145. This fit may be, for example, without limitation, a snap-fit. In this illustrative example, retaining member 150 may be configured to hold nut portion 151 of frangible collar 145.

Movement system 130 may be used to move element installer 128 towards element loader 126 such that frangible collar 145 may be loaded onto rotatable member 148. Further, movement system 130 may be used to move element installer 128 away from element loader 126 and towards installation feature 142 once frangible collar 145 has been loaded onto rotatable member 148.

Movement system 130 may include any number of devices and/or components needed to move element installer 128 and/or other components of end effector 102. In one illustrative example, movement system 130 may include servo motor system 155 capable of moving element installer 128.

Movement system 130 may position element installer 128 over installation feature 142 such that retaining member 150 and rotatable member 148 holding frangible collar 145 may be positioned over installation feature 142. Element installer 128 may then be used to install frangible collar 145 onto threaded fastener 143 through installation feature 142.

In particular, actuation system 152 may be configured to move elongate member 154 of element installer 128 towards threaded fastener 143 through installation feature 142. Actuation system 152 may be comprised of one or more actuation devices and/or other types of components. For example, without limitation, actuation system 152 may include an actuated air cylinder. Actuation system 152 may continue to push elongate member 154 until first end 156 of elongate member 154 comes into contact with threaded fastener 143. First end 156 of elongate member 154 may be configured to engage second end 158 of threaded fastener 143.

In one illustrative example, second end 158 of threaded fastener 143 may have a socket. In other words, threaded fastener 143 may have a depression at second end 158 of threaded fastener 143 that forms a socket configured to receive an object having substantially the same shape as the socket. In this example, the socket may have a hexagonal shape. Threaded fastener 143 may be a socket screw, also referred to as a socketed bolt.

First end 156 of elongate member 154 may have a shape configured to engage the socket at second end 158 of threaded fastener 143. For example, first end 156 of elongate member 154 may have a hexagonal shape configured to fit within the hexagonal socket of threaded fastener 143. First end 156 of elongate member 154 may be referred to as a hex key, an Allen wrench, or an Allen key.

In some cases, first end 156 of elongate member 154 may not readily engage second end 158 of threaded fastener 143 when elongate member 154 is moved towards second end 158 through installation feature 142. In other words, first end 156 may not be properly aligned, rotationally, with second end 158, such that first end 156 is not received within the hexagonal socket of second end 158. However, in other cases, first end 156 may readily engage second end 158 when elongate member 154 is moved towards threaded fastener 143.

Actuation system 152 may be configured to rotate rotatable member 148 in any number of directions to allow first end 156 of elongate member 154 to engage second end 158 of threaded fastener 143 and to allow collar portion 160 of frangible collar 145 to engage the threads on threaded fastener 143. Once collar portion 160 of frangible collar 145 has engaged the threads on threaded fastener 143, actuation system 152 may rotate rotatable member 148 to thread collar portion 160 onto threaded fastener 143.

This rotation may result in torque 153 being applied to frangible collar 145. When selected threshold 162 for torque 153 has been reached, nut portion 151 may separate from collar portion 160 of frangible collar 145. In other words, nut portion 151 may break away, or break off, from collar portion 160. However, nut portion 151 may remain retained by retaining member 150.

In this manner, collar portion 160 of frangible collar 145 may be installed onto threaded fastener 143. Actuation system 152 may be programmed to apply pre-selected torque 163 to frangible collar 145. Pre-selected torque 163 may be substantially equal to or greater than selected threshold 162 for torque 153. In this manner, any undesired effects on threaded fastener 143 outside of selected tolerances caused by the threading of collar portion 160 onto threaded fastener 143 may be prevented.

Once collar portion 160 has been installed, movement system 130 may move element installer 128 away from installation feature 142 and towards removal system 132. In this illustrative example, removal system 132 may be used to capture and discard nut portion 151 still being held by retaining member 150. As depicted, removal system 132 may include vacuum tube 164.

Movement system 130 may position element installer 128 over removal system 132 such that nut portion 151 is positioned over an opening in vacuum tube 164. Actuation system 152 may be configured to move elongate member 154 in a direction towards vacuum tube 164 to cause nut portion 151 to be released from retaining member 150. Once nut portion 151 is released from retaining member 150, nut portion 151 may enter vacuum tube 164 and be consequently discarded.

In this illustrative example, controller 166 may be configured to control the operation of at least one of actuation system 152, movement system 130, and robotic device 104. As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Controller 166 may be implemented using hardware, software, or a combination of the two. Depending on the implementation, controller 166 may be implemented using at least one of a computer system comprised of one or more computers, a processor unit, an integrated circuit, a microprocessor, or some other type of data processing system or processor. Controller 166 may be considered part of end effector 102 in this illustrative example, and may be associated with platform 122. However, in other illustrative examples, controller 166 may be considered separate from end effector 102. For example, without limitation, controller 166 may be configured to control movement system 130 and actuation system 152 using wired and/or wireless connections.

For example, without limitation, controller 166 may use preprogrammed settings to control the number of rotations, the different directions of rotation, and/or the number of degrees of rotation by which rotatable member 148 is rotated for the installation of each of number of frangible collars 120. Further, controller 166 may control selected threshold 162 for torque 153.

In this manner, the installation of number of frangible collars 120 may be automated. This type of installation system and method may increase the speed and efficiency with which frangible collars may be installed on threaded fasteners. Further, this type of installation system and method may reduce the amount of debris generated within automated manufacturing environment 101 when installing frangible collars.

The illustration of manufacturing environment 100 and end effector 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, end effector 102 may not be used to install number of members 114 in object 106. Rather, a different end effector (not shown) may be used to install number of members 114.

In other illustrative examples, attachment system 124 may be implemented using some other type of device other than clamping system 136. For example, without limitation, attachment system 124 may attach end effector 102 to object 106 using a clasp, a locking mechanism, a combination of fastening devices, and/or other types of components.

Figure 2:
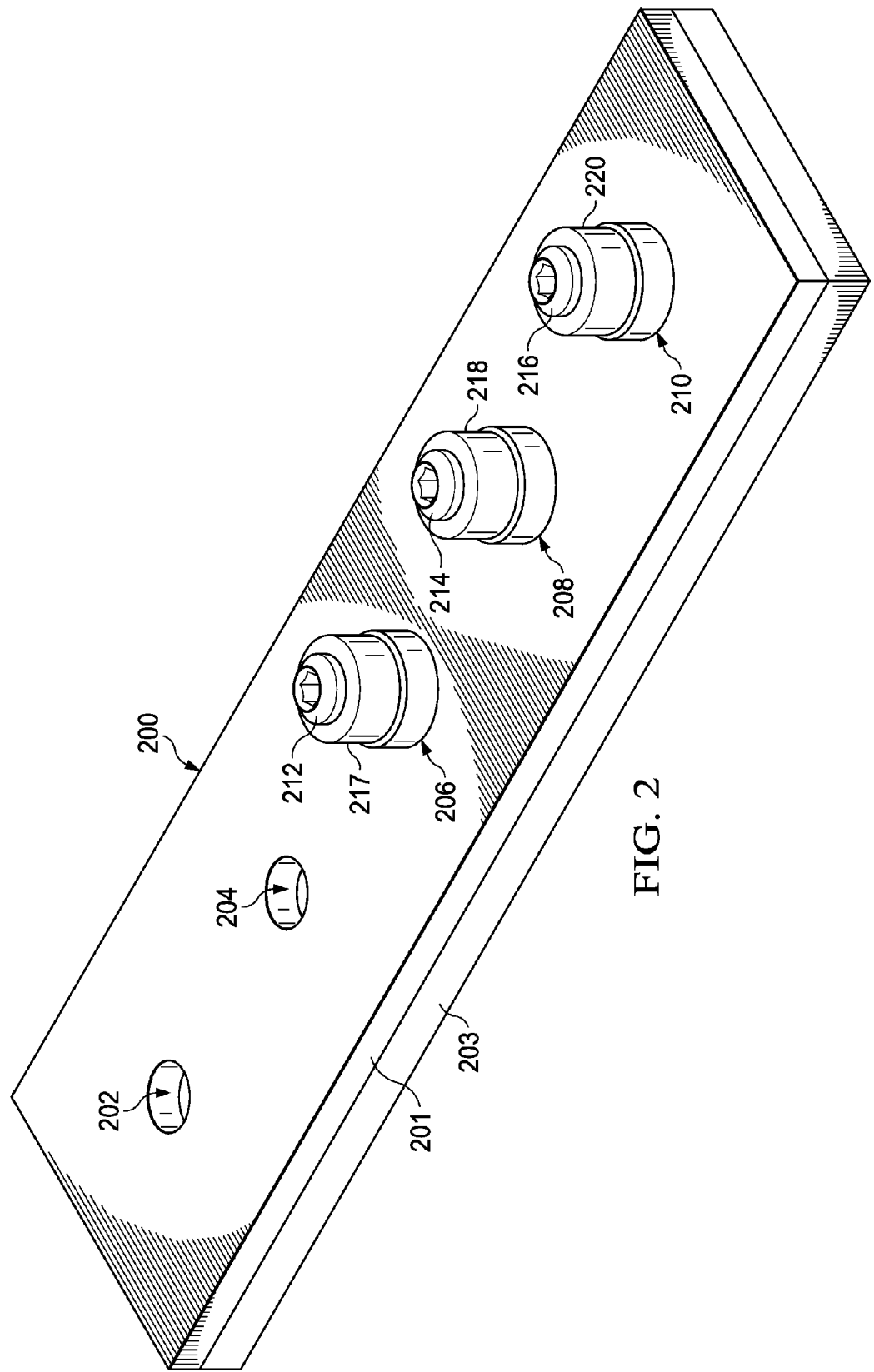
FIG. 2 is an illustration of an object in accordance with an illustrative embodiment.

With reference now to FIG. 2, an illustration of an object is depicted in accordance with an illustrative embodiment. In this illustrative example, object 200 may be an example of one implementation for object 106 in FIG. 1. As depicted, object 200 may include first part 201 and second part 203, which may be examples of implementations for first part 108 and second part 110, respectively, in FIG. 1. First part 201 and second part 203 may form a stackup of parts.

Object 200 may have holes 202, 204, 206, 208, and 210 configured to receive threaded fasteners. These holes may extend through both first part 201 and second part 203. In this illustrative example, threaded fasteners 212, 214, and 216 have been installed in object 200. Threaded fasteners 212, 214, and 216 may be examples of implementations for threaded fasteners in number of threaded fasteners 118 in FIG. 1.

In this illustrative, collar 217, collar 218, and collar 220 may already be installed onto threaded fasteners 212, 214, and 216, respectively. The process used to install collar 217 onto threaded fastener 212 may be described in FIGS. 3-19 below.

With reference now to FIGS. 3-19, illustrations of the steps used to install collar 217 from FIG. 2 onto threaded fastener 212 from FIG. 2 may be depicted in accordance with an illustrative embodiment. In FIGS. 3-19, end effector 300 may be used to install collar 217 from FIG. 2 onto threaded fastener 212 from FIG. 2. End effector 300 may be an example of one implementation for end effector 102 in FIG. 1.

Figure 3:
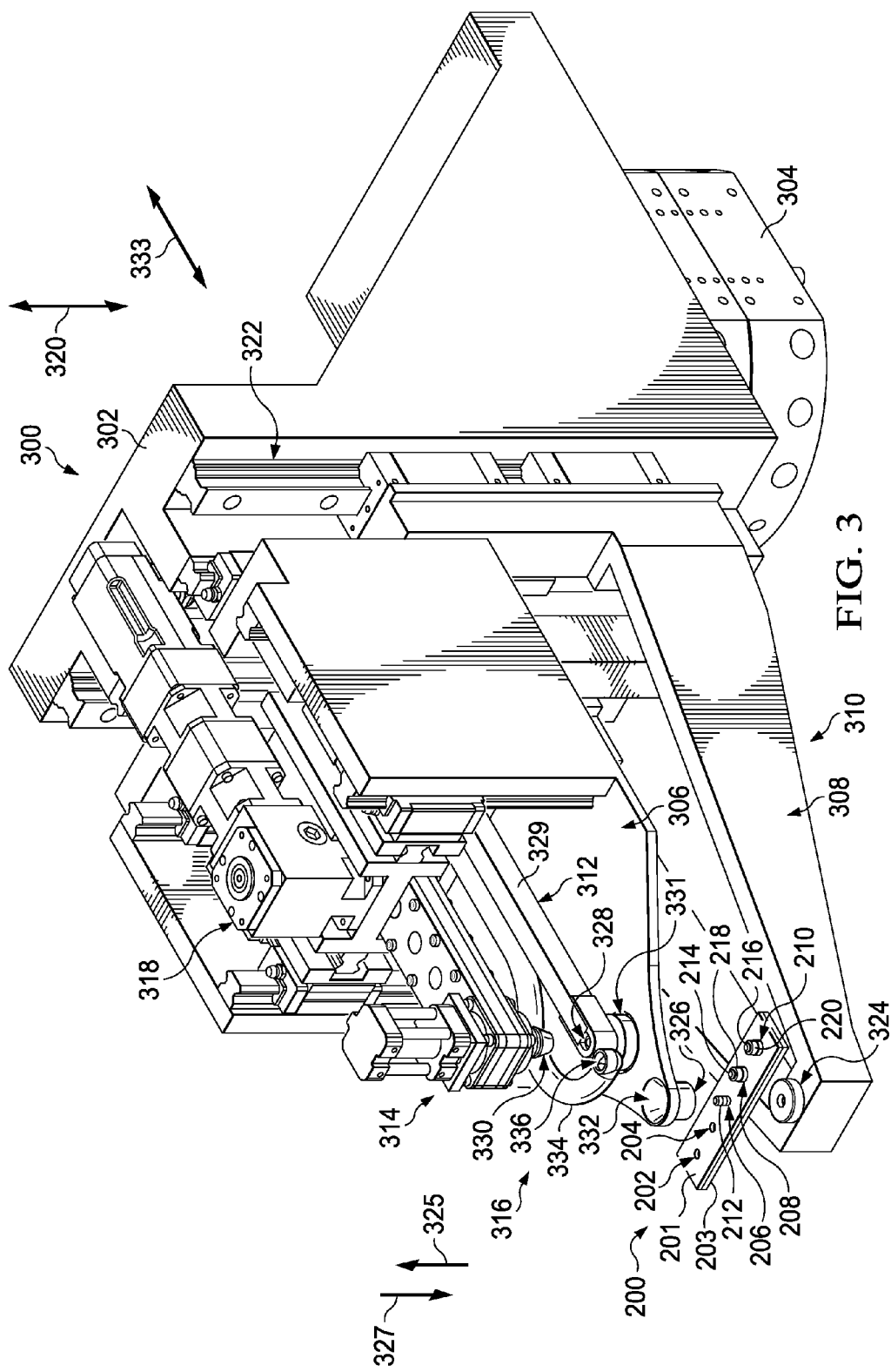
FIG. 3 is an illustration of an isometric view of an end effector being positioned relative to an object in accordance with an illustrative embodiment.

Turning now to FIG. 3, an illustration of an isometric view of end effector 300 being positioned relative to object 200 is depicted in accordance with an illustrative embodiment. In this illustrative example, end effector 300 may be moved towards and positioned relative to object 200 from FIG. 2. End effector 300 may be an example of one implementation for end effector 102 in FIG. 1.

As depicted, end effector 300 may include platform 302 having robotic interface feature 304. Robotic interface feature 304 may be used to attach end effector 300 to a robotic device (not shown), such as robotic device 104 described in FIG. 1. The robotic device (not shown) may be configured to move and manipulate end effector 300.

End effector 300 may include first clamping device 306 and second clamping device 308. First clamping device 306 and second clamping device 308 may be examples of implementations for first clamping device 138 and second clamping device 140, respectively, in FIG. 1. First clamping device 306 and second clamping device 308 may form clamping system 310, which may be an example of one implementation for clamping system 136 in FIG. 1. In this manner, clamping system 310 is an example of an attachment system, such as attachment system 124 in FIG. 1.

In addition to clamping system 310, end effector 300 may also include element loader 312, element installer 314, removal system 316, and movement system 318. Element loader 312, element installer 314, removal system 316, and movement system 318 may be examples of implementations for element loader 126, element installer 128, removal system 132, and movement system 130, respectively in FIG. 1. As depicted, clamping system 310, element loader 312, element installer 314, removal system 316, and movement system 318 may all be associated with platform 302.

The robotic device (not shown) attached to end effector 300 may move end effector 300 such that first clamping device 306 and second clamping device 308 of end effector 300 are positioned relative to object 200. In this illustrative example, first clamping device 306 may be positioned over first part 201, while second clamping device 308 may be positioned over second part 203. First clamping device 306 and second clamping device 308 may be moved along Z-axis 320 to allow end effector 300 to be clamped to and unclamped from object 200.

As depicted, rail system 322 may be associated with platform 302 in this illustrative example. Rail system 322 includes rails along which each of first clamping device 306 and second clamping device 308 may be moved in a direction along Z-axis 320. For example, without limitation, first clamping device 306 may be moved along rail system 322 in the direction of arrow 327 towards first part 201. Second clamping device 308 may be moved along rail system 322 in the direction of arrow 325 towards second part 203. In this manner, first clamping device 306 and second clamping device 308 may be moved towards each other to clamp end effector 300 to object 200.

In this illustrative example, second clamping device 308 may have engagement feature 324 configured to engage threaded fastener 212 on the side of second part 203. Further, first clamping device 306 may have installation feature 326 configured to engage threaded fastener 212 on the side of first part 201. Installation feature 326 may be an example of one implementation for installation feature 142 in FIG. 1.

Installation feature 326 may be positioned over threaded fastener 212 such that installation feature 326 fits over threaded fastener 212 when first clamping device 306 is moved towards first part 201. In other illustrative examples, installation feature 326 may be positioned over hole 206 such that threaded fastener 212 may be inserted through installation feature 326 into hole 206.

As depicted, element loader 312 may include holder 329 and loading device 331. Holder 329 and loading device 331 may be examples of implementations of holder 144 and loading device 146, respectively, in FIG. 1. Holder 329 may be configured to hold multiple frangible collars (not shown in this view). Loading device 331 may be used to load these frangible collars onto element installer 314.

Element installer 314 may be configured to receive a frangible collar (not shown) at end 330 of element installer 314. In particular, loading device 331 may be used to load the frangible collar (not shown) onto end 330 of element installer 314 through opening 328 in holder 329.

Element installer 314 may then be moved by movement system 318 to position end 330 over opening 332 of installation feature 326 such that the frangible collar (not shown) held at end 330 may be installed over fastener 212 through installation feature 326. Movement system 318 may be configured to move element installer 314 in the direction of X-axis 333 and/or the direction of Z-axis 320.

When the frangible collar (not shown) has been fully installed over fastener 212, the nut portion of the frangible collar may break away from the collar portion of the frangible collar. The nut portion may remain held at end 330, while the collar portion may remain over the fastener. The nut portion of the frangible collar may then be discarded using removal system 316.

Removal system 316 may include vacuum tube 334. Vacuum tube 334 may be an example of one implementation for vacuum tube 164 in FIG. 1. Movement system 318 may be used to move element installer 314 over opening 336 to vacuum tube 334. Element installer 314 may then discard the nut portion by sending the nut portion into vacuum tube 334 through opening 336.

Figure 4:
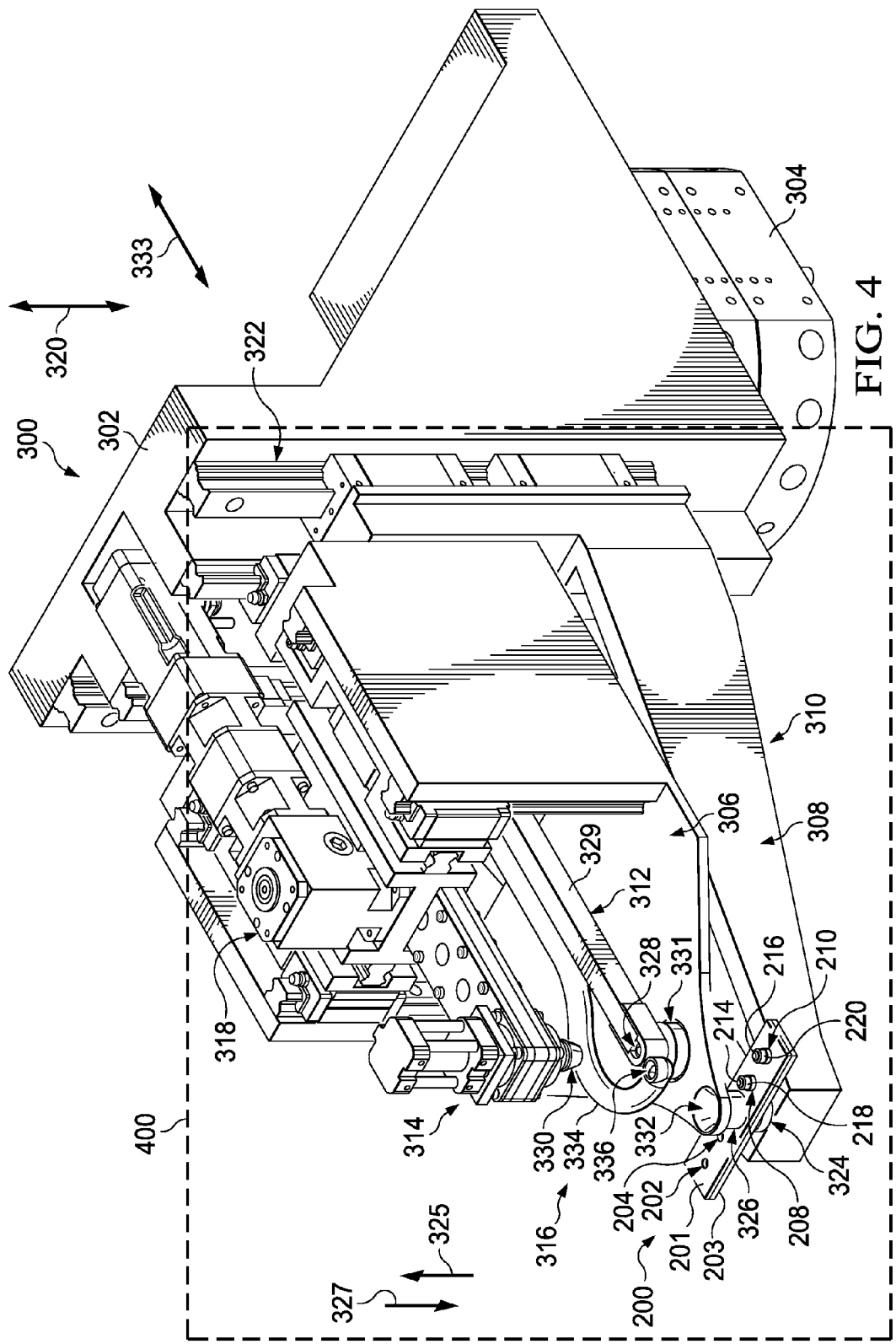
FIG. 4 is an illustration of an end effector clamped to an object in accordance with an illustrative embodiment.

Turning now to FIG. 4, an illustration of end effector 300 from FIG. 3, clamped to object 200 from FIGS. 2-3, is depicted in accordance with an illustrative embodiment. In this illustrative example, first clamping device 306 and second clamping device 308 have been used to clamp end effector 300 to object 200. As depicted, installation feature 326 may fully cover fastener 212 seen in FIGS. 2-3.

Once end effector 300 has been clamped to object 200, element installer 314 may be moved by movement system 318 towards element loader 312 such that a frangible collar (not shown in this view) may be loaded onto end 330 of element installer 314. An enlarged view of portion 400 of end effector 300 with element installer 314 positioned over opening 328 in holder 329 is depicted in FIG. 5 below.

Figure 5:
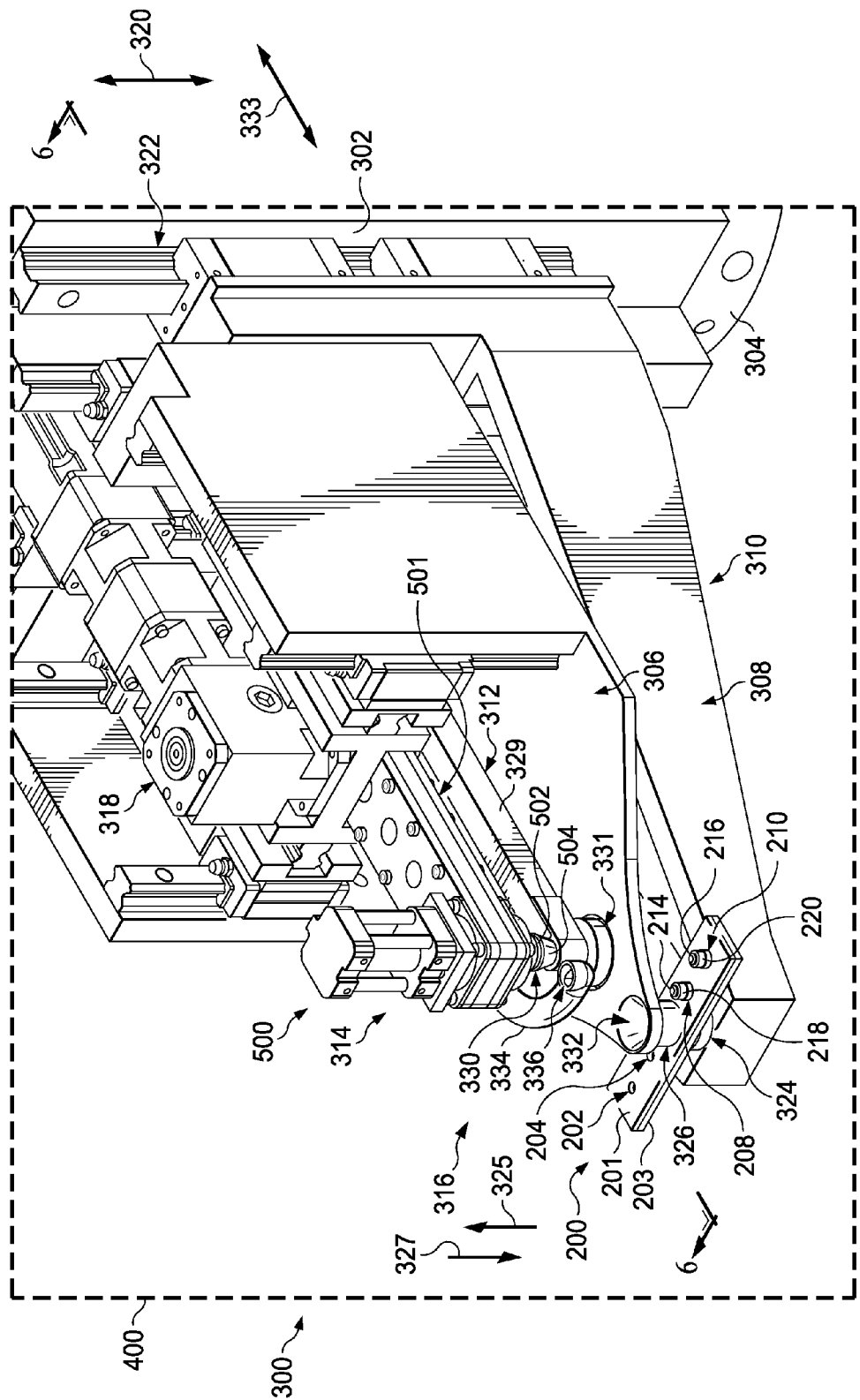
FIG. 5 is an illustration of a portion of an end effector with an element installer positioned over an element loader in accordance with an illustrative embodiment.

With reference now to FIG. 5, an illustration of portion 400 of end effector 300 from FIG. 4 with element installer 314 positioned over element loader 312 is depicted in accordance with an illustrative embodiment. In this illustrative example, element installer 314 has been moved such that end 330 is positioned over loading device 331.

Element installer 314 may include actuation system 500, rotatable member 502, and retaining member 504. Actuation system 500, rotatable member 502, and retaining member 504 may be examples of implementations for actuation system 152, rotatable member 148, and retaining member 150, respectively, in FIG. 1. In this illustrative example, actuation system 500 and rotatable member 502 may be associated with base 501. Base 501 may be moved and manipulated using movement system 318.

Figure 6:
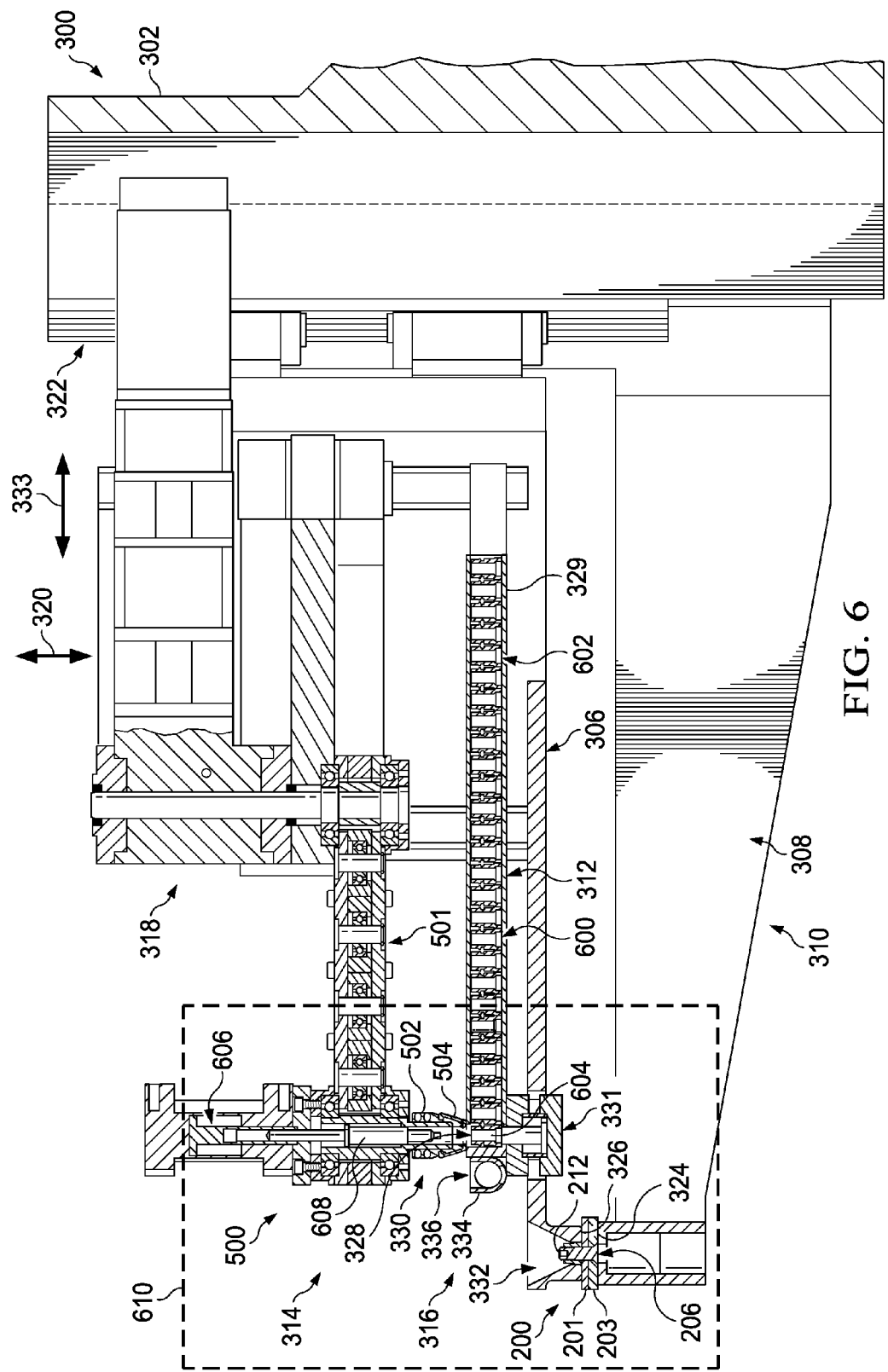
FIG. 6 is an illustration of a cross-sectional view of a portion of an end effector in accordance with an illustrative embodiment.

With reference now to FIG. 6, an illustration of a cross-sectional view of portion 400 of end effector 300 from FIG. 5 is depicted in accordance with an illustrative embodiment. In this illustrative example, a cross-sectional view of portion 400 of end effector 300 may be depicted taken with respect to lines 6-6 in FIG. 5.

In this illustrative example, chamber 600 within holder 329 may be seen. Chamber 600 may hold frangible collars 602. Frangible collars 602 may be an example of one implementation for number of frangible collars 120 in FIG. 1. In this manner, frangible collars 602 may be an example of one manner in which number of frangible elements 116 in FIG. 1, and thereby number of elements 112 in FIG. 1, may be implemented.

Frangible collar 604 may be one of frangible collars 602. Frangible collar 604 may be an example of a frangible element, such as frangible element 117 in FIG. 1, and thereby an element, such as element 115 in FIG. 1.

Figure 7:
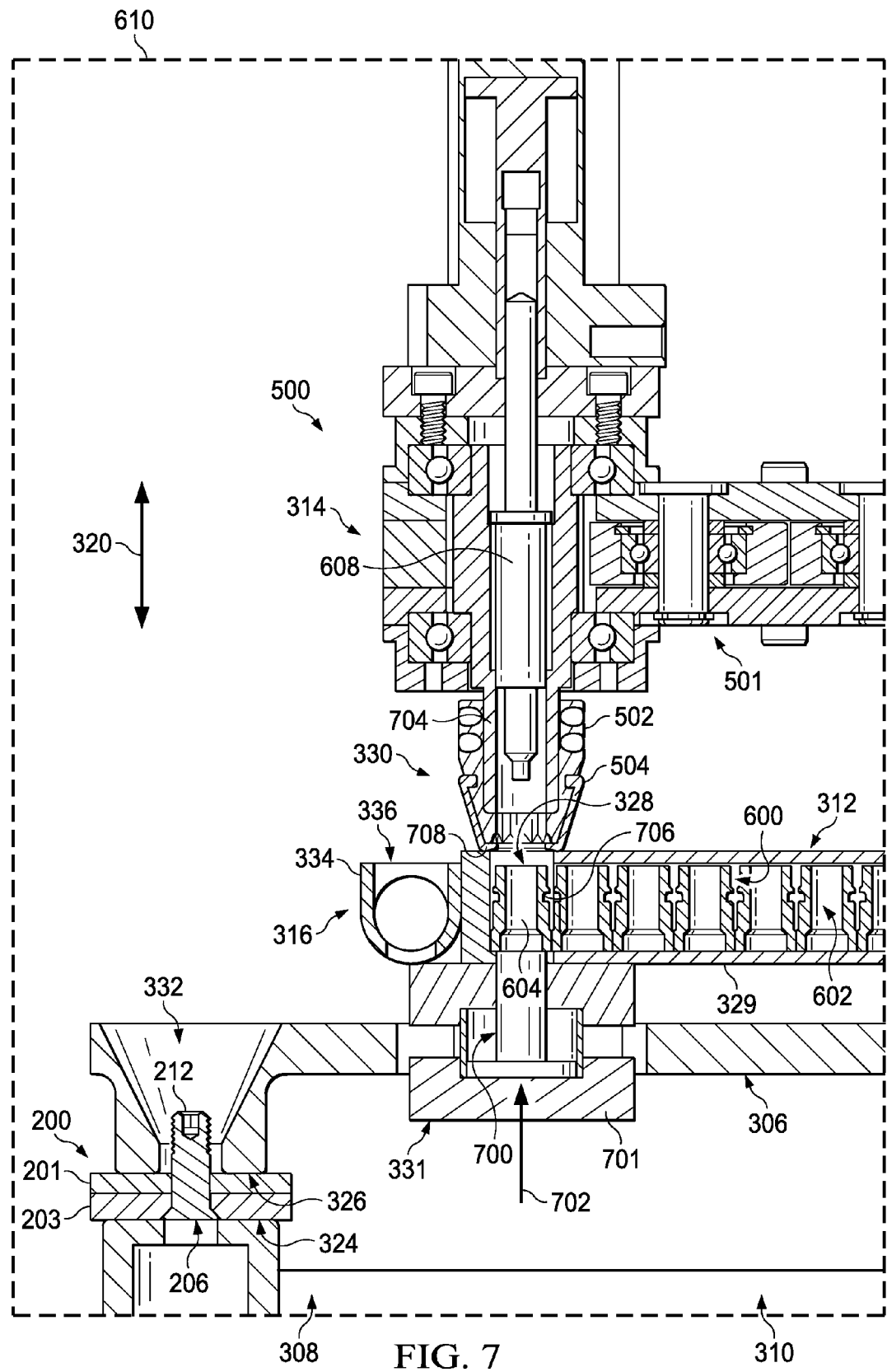
FIG. 7 is an illustration of an enlarged view of a portion of an end effector in accordance with an illustrative embodiment.

As depicted, frangible collar 604 may be the particular frangible collar that is next in line to be loaded onto end 330 of element installer 314. Loading frangible collar 604 onto end 330 may include pushing frangible collar 604 towards retaining member 504 and rotatable member 502 of element installer 314. An enlarged view of portion 610 of end effector 300 is depicted in FIG. 7 below. Further, the manner by which frangible collar 604 may be loaded onto end effector 300 is described in FIGS. 7-9 below.

In FIG. 6, actuation system 500 of element installer 314 may include piston device 606. Piston device 606 may be configured to control the movement of elongate member 608 of element installer 314 along Z-axis 320. Once frangible collar 604 has been loaded onto element installer 314, piston device 606 and elongate member 608 may be used to install frangible collar 604 over fastener 212.

Turning now to FIG. 7, an illustration of an enlarged view of portion 610 of end effector 300 from FIG. 6 is depicted in accordance with an illustrative embodiment. As depicted, loading device 331 may include loading member 700 and cylinder 701. Loading member 700 may be an example of one implementation for loading member 147 in FIG. 1.

Cylinder 701 may be an air cylinder configured to exert a force on loading member 700 in the direction of arrow 702. In other words, cylinder 701 may be used to move loading member 700 in the direction of arrow 702 such that frangible collar 604 may also be moved in the direction of arrow 702 towards element installer 314.

As depicted, frangible collar 604 may have groove 706. Groove 706 may separate the nut portion of frangible collar 604 from the collar portion of frangible collar 604. Groove 706 may be used for loading frangible collar 604 onto element installer 314.

In particular, frangible collar 604 may be moved in the direction of arrow 702 until interface feature 708 of retaining member 504 snaps into groove 706 of frangible collar 604. Once interface feature 708 of retaining member 504 snaps into groove 706, frangible collar 604 may be considered held by retaining member 504.

In this illustrative example, rotatable member 502 of element installer 314 may be able to independently move relative to structure 704 of element installer 314 along Z-axis 320. In other words, rotatable member 502 may be configured to float relative to structure 704.

Figure 8:
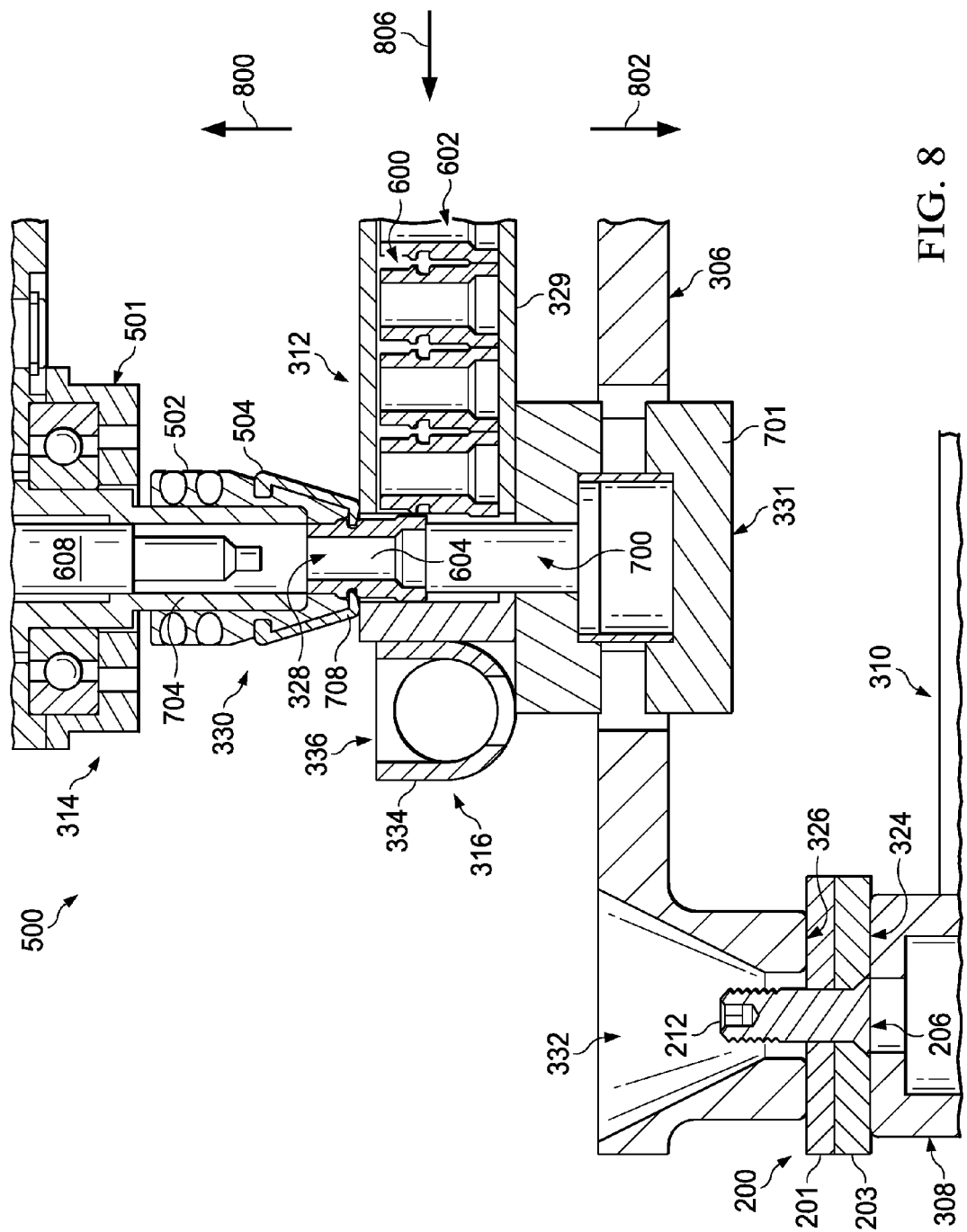
FIG. 8 is an illustration of a frangible collar being held by a retaining member in accordance with an illustrative embodiment.

Turning now to FIG. 8, an illustration of frangible collar 604 being held by retaining member 504 is depicted in accordance with an illustrative embodiment. In this illustrative example, interface feature 708 has snapped into groove 706 of frangible collar 604.

Element installer 314 may be moved away from element loader 312 in the direction of arrow 800. Further, loading member 700 may be moved back in the direction of arrow 802 such that the next frangible collar 804 may be moved into position over loading member 700. In particular, frangible collar 804 may be moved in the direction of arrow 806 once frangible collar 604 has been moved away from element loader 312 and loading member 700 has moved back down in the direction of arrow 802.

Figure 9:
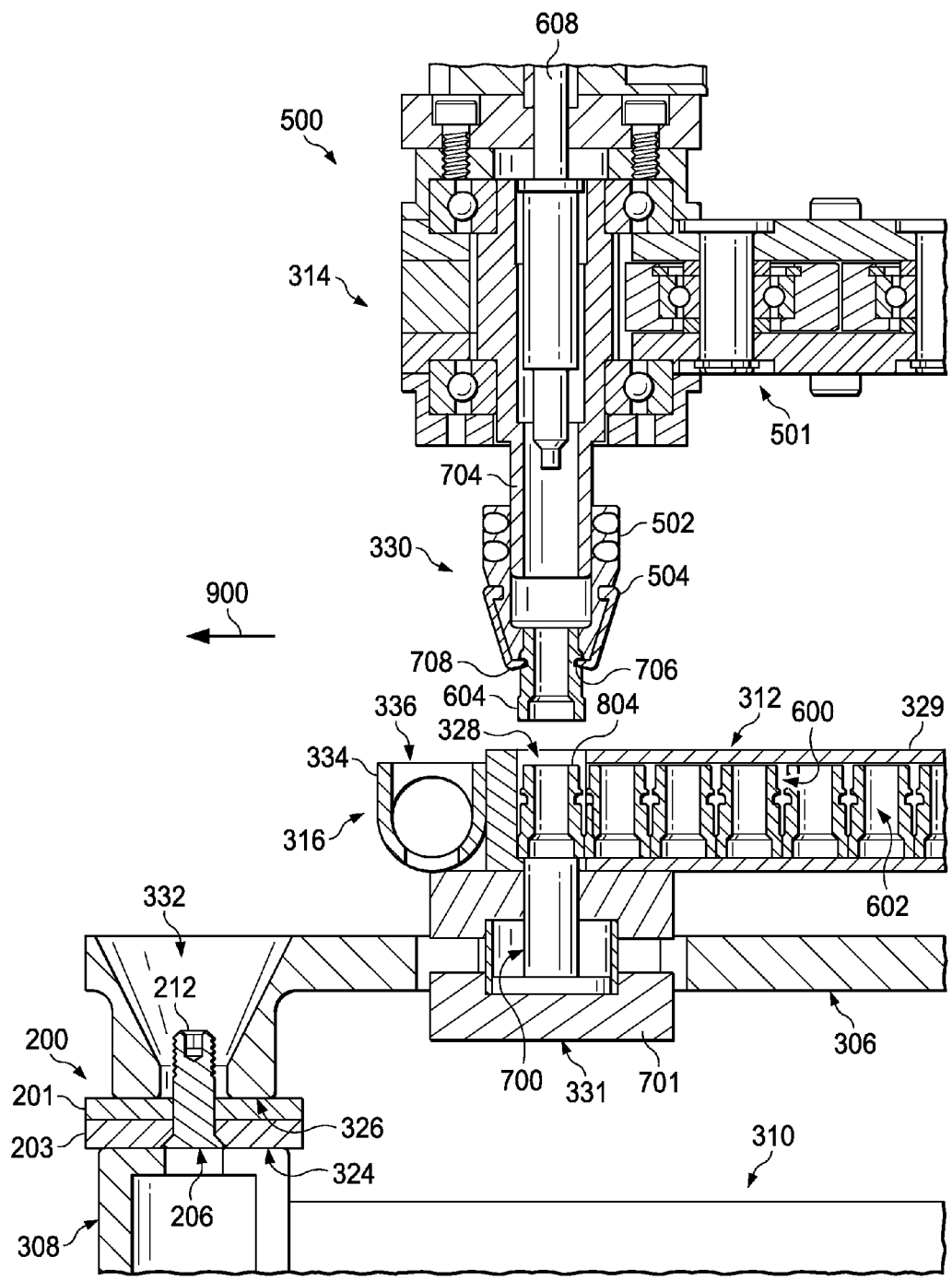
FIG. 9 is an illustration of an element installer being moved away from an element loader in accordance with an illustrative embodiment.

With reference now to FIG. 9, an illustration of element installer 314 being moved away from element loader 312 is depicted in accordance with an illustrative embodiment. In this illustrative example, element installer 314 may be moved away from element loader 312 and then moved towards opening 332 in installation feature 326 in the direction of arrow 900. In particular, element installer 314 may be moved in the direction of arrow 900 such that frangible collar 604 held by retaining member 504 may be positioned over opening 332.

Figure 10:
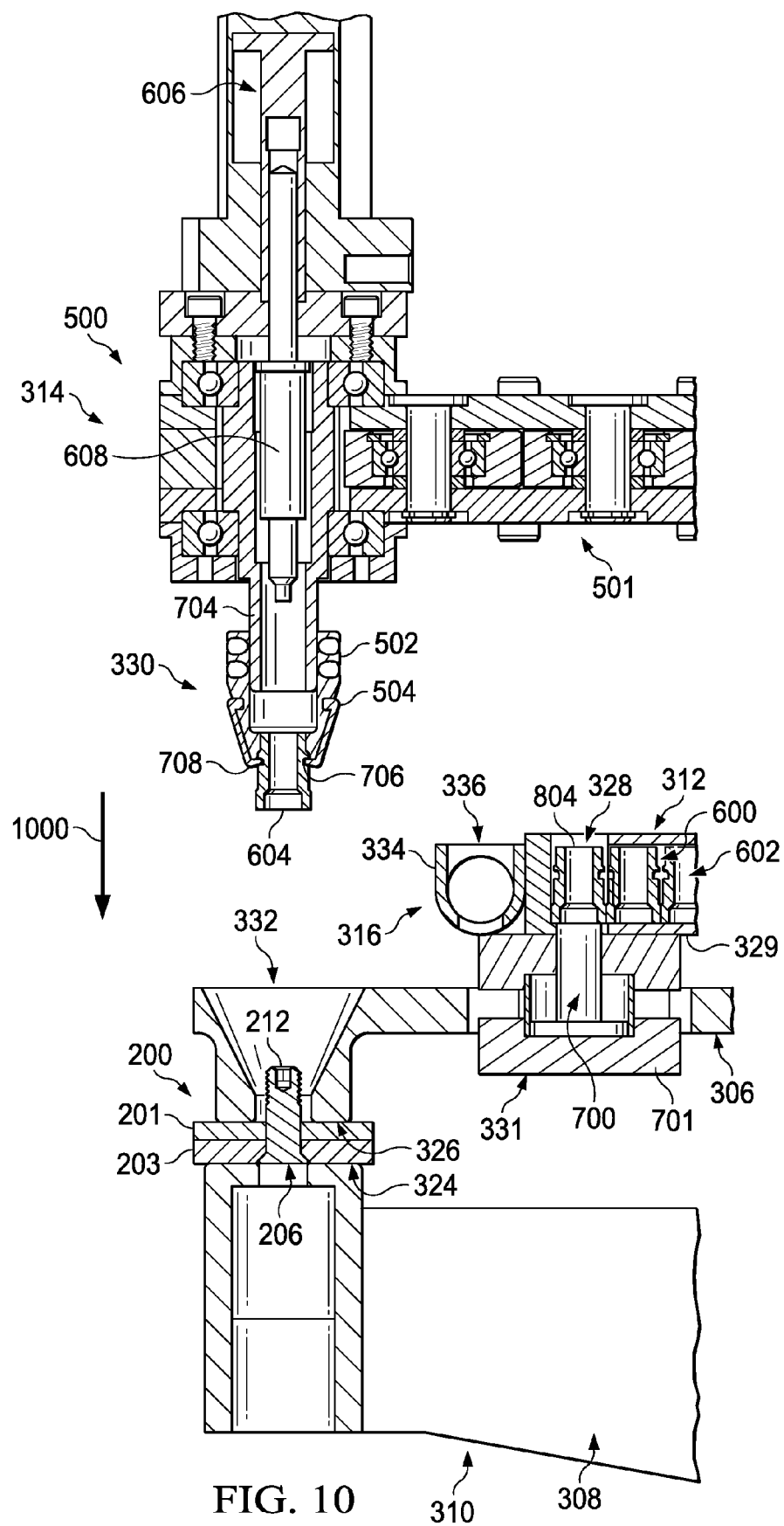
FIG. 10 is an illustration of a frangible collar held by a retaining member positioned over an opening in accordance with an illustrative embodiment.

Turning now to FIG. 10, an illustration of frangible collar 604 held by retaining member 504 positioned over opening 332 is depicted in accordance with an illustrative embodiment. Once frangible collar 604 has been positioned over opening 332, actuation system 500 may be used to move frangible collar 604 into opening 332. In particular, actuation system 500 may be used to move frangible collar 604 in the direction of arrow 1000 into opening 332.

Figure 11:
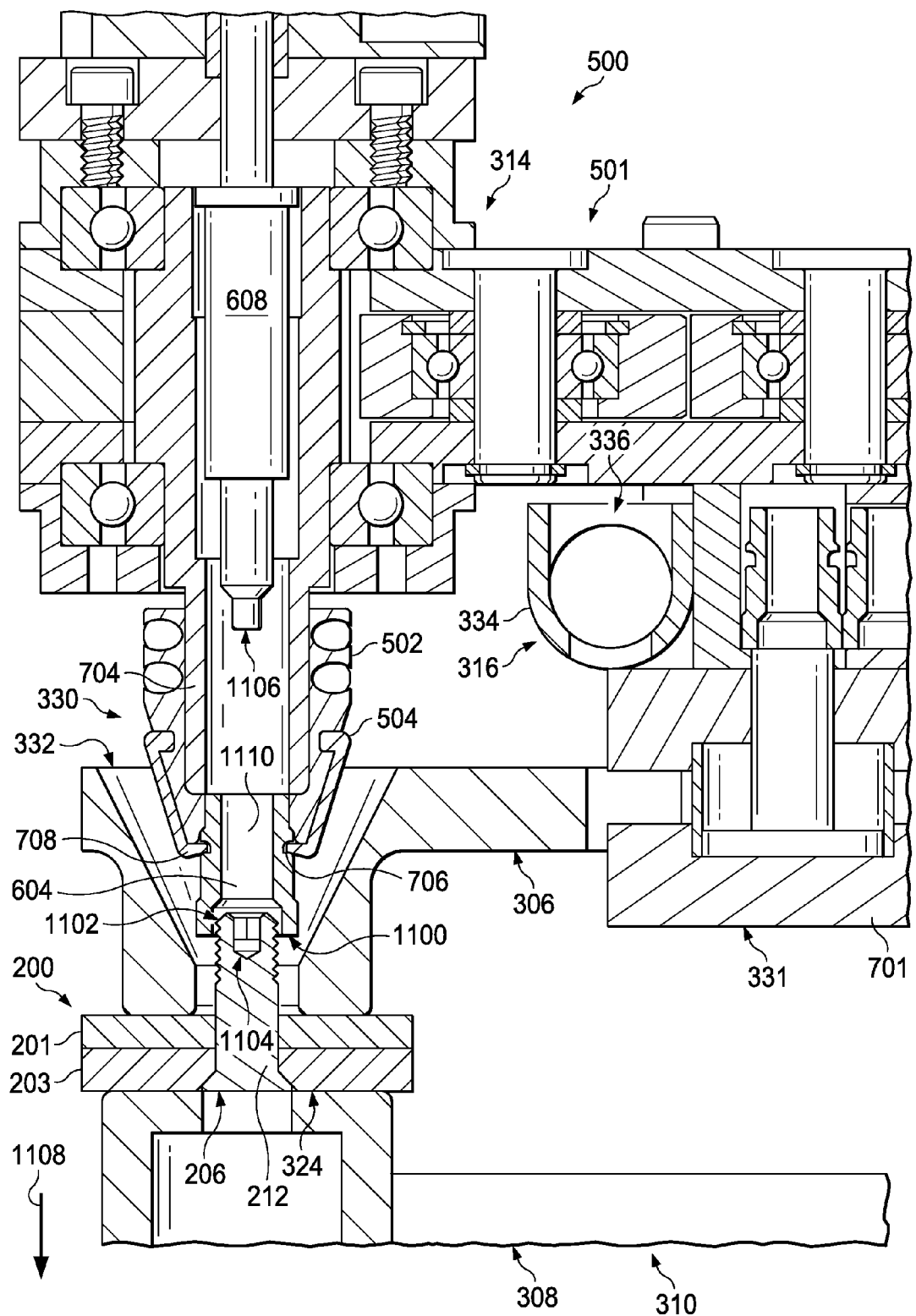
FIG. 11 is an illustration of a frangible collar in an installation feature in accordance with an illustrative embodiment.

With reference now to FIG. 11, an illustration of frangible collar 604 in installation feature 326 is depicted in accordance with an illustrative embodiment. In this illustrative example, actuation system 500 has moved frangible collar 604 through installation feature 326 such that frangible collar 604 may be placed over fastener 212. In particular, end 1100 of frangible collar 604 may be placed over end 1102 of fastener 212.

As depicted, fastener 212 may have socket 1104. Elongate member 608 may have tip 1106 configured to be received within socket 1104 of fastener 212. Tip 1106 may be an example of one implementation for first end 156 in FIG. 1. Socket 1104 may be an example of one implementation for second end 158 in FIG. 1.

In this illustrative example, socket 1104 may be a hexagonal socket and tip 1106 may have a hexagonal shape that fits within the hexagonal socket. Of course, in other illustrative examples, socket 1104 may be some other type of socket and tip 1106 may have some other type of shape.

Actuation system 500 may move elongate member 608 in the direction of arrow 1108 towards fastener 212 such that tip 1106 of elongate member 608 at least contacts end 1102 of fastener 212. Tip 1106 of elongate member 608 may pass through opening 1110 in frangible collar 604 to reach fastener 212.

In some cases, tip 1106 may engage socket 1104 when tip 1106 is moved in the direction of arrow 1108. In other examples, tip 1106 may not be rotationally aligned with socket 1104. In other words, tip 1106 may contact end 1102 of fastener 212 but may be unable to engage socket 1104 when moved in the direction of arrow 1108. Tip 1106 may need to be rotated in order for tip 1106 and socket 1104 to be properly aligned.

Figure 12:
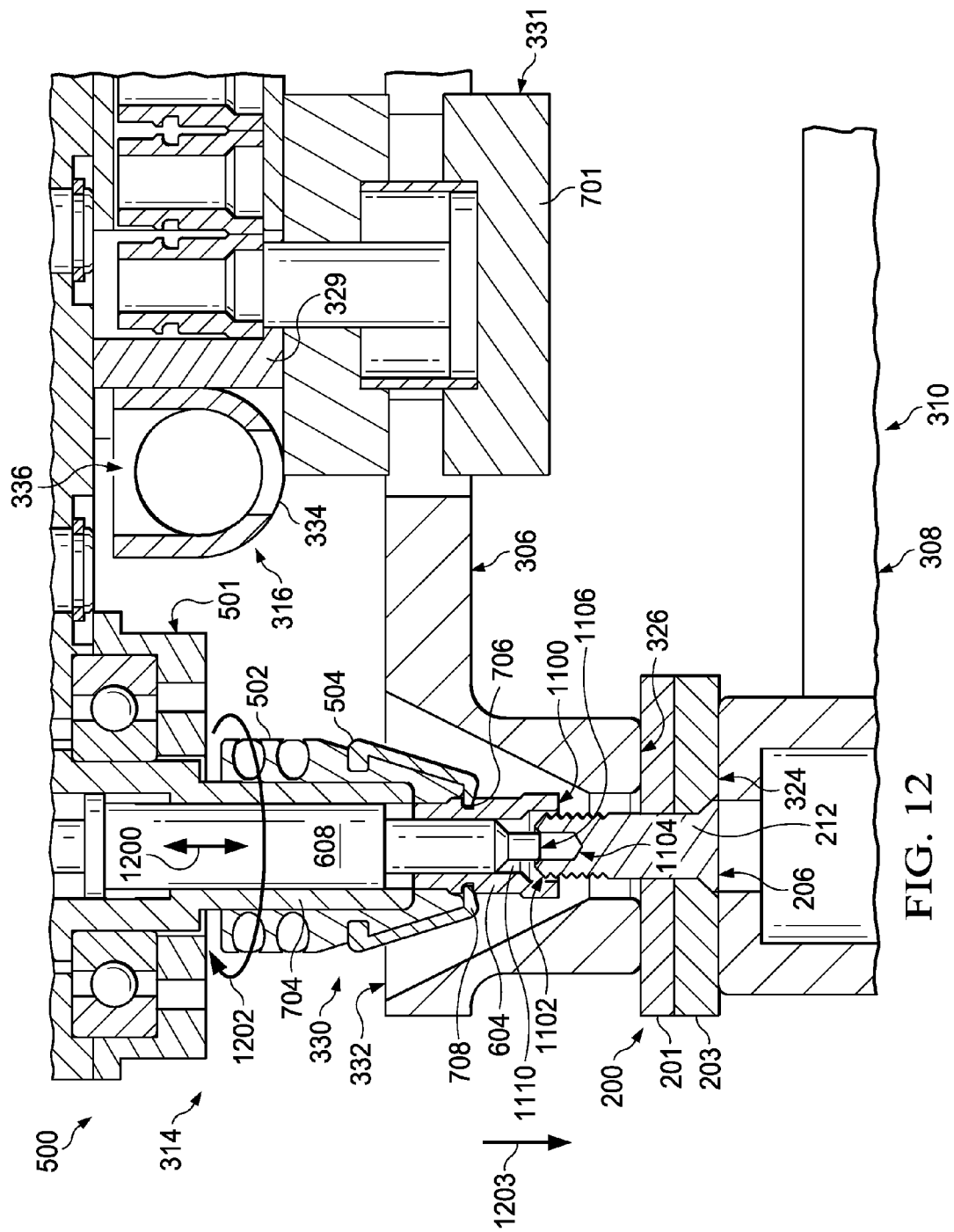
FIG. 12 is an illustration of a tip of an elongate member in contact with an end of a fastener in accordance with an illustrative embodiment.

With reference now to FIG. 12, an illustration of tip 1106 of elongate member 608 in contact with end 1102 of fastener 212 is depicted in accordance with an illustrative embodiment. As depicted, tip 1106 has not yet engaged socket 1104 but is in contact with end 1102 of fastener 212.

Rotatable member 502 may be rotated about center axis 1200 through rotatable member 502 in the direction of, for example, without limitation, arrow 1202. In particular, rotatable member 502 may be rotated according to preselected parameters. In other words, rotatable member 502 may be rotated a preselected number of turns.

Rotatable member 502 may be rotated while actuation system 500 is still applying force to elongate member 608 in the direction of arrow 1203 to move elongate member 608 in the direction of arrow 1203. As a result, rotation of rotatable member 502 may cause tip 1106 of elongate member 608 to properly align with socket 1104 of fastener 212 and engage socket 1104.

Figure 13:
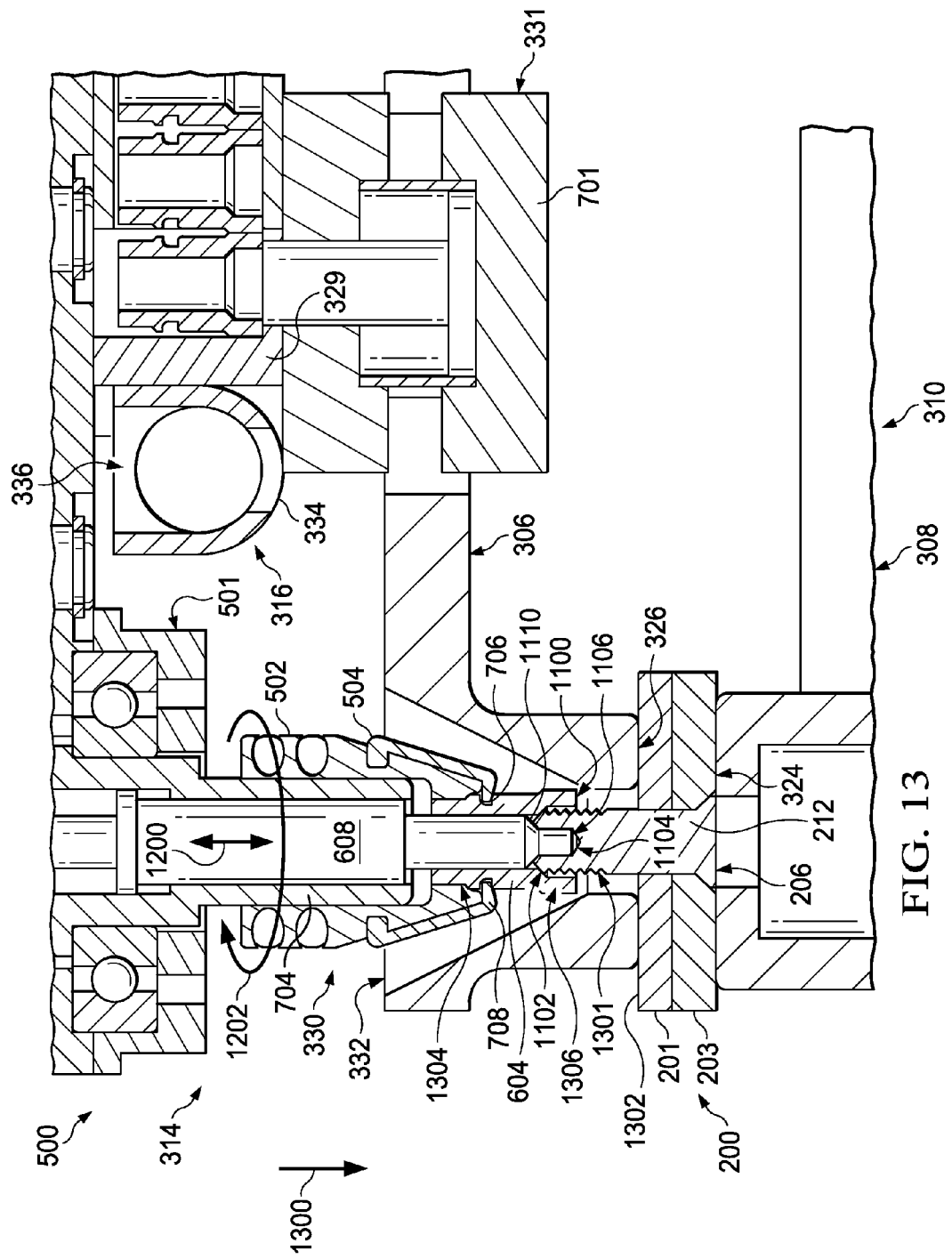
FIG. 13 is an illustration of a tip of an elongate member engaged with a socket of a fastener in accordance with an illustrative embodiment.

With reference now to FIG. 13, an illustration of tip 1106 of elongate member 608 engaged with socket 1104 of fastener 212 is depicted in accordance with an illustrative embodiment. As depicted, tip 1106 has engaged socket 1104.

Fastener 212 may have outer threads 1301. Further, at least a portion of frangible collar 604 at end 1100 of frangible collar 604 may have inner threads (not shown) configured to engage outer threads 1301 of fastener 212. Rotation of rotatable member 502 may cause frangible collar 604 to be threaded onto fastener 212.

In this manner, rotation of rotatable member 502 according to preselected parameters may cause tip 1106 to engage socket 1104 and frangible collar 604 to be threaded onto fastener 212. Threading frangible collar 604 onto fastener 212 may move frangible collar 604 relative to fastener 212 in the direction of arrow 1300 until end 1100 of frangible collar 604 reaches surface 1302 of first part 201.

Further, the number of turns and speed by which rotatable member 502 is rotated may determine the torque applied to frangible collar 604. Once the torque applied to frangible collar 604 reaches a selected threshold, first portion 1304 of frangible collar 604 may be configured to break away from second portion 1306 of frangible collar 604.

Figure 14:
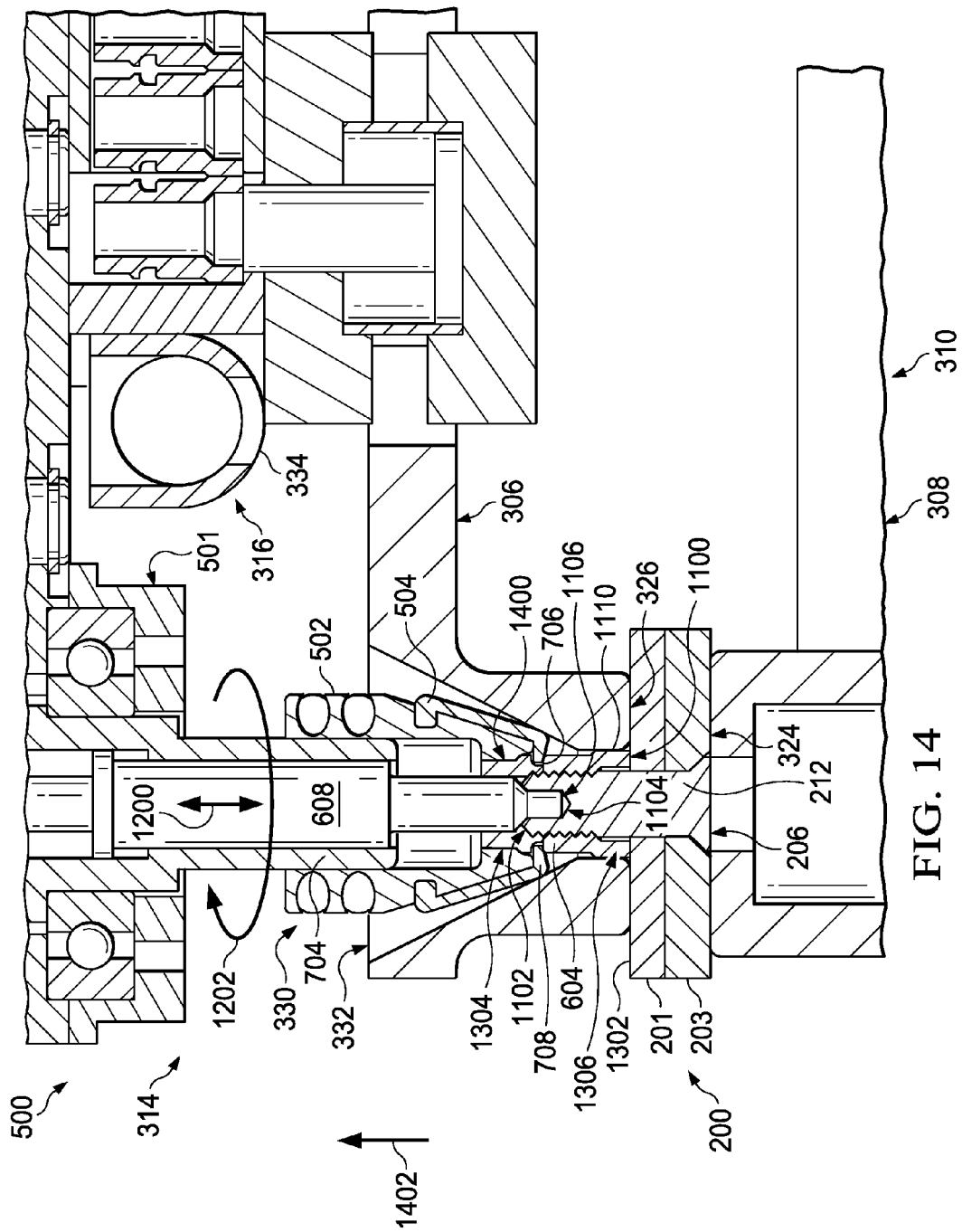
FIG. 14 is an illustration of a first portion of a frangible collar separated from a second portion of a frangible collar in accordance with an illustrative embodiment.

With reference now to FIG. 14, an illustration of first portion 1304 of frangible collar 604 separated from second portion 1306 of frangible collar 604 is depicted in accordance with an illustrative embodiment. In particular, first portion 1304 of frangible collar 604 has broken away from second portion 1306 of frangible collar 604. First portion 1304 may be removed as nut portion 1400, while second portion 1306 may remain installed over fastener 212 as collar 217. Element installer 314 may then be moved away from installation feature 326 in the direction of arrow 1402 by actuation system 500 to move nut portion 1400 away from collar 217.

Figure 15:
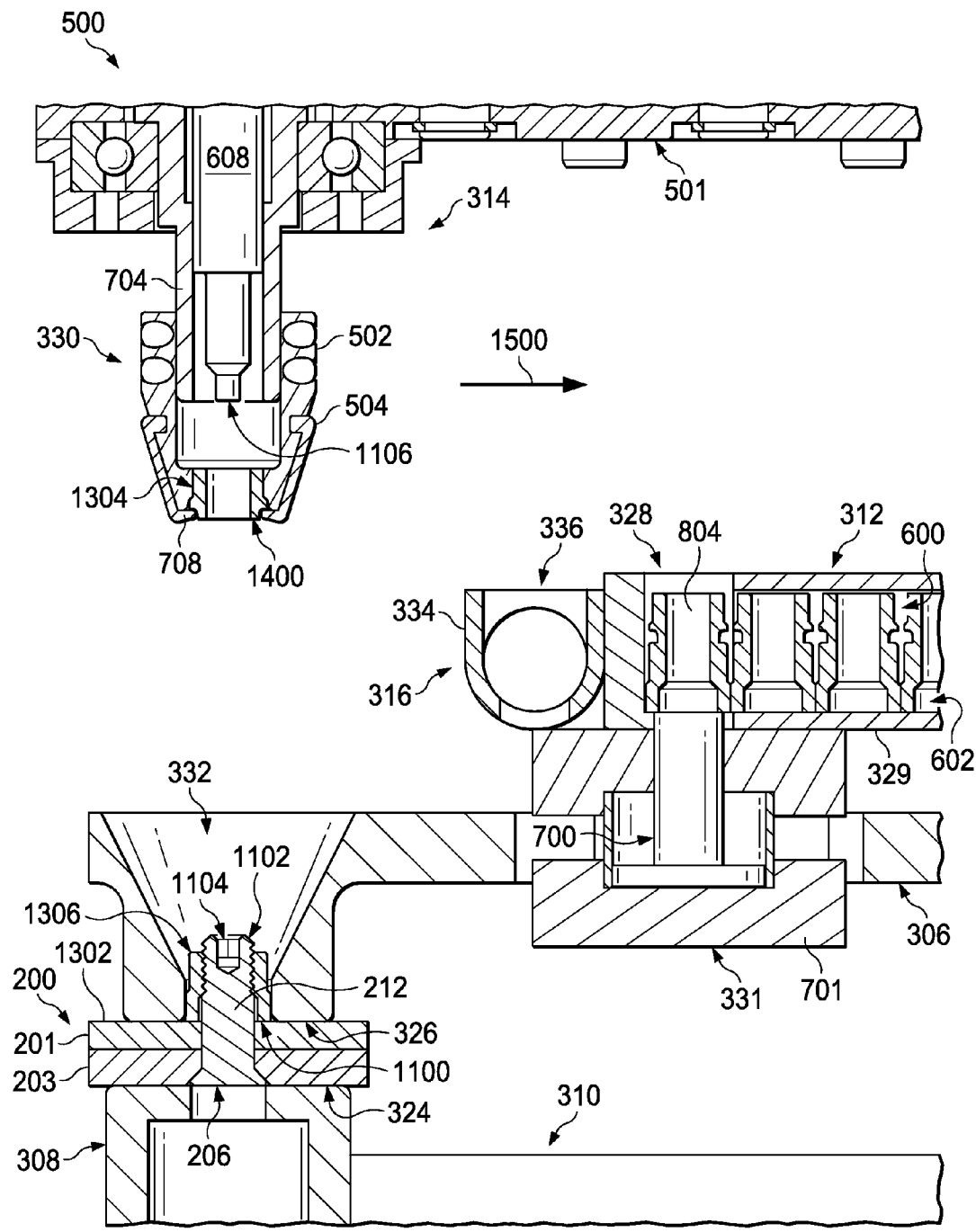
FIG. 15 is an illustration of an element installer moving a nut portion to a removal system in accordance with an illustrative embodiment.

Turning now to FIG. 15, an illustration of element installer 314 moving nut portion 1400 to removal system 316 is depicted in accordance with an illustrative embodiment. In this illustrative example, actuation system 500 has moved nut portion 1400 away from collar 217. Next, movement system 318 from FIG. 3 may move element installer 314 in the direction of arrow 1500 towards removal system 316.

Figure 16:
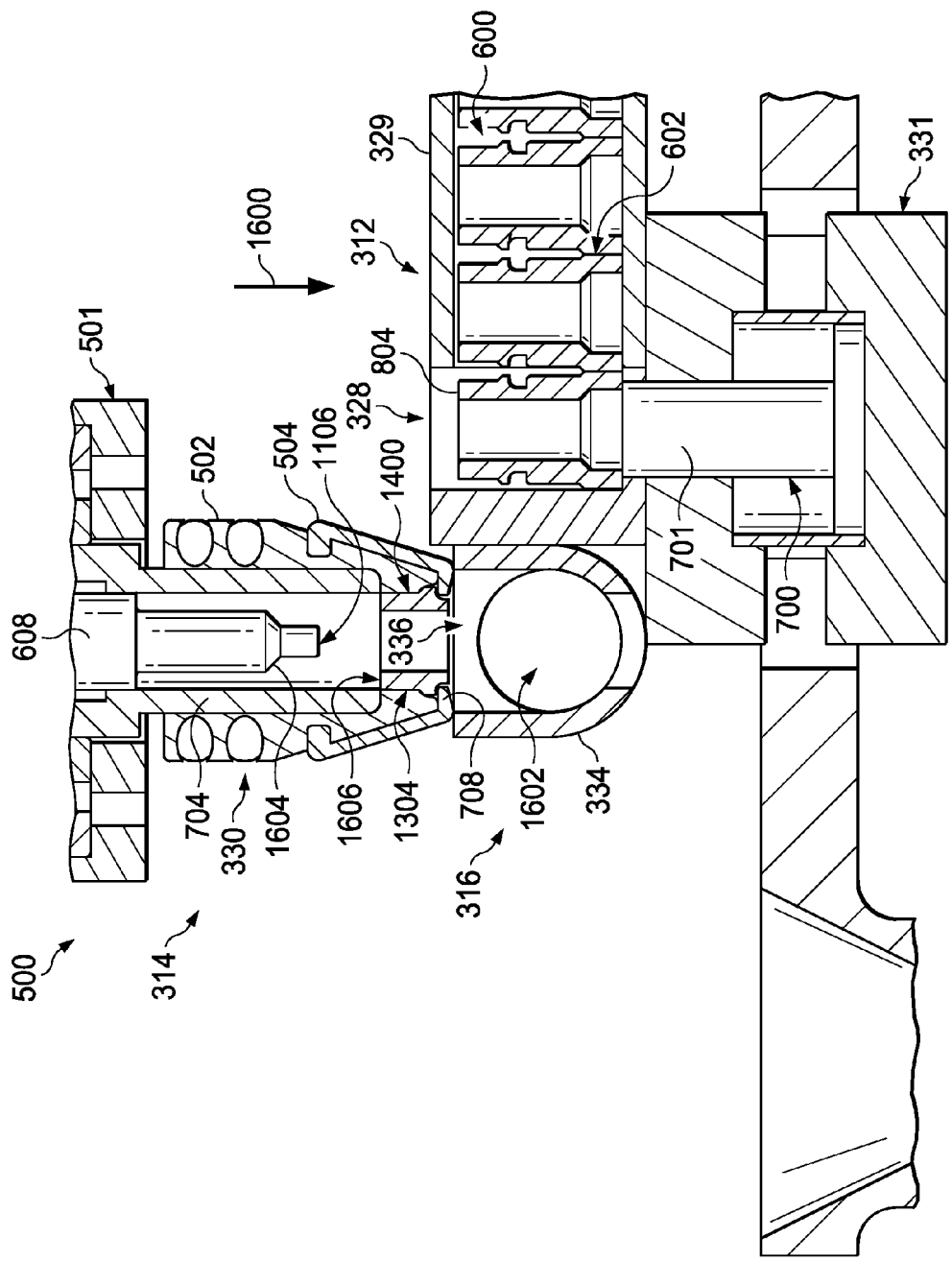
FIG. 16 is an illustration of a nut portion positioned over an opening into a vacuum tube in accordance with an illustrative embodiment.

With reference now FIG. 16, an illustration of nut portion 1400 positioned over opening 336 into vacuum tube 334 is depicted in accordance with an illustrative embodiment. In this illustrative example, nut portion 1400 has been positioned over opening 336 into vacuum tube 334 such that nut portion 1400 may be discarded.

Elongate member 608 may be moved in the direction of arrow 1600 to push nut portion 1400 out of retaining member 504 and into vacuum tube 334. In particular, nut portion 1400 may be pushed through opening 336 into channel 1602 inside vacuum tube 334. As depicted, elongate member 608 has interface feature 1604 configured to engage end 1606 of nut portion 1400 and apply force to nut portion 1400 to move nut portion 1400 in the direction of arrow 1600.

Figure 17:
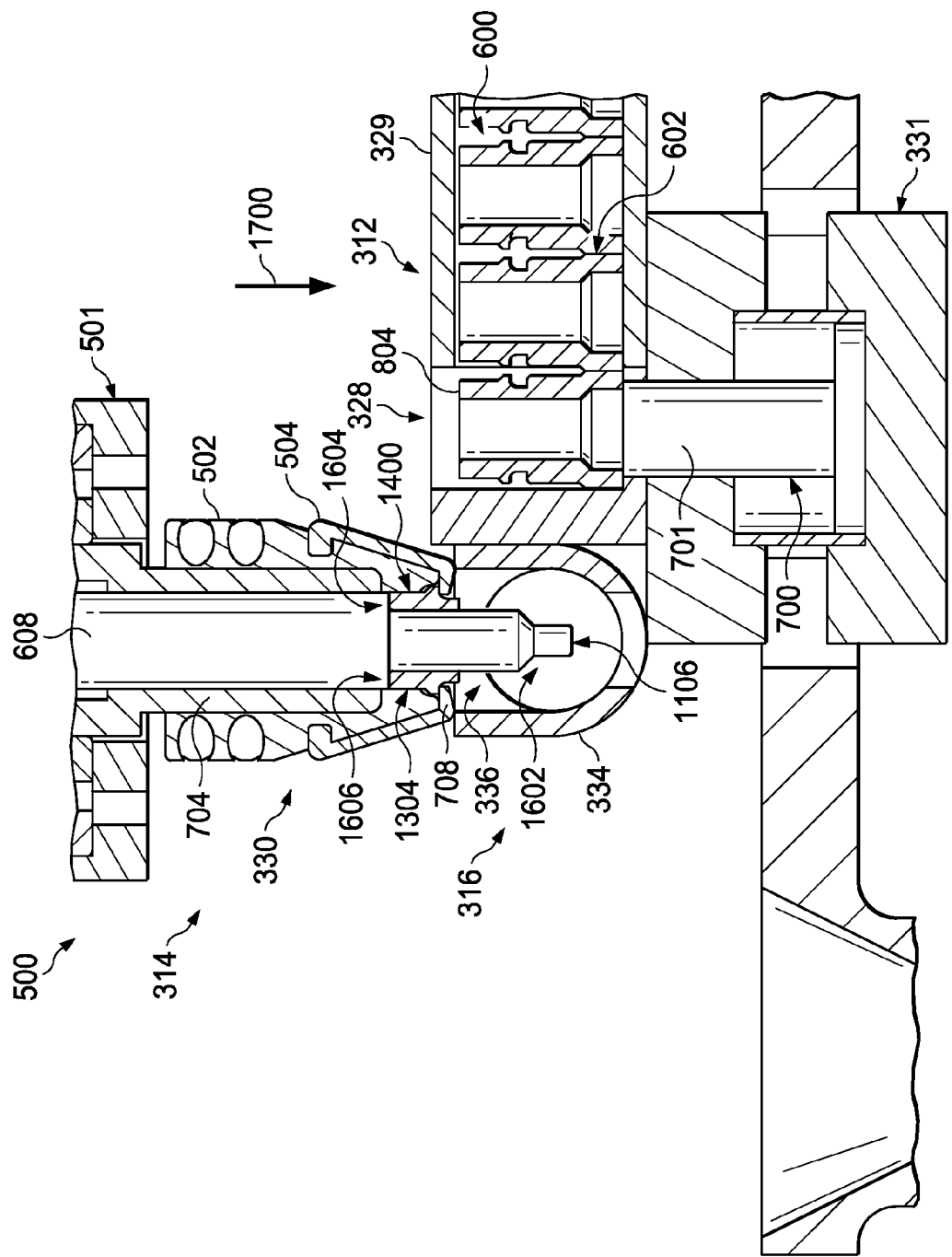
FIG. 17 is an illustration of an interface feature of an elongate member engaged with a nut portion in accordance with an illustrative embodiment.

With reference now to FIG. 17, an illustration of interface feature 1604 of elongate member 608 engaged with nut portion 1400 is depicted in accordance with an illustrative embodiment. In this illustrative example, interface feature 1604 has engaged with end 1606 of nut portion 1400. Further application of force in the direction of arrow 1700 will cause nut portion 1400 to be released from retaining member 504 and pushed into channel 1602 within vacuum tube 334.

Figure 18:
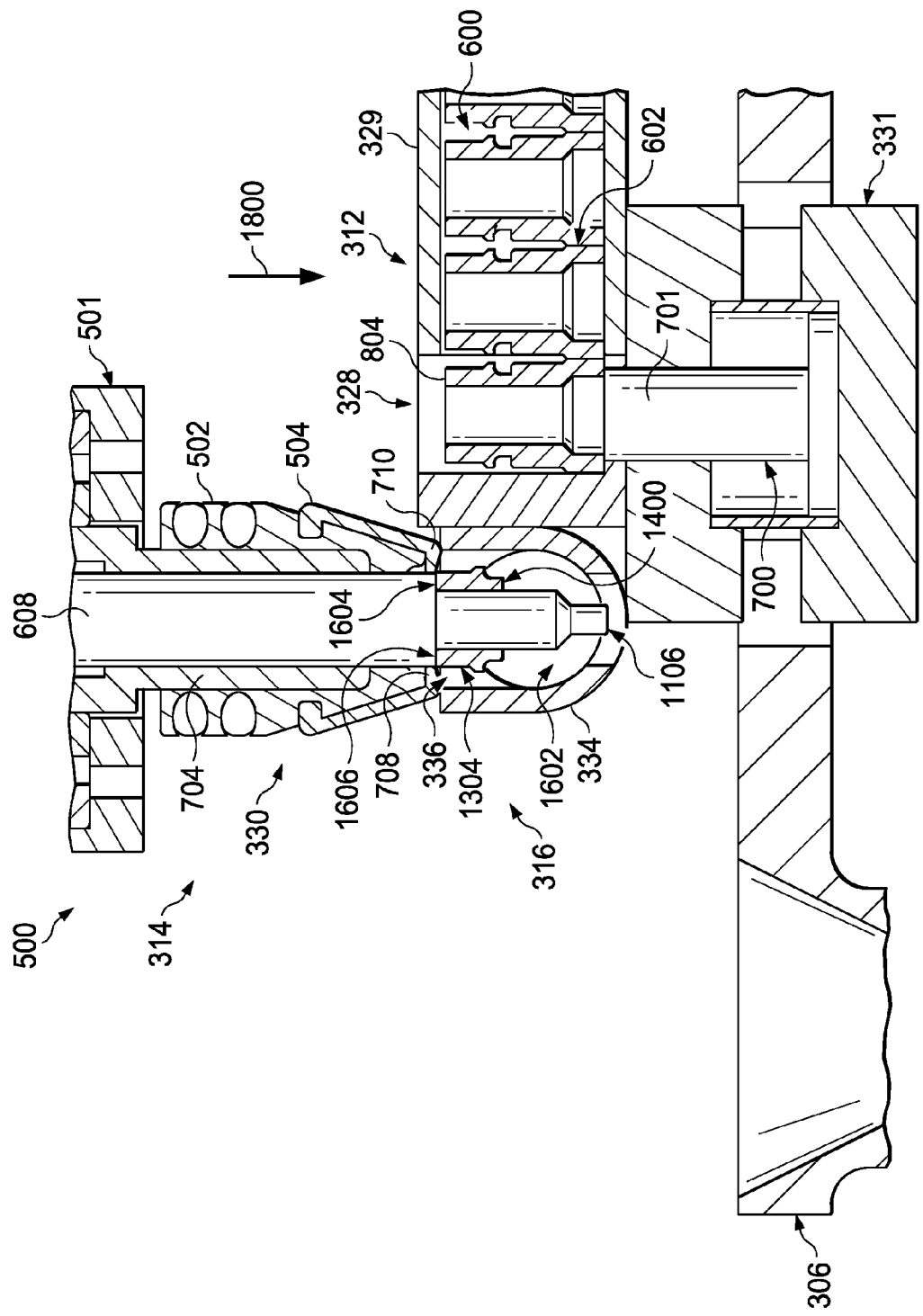
FIG. 18 is an illustration of a nut portion released from a retaining member in accordance with an illustrative embodiment.

Turning now to FIG. 18, an illustration of nut portion 1400 released from retaining member 504 is depicted in accordance with an illustrative embodiment. In FIG. 18, retaining member 504 may no longer be retaining nut portion 1400. Nut portion 1400 may be further moved in the direction of arrow 1800 into channel 1602 by the pushing force being applied by elongate member 608 and the pulling force being applied by the vacuum pressure within channel 1602.

Once nut portion 1400 enters channel 1602, the vacuum pressure within channel 1602 may cause nut portion 1400 to be moved through vacuum tube 334 and discarded. In one illustrative example, nut portion 1400 may be discarded into a receptacle or container (not shown) located at the end of vacuum tube 334.

Figure 19:
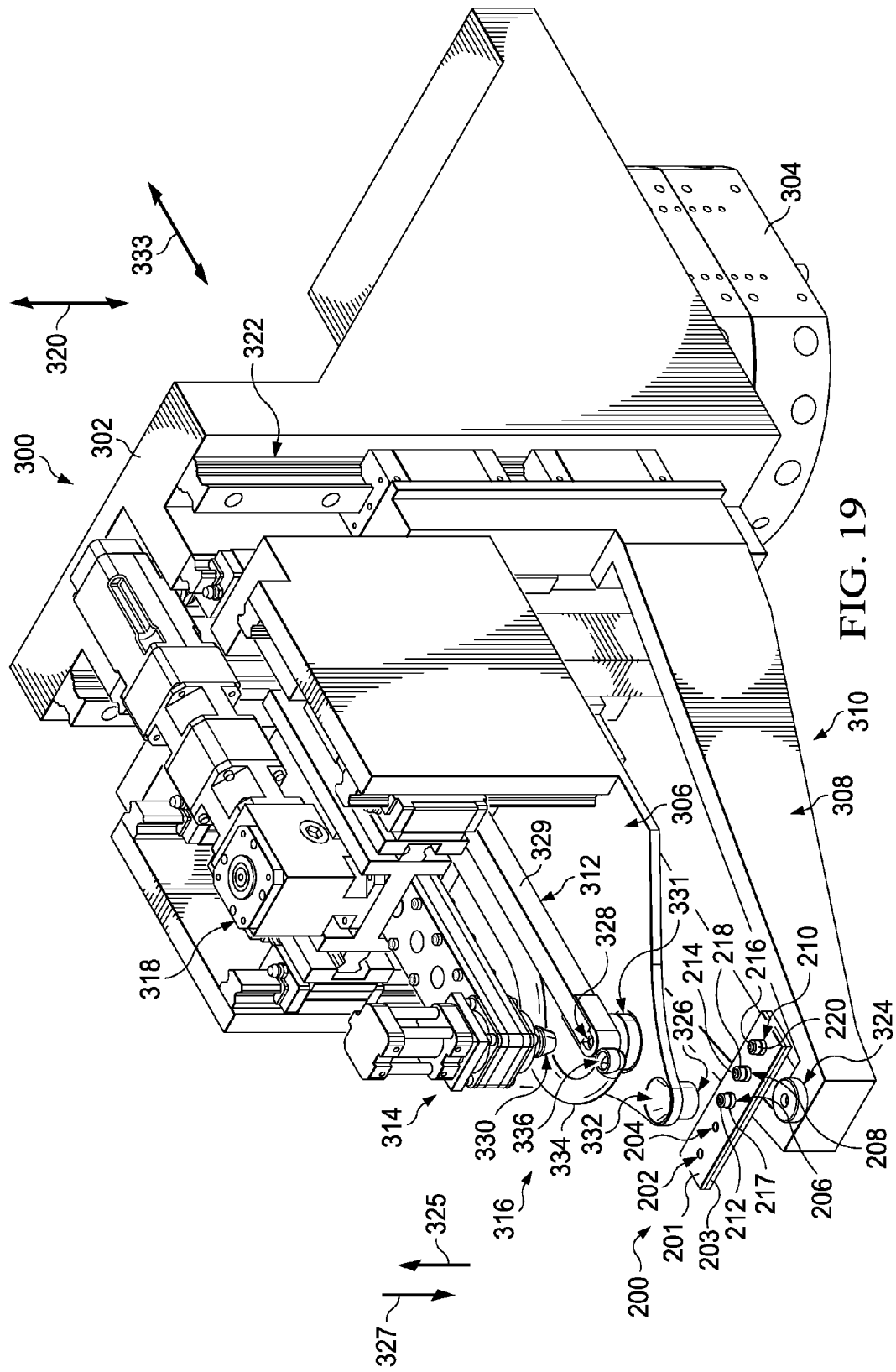
FIG. 19 is an illustration of an isometric view of an end effector unclamped from an object and a collar installed over a fastener in accordance with an illustrative embodiment.

With reference now to FIG. 19, an illustration of an isometric view of end effector 300 unclamped from object 200 and collar 217 installed over fastener 212 is depicted in accordance with an illustrative embodiment. In this illustrative example, first clamping device 306 and second clamping device 308 have been moved away from each other such that end effector 300 may unclamp from object 200. Further, collar 217 is depicted installed over fastener 212.

The illustrations of object 200 in FIG. 2 and end effector 300 in FIGS. 3-19 are not meant to imply physical or architectural limitations to the manner in which an illustrative embodiment may be implemented. Other components in addition to or in place of the ones illustrated may be used. Some components may be optional.

The different components shown in FIGS. 2-19 may be illustrative examples of how components shown in block form in FIG. 1 can be implemented as physical structures. Additionally, some of the components in FIGS. 2-19 may be combined with components in FIG. 1, used with components in FIG. 1, or a combination of the two.

Figure 20:
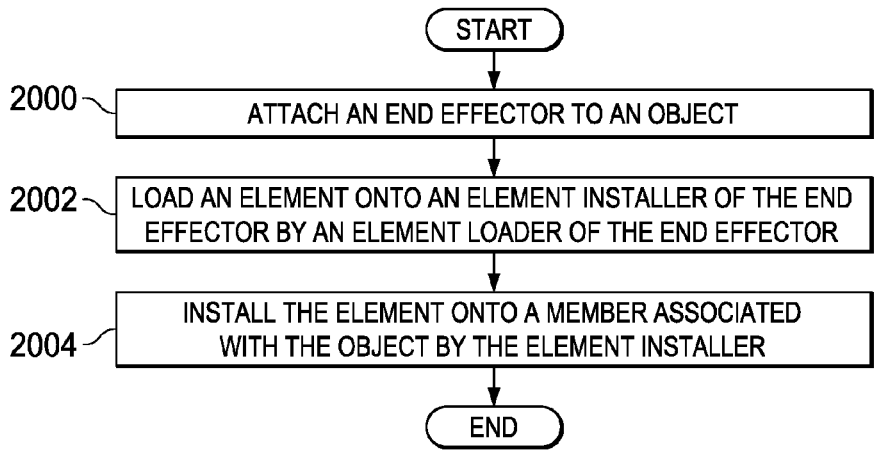
FIG. 20 is an illustration of a process for installing an element over a member associated with an object in the form of a flowchart in accordance with an illustrative embodiment.

With reference now to FIG. 20, an illustration of a process for installing an element over a member associated with an object is depicted in the form of a flowchart in accordance with an illustrative embodiment. The process illustrated in FIG. 20 may be implemented using end effector 102 in FIG. 1.

The process may begin by attaching end effector 102 to object 106 (operation 2000). Object 106 may be, for example, without limitation, a stackup of first part 108 and second part 110. Next, an element from number of elements 112 may be loaded onto element installer 128 of end effector 102 by element loader 126 of end effector 102 (operation 2002). The element may take the form of, for example, without limitation, frangible collar 145.

Thereafter, the element may be installed onto a member associated with object 106 by element installer 128 (operation 2004), with the process terminating thereafter. The member associated with object 106 may take the form of, for example, without limitation, threaded fastener 143 already installed in object 106.

Figure 21:
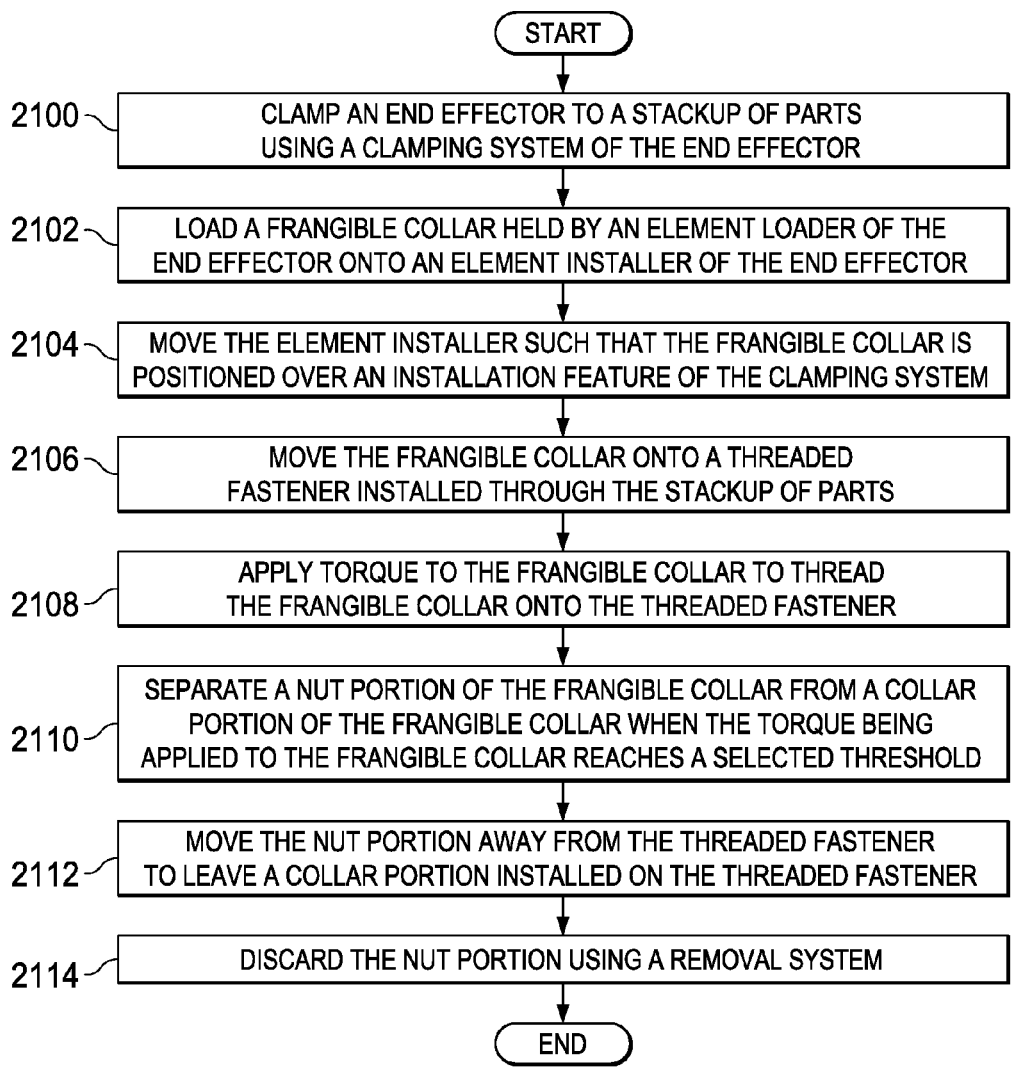
FIG. 21 is an illustration of a process for installing a frangible collar onto a threaded fastener in the form of a flowchart in accordance with an illustrative embodiment.

Turning now to FIG. 21, an illustration of a process for installing a frangible collar onto a threaded fastener is depicted in the form of a flowchart in accordance with an illustrative embodiment. The process illustrated in FIG. 21 may be implemented using end effector 102 in FIG. 1.

The process may begin by clamping end effector 102 to a stackup of parts using clamping system 136 of end effector 102 (operation 2100). Next, frangible collar 145 held by element loader 126 of end effector 102 may be loaded onto element installer 126 of end effector 102 (operation 2102).

Element installer 128 may then be moved such that frangible collar 145 is positioned over installation feature 142 of clamping system 136 (operation 2104). Thereafter, element installer 128 may move frangible collar 145 onto threaded fastener 143 installed through the stackup of parts through installation feature 142 (operation 2106).

Torque 153 may be applied to frangible collar 145 to thread frangible collar 145 onto threaded fastener 143 (operation 2108). Nut portion 151 of frangible collar 145 may be separated from collar portion 160 of frangible collar 145 when torque 153 being applied to frangible collar 145 reaches selected threshold 162 (operation 2110). Nut portion 151 may then be moved away from threaded fastener 143 to leave collar portion 160 installed on threaded fastener 143 (operation 2112). Nut portion 151 may then be discarded using removal system 132 (operation 2114), with the process terminating thereafter. In this manner, a collar may be installed on threaded fastener 143.

Illustrative embodiments of the disclosure may be described in the context of aircraft manufacturing and service method 2200 as shown in FIG. 22 and aircraft 2300 as shown in FIG. 23. Turning first to FIG. 22, an illustration of an aircraft manufacturing and service method is depicted in the form of a block diagram in accordance with an illustrative embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 may go through certification and delivery 2210 in order to be placed in service 2212. While in service 2212 by a customer, aircraft 2300 in FIG. 23 is scheduled for routine maintenance and service 2214, which may include modification, reconfiguration, refurbishment, and other maintenance or service.

Each of the processes of aircraft manufacturing and service method 2200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft is depicted in the form of a block diagram in which an illustrative embodiment may be implemented. In this example, aircraft 2300 is produced by aircraft manufacturing and service method 2200 in FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2200 in FIG. 22. In particular, end effector 102 from FIG. 1 may be used to install elements, such as, for example, number of frangible elements 116 in FIG. 1 during any one of the stages of aircraft manufacturing and service method 2200. For example, without limitation, end effector 102 from FIG. 1 may be used install number of frangible collars 120 onto number of threaded fasteners 118 during at least one of component and subassembly manufacturing 2206, system integration 2208, routine maintenance and service 2214, or some other stage of aircraft manufacturing and service method 2200. Further, number of frangible collars 120 may be installed to join together parts for different structures of airframe 2302 and/or interior 2306 in FIG. 23.

In one illustrative example, components or subassemblies produced in component and subassembly manufacturing 2206 in FIG. 22 may be fabricated or manufactured in a manner similar to components or subassemblies produced while aircraft 2300 is in service 2212 in FIG. 22. As yet another example, one or more apparatus embodiments, method embodiments, or a combination thereof may be utilized during production stages, such as component and subassembly manufacturing 2206 and system integration 2208 in FIG. 22. One or more apparatus embodiments, method embodiments, or a combination thereof may be utilized while aircraft 2300 is in service 2212 and/or during maintenance and service 2214 in FIG. 22. The use of a number of the different illustrative embodiments may substantially expedite the assembly of and/or reduce the cost of aircraft 2300.

In one illustrative embodiment, an apparatus may comprise an attachment system, an element loader, and an element installer. The attachment system may be configured to attach the end effector to an object. The element loader may be configured to hold a number of elements. The element installer may be configured to receive an element in the number of elements from the element loader. The element installer may be further configured to install the element onto a member associated with the object.

In some illustrative examples, the element installer is configured to apply a torque to the element to install the element onto the member. The element may be a frangible element comprising a first portion; and a second portion, wherein the first portion is configured to break off from the second portion when the torque being applied to the frangible element reaches a selected threshold. The apparatus may further comprise a removal system configured for use in discarding the first portion of the frangible element. In some illustrative examples, the element installer may comprise a rotatable member configured to rotate the frangible element when the frangible element is placed over the member to apply the torque to the frangible element.

In some illustrative examples, the element installer may comprise a retaining member configured to receive the frangible element from the element loader and retain the frangible element. In these illustrative examples, the retaining member retains the first portion of the frangible element after the first portion breaks away from the second portion of the frangible element. The frangible element may be a frangible collar.

In one illustrative example, the element installer comprises an elongate member configured for use in aligning the element with the member, and an actuation system configured to actuate the elongate member. The member may have a socket and the elongate member may have a tip having a shape configured to fit within the socket.

In one illustrative example, the element loader comprises a holder configured to hold the number of elements, and a loading device configured to load the element onto the element installer. In some illustrative examples, the element is a threaded fastener.

In some illustrative examples, the apparatus further comprises a movement system configured to move the element installer towards and away from the element loader. In some illustrative examples, the attachment system is a clamping system comprising a first clamping device and a second clamping device. In some illustrative examples, the object comprises a first part and a second part and the member is configured for use in joining the first part and the second part to each other.

In another illustrative embodiment, an end effector may comprise an attachment system, an element loader, an element installer, and a removal system. The attachment system may be configured for use in attaching the end effector to an object. The element loader may be configured to hold a number of frangible collars in which a frangible collar in the number of frangible collars may include a nut portion and a collar portion. The element installer may be configured to receive the frangible collar from the element loader. The element installer may comprise a rotatable member and a retaining member. The rotatable member may be configured to rotate the frangible collar when the frangible collar is placed over a threaded fastener associated with the object to install the frangible collar onto the threaded fastener. The nut portion of the frangible collar may be configured to separate from the collar portion of the frangible collar when a torque being applied to the frangible collar by rotation of the frangible collar reaches a selected threshold. The retaining member may be configured to receive the frangible collar from the element loader and retain the frangible collar. The retaining member may retain the nut portion of the frangible collar after the nut portion separates from the collar portion of the frangible collar. The removal system may be configured for use in discarding the nut portion of the frangible collar that separates from the collar portion.

In yet another illustrative embodiment, a method for installing an element over a member associated with an object may be provided. An end effector may be attached to the object. The element may be loaded onto an element installer by an element loader of the end effector. The element may be installed onto the member associated with the object by the element installer. In some illustrative examples, installing the element onto the member associated with the object comprises applying a torque to the element to install the element onto the member, wherein the element is a frangible element. In some illustrative examples, installing the element onto the member associated with the object further comprises separating a first portion of the frangible element from a second portion of the frangible element when the torque being applied to the frangible element reaches a selected threshold. In some illustrative examples, the first portion of the frangible element may be discarded after the first portion has separated from the second portion of the frangible element using a removal system of the end effector.

In some illustrative examples, loading the element onto the element installer comprises moving the element from within a holder of the element loader towards a retaining member of the element installer using a loading device to load the element onto the element installer. In some illustrative examples, moving the element from within the holder of the element loader towards the retaining member of the element installer using the loading device to load the element onto the element installer comprises moving the element from within the holder of the element loader towards the retaining member of the element installer using the loading device until an interface feature of the retaining member snaps into a groove on the element.

In still yet another illustrative embodiment, a method for installing a frangible collar may be provided. An end effector may be clamped to a stackup of parts using a clamping system. A frangible collar held by an element loader of the end effector may be loaded onto an element installer of the end effector. The element installer may be moved such that the frangible collar is positioned over an installation feature of the clamping system. The frangible collar may be moved onto a threaded fastener installed through the stackup of parts through the installation feature. A torque may be applied to the frangible collar to thread the frangible collar onto the threaded fastener. A nut portion of the frangible collar may be separated from a collar portion of the frangible collar when the torque being applied to the frangible collar reaches a selected threshold. The nut portion may be moved away from the threaded fastener to leave the collar portion installed on the threaded fastener. The nut portion may be discarded using a removal system.

Figure 24:
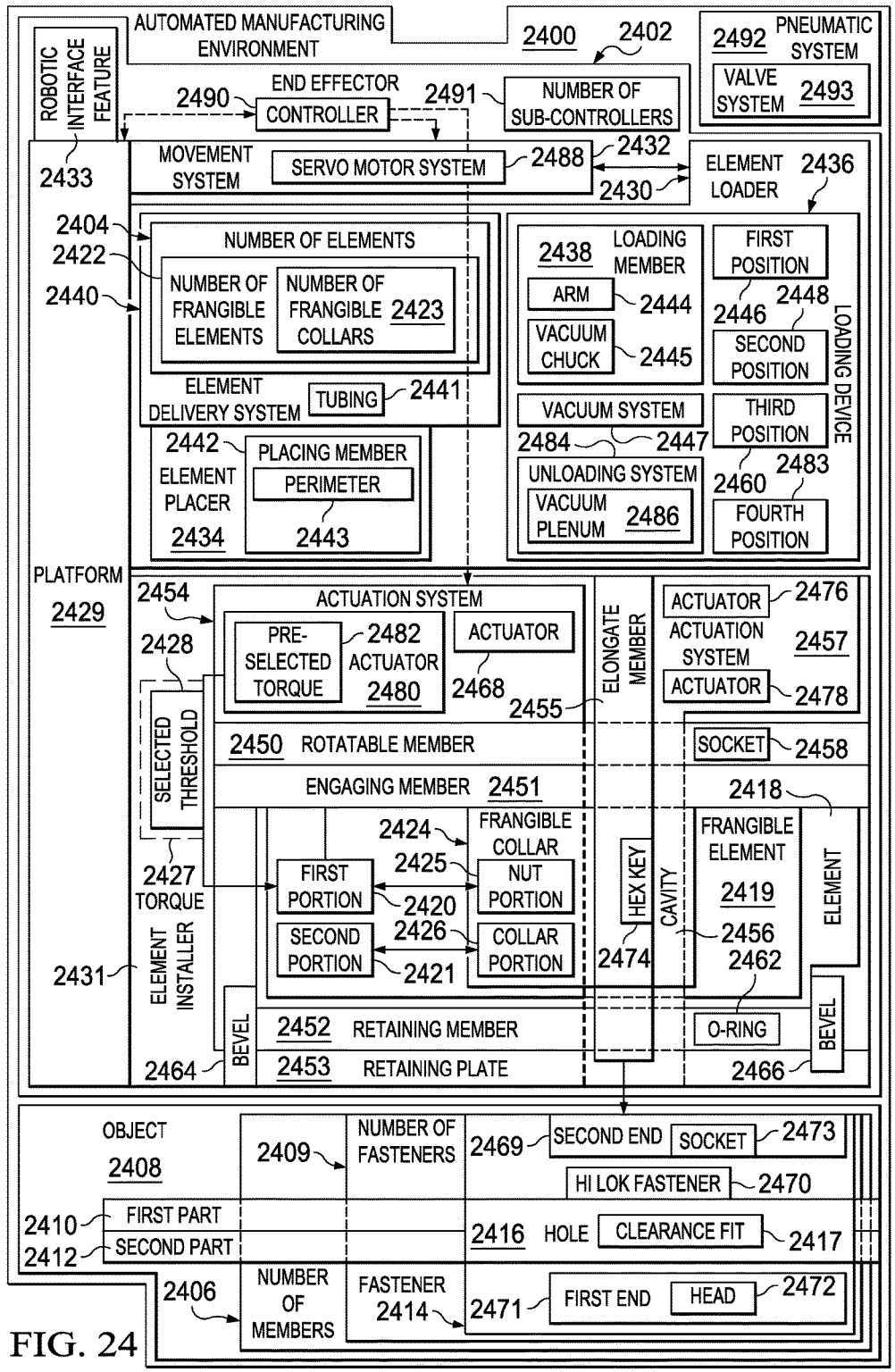
FIG. 24 is an illustration of an end effector in an automated manufacturing environment in the form of a block diagram in accordance with an illustrative embodiment.

Turning now to FIG. 24, an illustration of an end effector in an automated manufacturing environment in the form of a block diagram is depicted in accordance with an illustrative embodiment. Automated manufacturing environment 2400 may be an illustrative example of manufacturing environment 100 of FIG. 1. End effector 2402 may be an illustrative example of end effector 102 of FIG. 1.

End effector 2402 may be configured to be moved and, in some cases, operated by robotic device 104 of FIG. 1. End effector 102 may be associated with robotic device 104.

End effector 2402 may install number of elements 2404 onto number of members 2406 on object 2408. Number of members 2406 may take the form of number of fasteners 2409. Object 2408 may take a number of different forms. For example, without limitation, object 2408 may be a single part, a sub-assembly, or an assembly of parts. In this illustrative example, object 2408 may be a stackup of parts that includes, for example, without limitation, first part 2410 and second part 2412. End effector 2402 may be configured to install number of elements 2404 onto number of members 2406 already installed in object 2408.

In one illustrative example, fastener 2414 may be inserted into hole 2416 in both first part 2410 and second part 2412 to join these two parts together. Hole 2416 may have clearance fit 2417. Clearance fit 2417 is when a shaft of fastener 2414 may rotate or slide freely within hole 2416. Clearance fit 2417 may also be referred to as a "sliding fit." Element 2418 may be installed onto fastener 2414 to secure fastener 2414 to first part 2410 and second part 2412 such that first part 2410 and second part 2412 may remain joined together.

Element 2418 may take the form of frangible element 2419 in this illustrative example. Frangible element 2419 may have first portion 2420 configured to break off from second portion 2421 of frangible element 2419. Element 2418 may be one of number of elements 2404. Number of elements 2404 may take the form of number of frangible elements 2422. In some illustrative examples, number of elements 2404 may take the form of number of frangible collars 2423.

Frangible collar 2424 may be an example of a frangible collar in number of frangible collars 2423. In particular, frangible collar 2424 may be an example of one implementation for frangible element 2419. As depicted, frangible collar 2424 may have nut portion 2425 configured to break away from collar portion 2426 of frangible collar 2424 in response to torque 2427 that is being applied to frangible collar 2424 reaching selected threshold 2428. Nut portion 2425 and collar portion 2426 of frangible collar 2424 may be examples of first portion 2420 and second portion 2421, respectively, of frangible element 2419.

End effector 2402 may be used to automate the process of installing number of frangible collars 2423 on number of fasteners 2409. As depicted, end effector 2402 may include platform 2429, element loader 2430, element installer 2431, and movement system 2432. Element loader 2430, element installer 2431, and/or movement system 2432 may be associated with platform 2429.

In this illustrative example, robotic interface feature 2433 may be associated with platform 2429. Robotic interface feature 2433 may be an interface for use in attaching end effector 2402 to robotic device 104 of FIG. 1. Robotic device 104 may be used to move end effector 2402 relative to object 2408. For example, without limitation, robotic device 104 may move platform 2429 of end effector 2402 to position end effector 2402 relative to object 2408.

Once fastener 2414 has been installed, a frangible collar, such as frangible collar 2424, may be installed onto fastener 2414. Element loader 2430 and element installer 2431 may be used to perform this installation. Element loader 2430 may be configured to hold number of elements 2404. Element installer 2431 may receive element 2418 of number of elements 2404 from element loader 2430 and may install element 2418 onto a member in the form of fastener 2414 associated with object 2408. Element installer 2431 may have a mode of operation in which element installer 2431 applies torque 2427 to element 2418 to install element 2418 onto the member.

As depicted, element loader 2430 may include element placer 2434 and loading device 2436. Loading device 2436 may be used to load frangible collar 2424 onto element installer 2431. Loading device 2436 may include, for example, without limitation, loading member 2438 that may be moved relative to element installer 2431 to load frangible collar 2424 onto element installer 2431.

Number of elements 2404 may be delivered to element loader 2430 by element delivery system 2440. Element loader 2430 may comprise loading device 2436 rotatable relative to element delivery system 2440 and element installer 2431. Element delivery system 2440 may include tubing 2441. Tubing 2441 may be connected to equipment outside of end effector 2402. In some illustrative examples, the equipment may take the form of a vibratory bowl and escapement outside of end effector 2402. An element in number of elements 2404 may be vibrated in the vibratory bowl until the element is facing a desired direction. The element may then travel through tubing 2441 under pneumatic pressure to element placer 2434.

Element placer 2434 may include placing member 2442 having perimeter 2443. Perimeter 2443 may be sized to encompass an element of number of elements 2404, such as element 2418. Perimeter 2443 may be sized to retain an element in number of elements 2404 until it can be removed from element placer 2434 by loading device 2436.

Loading member 2438 of loading device 2436 may move relative to element placer 2434. Loading member 2438 may include arm 2444 and vacuum chuck 2445. To remove an element from element placer 2434, arm 2444 may be moved such that arm 2444 is positioned relative to element placer 2434. For example, arm 2444 may be inserted into an element in number of elements 2404. When arm 2444 is positioned relative to element placer 2434, loading member 2438 is in first position 2446. When arm 2444 is in first position 2246, vacuum chuck 2445 may be activated. When vacuum chuck 2445 is activated, vacuum system 2447 may supply vacuum to vacuum chuck 2445. When vacuum chuck 2445 is activated, the element may be held on arm 2444. To remove the element from element placer 2434, arm 2444 may be moved away from element placer 2434 while vacuum chuck 2445 is activated.

To transfer an element such as element 2418 to element installer 2431, loading member 2438 may be moved relative to second position 2448 relative to element installer 2431. Element installer 2431 may include rotatable member 2450 having engaging member 2451 and retaining member 2452. Rotatable member 2450 may be axially movable relative to fastener 2414 and rotatable about an axis of fastener 2414 in which rotatable member 2450 encompasses element 2418 to install on fastener 2414. Engaging member 2451 may be associated with retaining plate 2453. Actuation system 2454 may be associated with rotatable member 2450 to move rotatable member 2450 relative to object 2408. Actuation system 2454 may be configured to move element installer 2431 towards and away from element loader 2430. Elongate member 2455 may extend through cavity 2456 of rotatable member 2450. Actuation system 2457 may be associated with elongate member 2455 to move elongate member 2455 relative to at least one of rotatable member 2450 and object 2408.

Rotatable member 2450 may take the form of socket 2458. Socket 2458 may receive element 2418 from loading device 2436 when loading member 2438 is in second position 2448. For example, when loading member 2438 is in second position 2448, rotatable member 2450 may be moved towards loading member 2438 to receive element 2418. When rotatable member 2450 is socket 2458, rotatable member 2450 may be moved towards loading member 2438 in second position 2448 until socket 2458 encompasses element 2418. When element 2418 is positioned in socket 2458, vacuum chuck 2445 of loading member 2438 may be deactivated. In some illustrative examples, when element 2418 is positioned in socket 2458, vacuum system 2447 may be reversed to provide an air blast to vacuum chuck 2445 to seat element 2418 within socket 2458. Afterwards, rotatable member 2450 may be moved away from loading member 2438. By moving rotatable member 2450 away from loading member 2438, rotatable member 2450 may remove element 2418 from loading member 2438.

Loading member 2438 may then be moved away from element installer 2431 to third position 2460. Third position 2460 may be a position such that loading device 2436 may not interfere with the installation of element 2418. Third position 2460 may be an "at rest" position for loading member 2438.

As loading member 2438 is moved away from rotatable member 2450, retaining member 2452 may retain element 2418 within rotatable member 2450. Retaining member 2452 may take the form of o-ring 2462. O-ring 2462 may be positioned between rotatable member 2450 and retaining plate 2453. In some illustrative examples, o-ring 2462 may be positioned within bevel 2464 of rotatable member 2450 and bevel 2466 of retaining plate 2453.

O-ring 2462 may retain element 2418 by contacting second portion 2421 of element 2418. The diameter of o-ring 2462 may be adjusted by changing at least one of the shape of bevel 2464, the shape of bevel 2466, or the distance between retaining plate 2453 and rotatable member 2450. Element 2418 may be retained in socket 2458 with adjustable o-ring 2462.

While element 2418 is retained within rotatable member 2450, rotatable member 2450 may be moved towards object 2408. Rotatable member 2450 may be moved towards object 2408 by actuator 2468 of actuation system 2454. Actuator 2468 may be a servo pneumatic actuator, an electric servo motor, a pneumatic actuator with fixed hard stops, a hydraulic actuator with fixed hard stops, or any other desirable type of actuator.

Element 2418 may be installed over second end 2469 of fastener 2414. In some illustrative examples, fastener 2414 may take the form of hi lok fastener 2470. Fastener 2414 may have first end 2471 and second end 2469 in which first end 2471 is head 2472 of fastener 2414. Second end 2469 may be a portion of a threaded section of fastener 2414. Second end 2469 may include socket 2473.

In other words, fastener 2414 may have a depression at second end 2469 of fastener 2414 that forms socket 2473 configured to receive an object having substantially the same shape as socket 2473. In this example, socket 2473 may have a hexagonal shape. Fastener 2414 may be a socket screw, also referred to as a socketed bolt.

As rotatable member 2450 is moved towards object 2408, elongate member 2455 may also be moved towards object 2408. Elongate member 2455 may be moved towards object 2408 until elongate member 2455 engages second end 2469. Elongate member 2455 may take the form of hex key 2474. A portion of elongate member 2455 may engage socket 2473 of fastener 2414.

Elongate member 2455 may be moved towards object 2408 by actuator 2476 of actuation system 2457. Actuator 2476 may move elongate member 2455 independent of the movement of rotatable member 2450. When elongate member 2455 encounters socket 2473 of fastener 2414, elongate member 2455 may be rotated by actuator 2478.

In some cases, an end of elongate member 2455 may not readily engage second end 2469 of fastener 2414 when elongate member 2455 is moved towards second end 2469. In other words, elongate member 2455 may not be properly aligned, rotationally, with second end 2469 such that an end is not received within socket 2473 of second end 2469. However, in other cases, the end of elongate member 2455 may readily engage second end 2469 when elongate member 2455 is moved towards fastener 2414.

Elongate member 2455 may be rotated independently of rotatable member 2450. Elongate member 2455 may be rotated such that elongate member 2455 may be inserted into socket 2473. For example, when elongate member 2455 is hex key 2474, elongate member 2455 may be rotated such that hex key 2474 engages socket 2473. Hex key 2474 may have an axial degree of freedom to allow motion between socket 2458 and hex key 2474.

Once elongate member 2455 engages socket 2473, elongate member 2455 may be held substantially stationary relative to object 2408. Elongate member 2455 may restrict fastener 2414 from rotating while element 2418 is installed over fastener 2414. Rotatable member 2450 may be lowered over second end 2469 such that second portion 2421 of element 2418 is lowered over fastener 2414.

Actuator 2480 may be configured to rotate rotatable member 2450 in any number of directions to allow collar portion 2426 of frangible collar 2424 to engage the threads on fastener 2414. Once collar portion 2426 of frangible collar 2424 has engaged the threads on fastener 2414, actuator 2480 may rotate rotatable member 2450 to thread collar portion 2426 onto fastener 2414.

This rotation may result in torque 2427 being applied to frangible collar 2424. Rotatable member 2450 may include engaging member 2451 which engages nut portion 2425. Engaging member 2451 may transfer torque 2427 to nut portion 2425 of frangible collar 2424. When selected threshold 2428 for torque 2427 has been reached, nut portion 2425 may separate from collar portion 2426 of frangible collar 2424. In other words, nut portion 2425 may break away, or break off, from collar portion 2426. However, nut portion 2425 may remain retained by retaining member 2452. In some illustrative examples, nut portion 2425 may also be referred to as a frangible portion.

In this manner, collar portion 2426 of frangible collar 2424 may be installed onto fastener 2414. Actuator 2480 may be programmed to apply pre-selected torque 2482 to frangible collar 2424. Pre-selected torque 2482 may be substantially equal to or greater than selected threshold 2428 for torque 2427. In this manner, any undesired effects on fastener 2414 outside of selected tolerances caused by the threading of collar portion 2426 onto fastener 2414 may be prevented.

Once collar portion 2426 has been installed, actuation system 2454 may move element installer 2431 away from object 2408. Loading device 2436 may then be moved to fourth position 2483 such that unloading system 2484 is positioned below rotatable member 2450.

Unloading system 2484 may be configured to remove first portion 2420 of frangible element 2419 from element installer 2431 following first portion 2420 breaking off from second portion 2421. Unloading system 2484 includes vacuum plenum 2486. Rotatable member 2450 may be lowered to contact unloading system 2484. Vacuum plenum 2486 may be activated to remove nut portion 2425 from rotatable member 2450. In some illustrative examples, vacuum plenum 2486 may be connected to vacuum system 2447. In some illustrative examples, vacuum plenum 2486 may be connected to a different vacuum system. Afterwards, loading device 2436 may be moved away from rotatable member 2450. In some illustrative examples, loading device 2436 may be associated with tubing to dispose of nut portion 2425.

Movement system 2432 may move loading device 2436 to or between at least one of first position 2446, second position 2448, third position 2460, or fourth position 2483. In some illustrative examples, movement system 2432 may be servo motor system 2488. In these illustrative examples, loading device 2436 may be referred to as a servo-controlled loading device.

In this illustrative example, controller 2490 may be configured to control the operation of at least one of end effector 2402, actuation system 2454, movement system 2432, actuation system 2457, or vacuum system 2447. In some illustrative examples, controller 2490 may also be referred to as a robot controller.

Controller 2490 and number of sub-controllers 2491 may be implemented using hardware, software, or a combination of the two. Depending on the implementation, controller 2490 and number of sub-controllers 2491 may be implemented using at least one of a computer system comprised of one or more computers, a processor unit, an integrated circuit, a microprocessor, or some other type of data processing system or processor. Controller 2490 and number of sub-controllers 2491 may be considered part of end effector 2402 in this illustrative example, and may be associated with platform 2429. However, in other illustrative examples, controller 2490 may be considered separate from end effector 2402. For example, without limitation, controller 2490 may be configured to control at least one of actuation system 2454, movement system 2432, actuation system 2457, or vacuum system 2447 using wired and/or wireless connections.

In some illustrative examples, at least one of controller 2490 or number of sub-controllers 2491 may control the application of pneumatic power from pneumatic system 2492. Pneumatic system 2492 may supply pneumatic power to at least one of actuation system 2454, movement system 2432, or actuation system 2457. In some illustrative examples, pneumatic system 2492 may include valve system 2493.

When frangible collar 2424 is installed over fastener 2414, hex key 2474 may engage socket 2473 of second end 2469 of fastener 2414. During installation of frangible collar 2424, the position of first end 2471 may be maintained relative to object 2408. For example, at least one of a tool, a robot, or other desirable component may maintain the position of first end 2471 of fastener 2414 relative to object 2408. In some illustrative examples, a maintenance worker may be positioned on the other side of object 2408 to insert fastener 2414 into object 2408. After insertion of fastener 2414, the maintenance worker may maintain the position of first end 2471 relative to object 2408.

Figure 37:
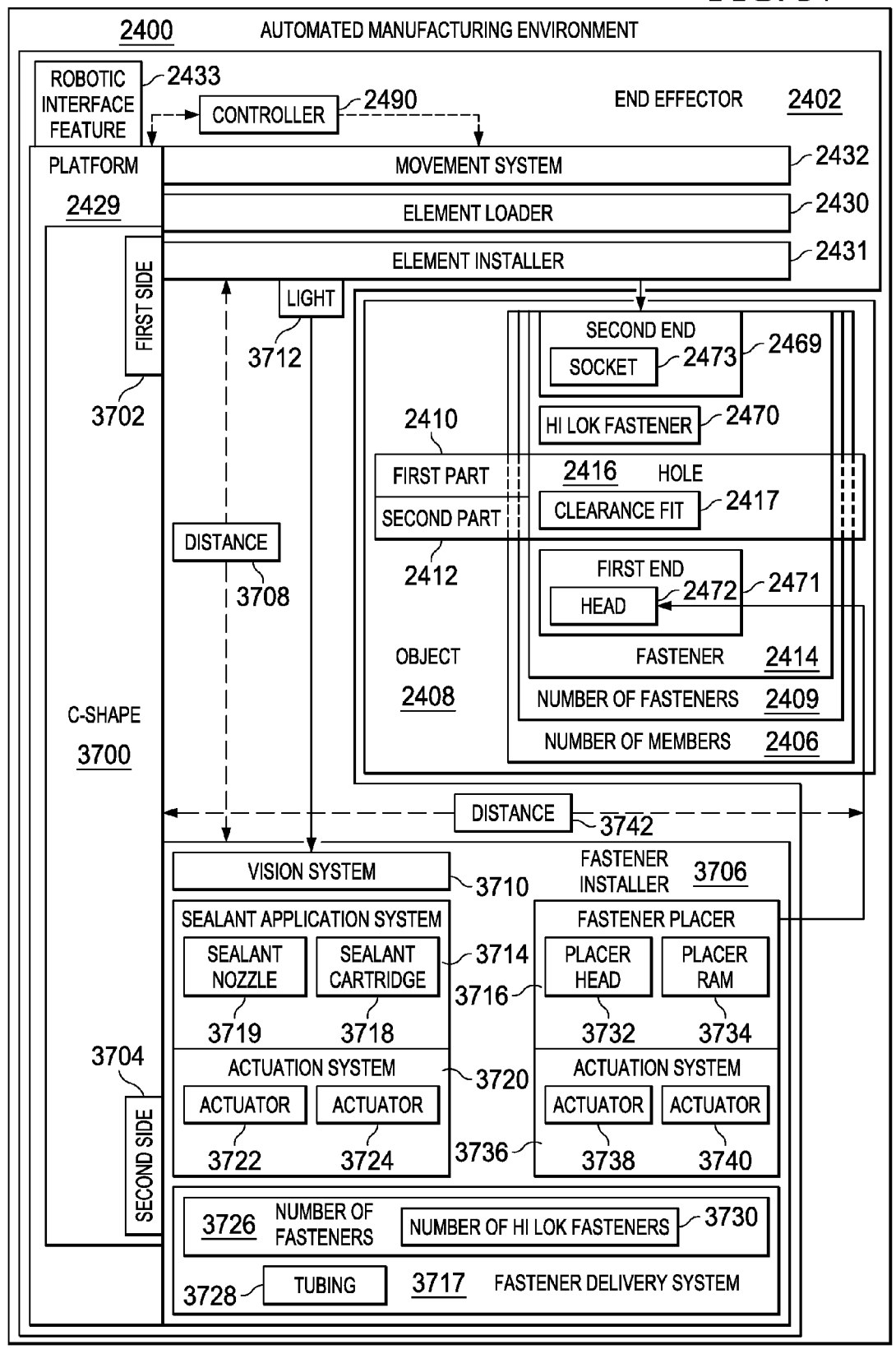
FIG. 37 is an illustration of an end effector in the form of a block diagram in accordance with an illustrative embodiment.

In some illustrative examples, as depicted in FIG. 37 below, end effector 2402 may include other additional components. For example, end effector 2402 may include components to insert fastener 2414 and maintain the position of first end 2471 relative to object 2408.

Figure 25:
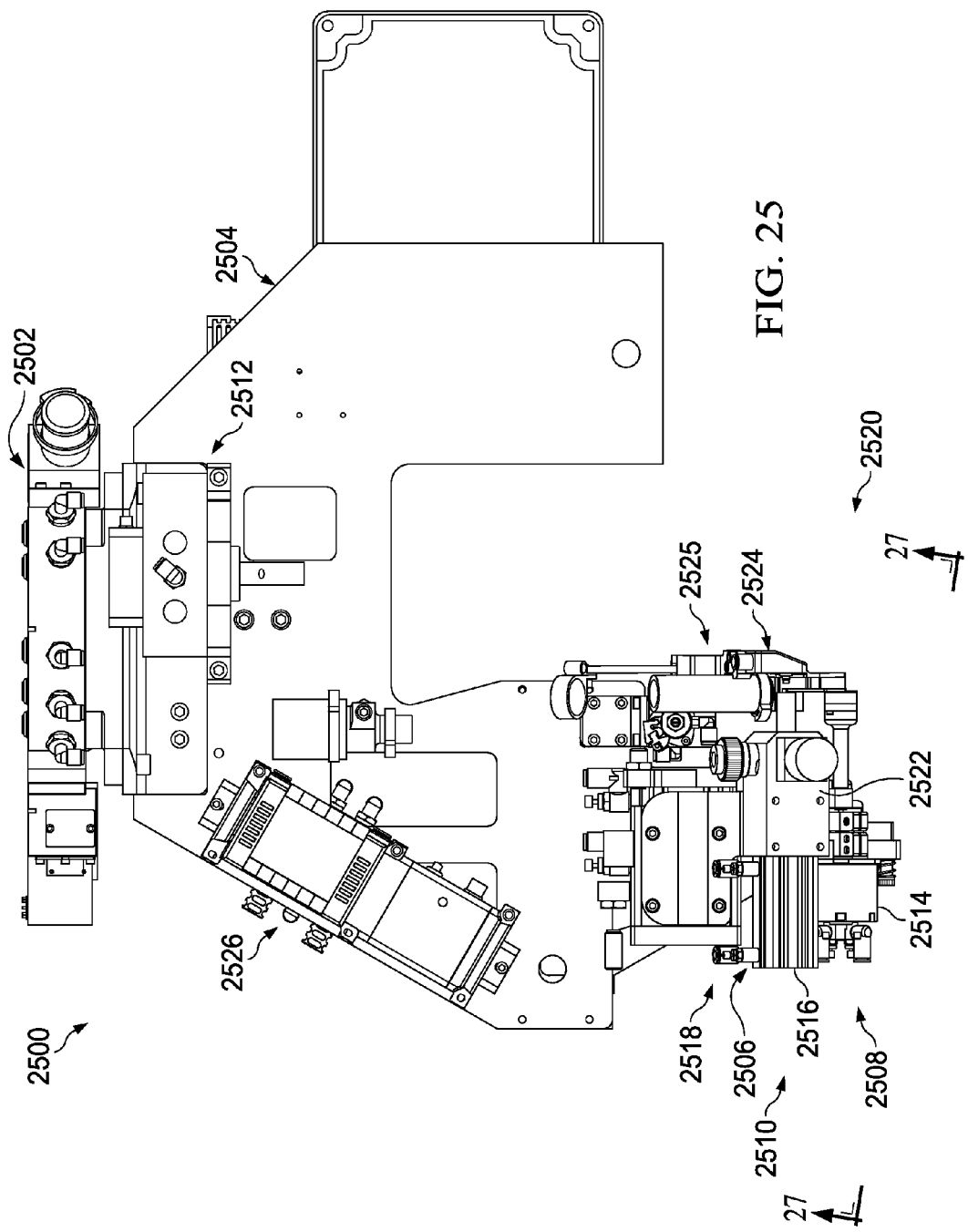
FIG. 25 is an illustration of a side view of an end effector in accordance with an illustrative embodiment.

Turning now to FIG. 25, an illustration of a side view of an end effector is depicted in accordance with an illustrative embodiment. End effector 2500 may be a physical implementation of end effector 2402 of FIG. 24. End effector 2500 may be used in manufacturing environment 100 of FIG. 1.

End effector 2500 may be used to install frangible collar 2424 to hi lok fastener 2470 within hole 2416 having clearance fit 2417 of FIG. 24. End effector 2500 may be connected to robotic device 104 via robotic interface feature 2502.

End effector 2500 has platform 2504. Platform 2504 is associated with element loader 2506, element installer 2508, and movement system 2510. Controller 2512 may be a physical implementation of a controller of number of sub-controllers 2491 of FIG. 24. Controller 2512 may be connected to, and control, any desirable actuator.

As depicted, controller 2512 may be connected to an actuator configured to rotate loading member 2524. End effector 2500 may also include actuator 2514, actuator 2516, and actuator 2518. In some illustrative examples, a controller (not depicted) may control at least one of actuator 2514, actuator 2516, or actuator 2518. Actuator 2514 may be a physical implementation of actuator 2478 of FIG. 24. Actuator 2514 may rotate an elongate member within rotatable member 2520. Actuator 2516 may be a physical implementation of actuator 2476 of FIG. 24. Actuator 2516 actuates a push rod to force a collar out of element placer 2522. Actuator 2518 may move element placer 2522 relative to loading member 2524 of loading device 2525. Actuator 2518 may be a physical implementation of actuator 2468 of FIG. 24.

Power supplied to at least one of actuator 2514, actuator 2516, or actuator 2518 may be supplied using valve system 2526. In some illustrative examples, valve system 2526 may be controlled with a controller, such as controller 2490 of FIG. 24. In some illustrative examples, valve system 2526 may be controlled with a robot controller (not depicted) that may also control motion of end effector 2500. In other illustrative examples, valve system 2526 may be controlled with a controller dedicated to controlling valve system 2526, such as a controller of number of sub-controllers 2491.

Figure 26:
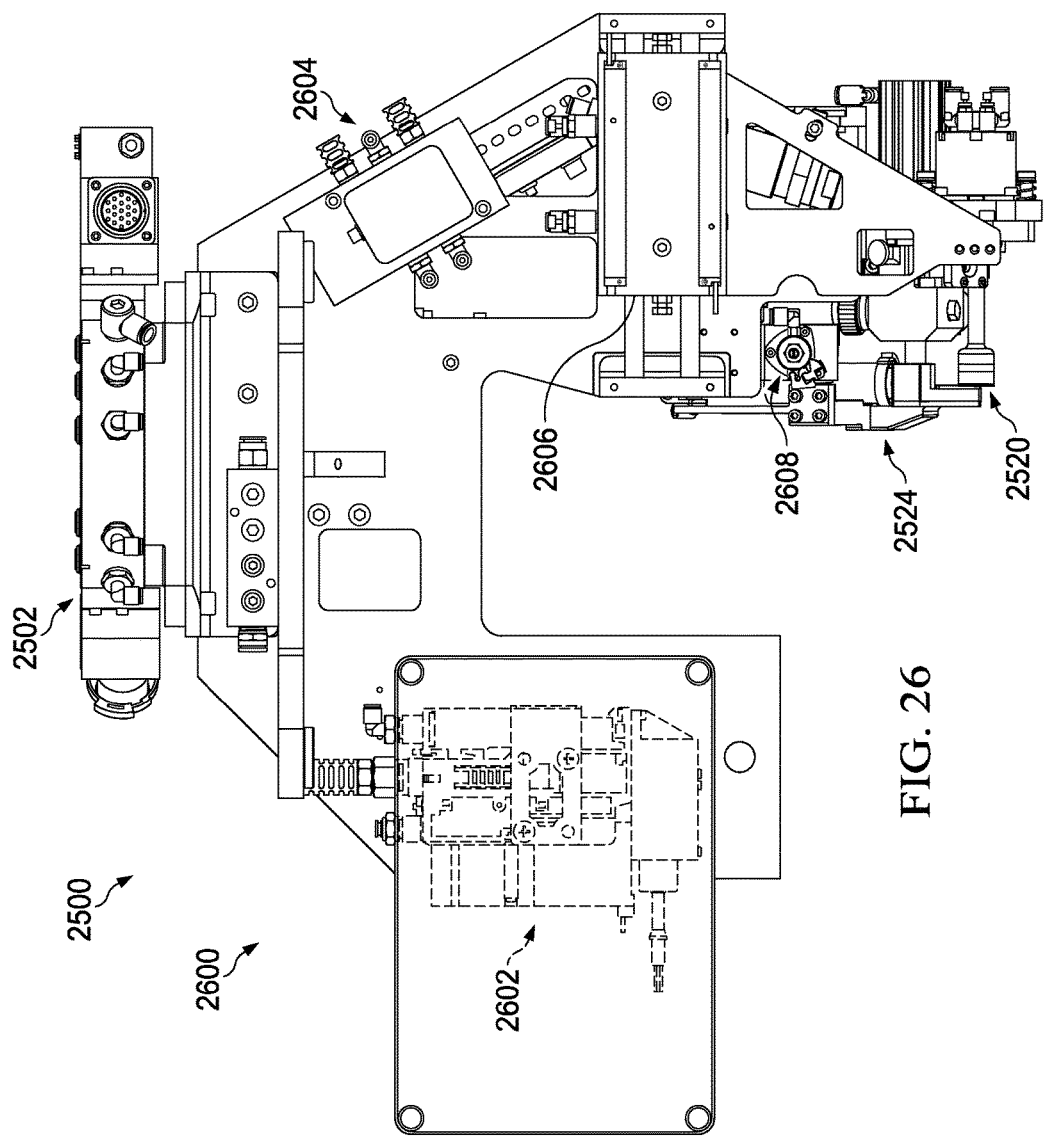
FIG. 26 is an illustration of a side view of an end effector in accordance with an illustrative embodiment.

Turning now to FIG. 26, an illustration of a side view of an end effector is depicted in accordance with an illustrative embodiment. View 2600 is a view of the opposite side of end effector 2500 shown in FIG. 25. In other words, view 2600 is a view of end effector 2500 from a direction coming out of the page of FIG. 25.

End effector 2500 may include vacuum system 2602, controller 2604, actuator 2606, and actuator 2608. Vacuum system 2602 may be a pump to supply vacuum to loading member 2524. Controller 2604 may be a physical implementation of a controller in number of sub-controllers 2491 of FIG. 24. Actuator 2606 may move rotatable member 2520 towards or away from an object having a fastener. Actuator 2606 may be a physical implementation of actuator 2468 of FIG. 24. Actuator 2608 may rotate loading member 2524. Although not depicted in this view, controller 2512 may be connected to actuator 2608. Controller 2512 may control actuator 2608.

Figure 27:
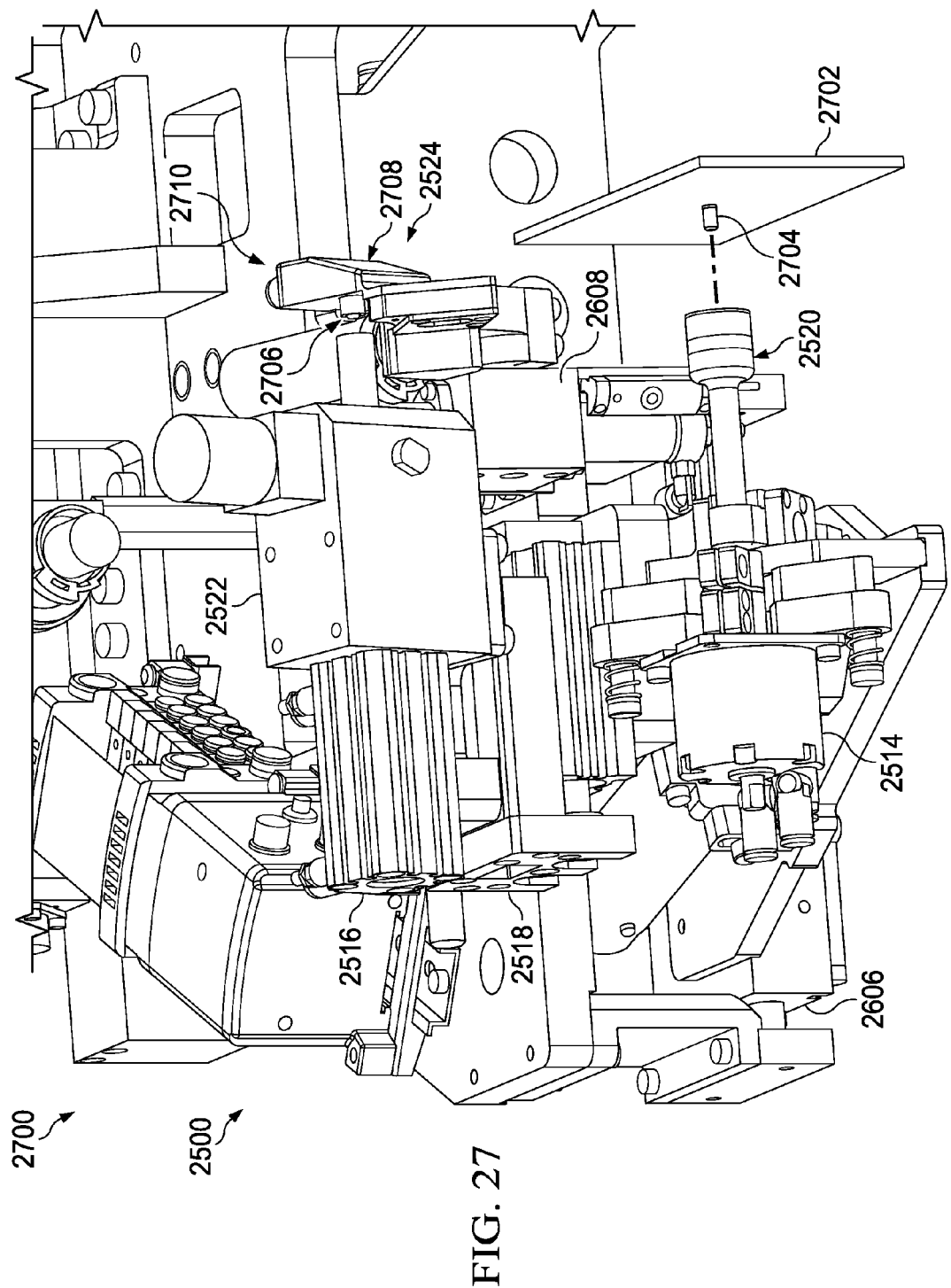
FIG. 27 is an illustration of an isometric side view of an end effector positioned relative to an object in accordance with an illustrative embodiment.

In FIG. 27, an illustration of an isometric side view of an end effector positioned relative to an object is depicted in accordance with an illustrative embodiment. View 2700 may be a view in the direction of lines 27-27 of FIG. 25. In view 2700, object 2702 having fastener 2704 is also present. Rotatable member 2520 may rotate about an axis extending through fastener 2704, as depicted by the dashed line extending through fastener 2704. In view 2700, actuator 2518 has moved element placer 2522 towards loading member 2524. As depicted, element placer 2522 is transferring frangible collar 2706 to arm 2708 of loading member 2524. As depicted, loading member 2524 is in first position 2710. First position 2710 may be a physical implementation of first position 2446 of FIG. 24.

Frangible collar 2706 may have been supplied to element placer 2522 using an element delivery system (not depicted). In some illustrative examples, frangible collar 2706 may be supplied to element placer 2522 using tubing and a pneumatic or vacuum system.

Figure 28:
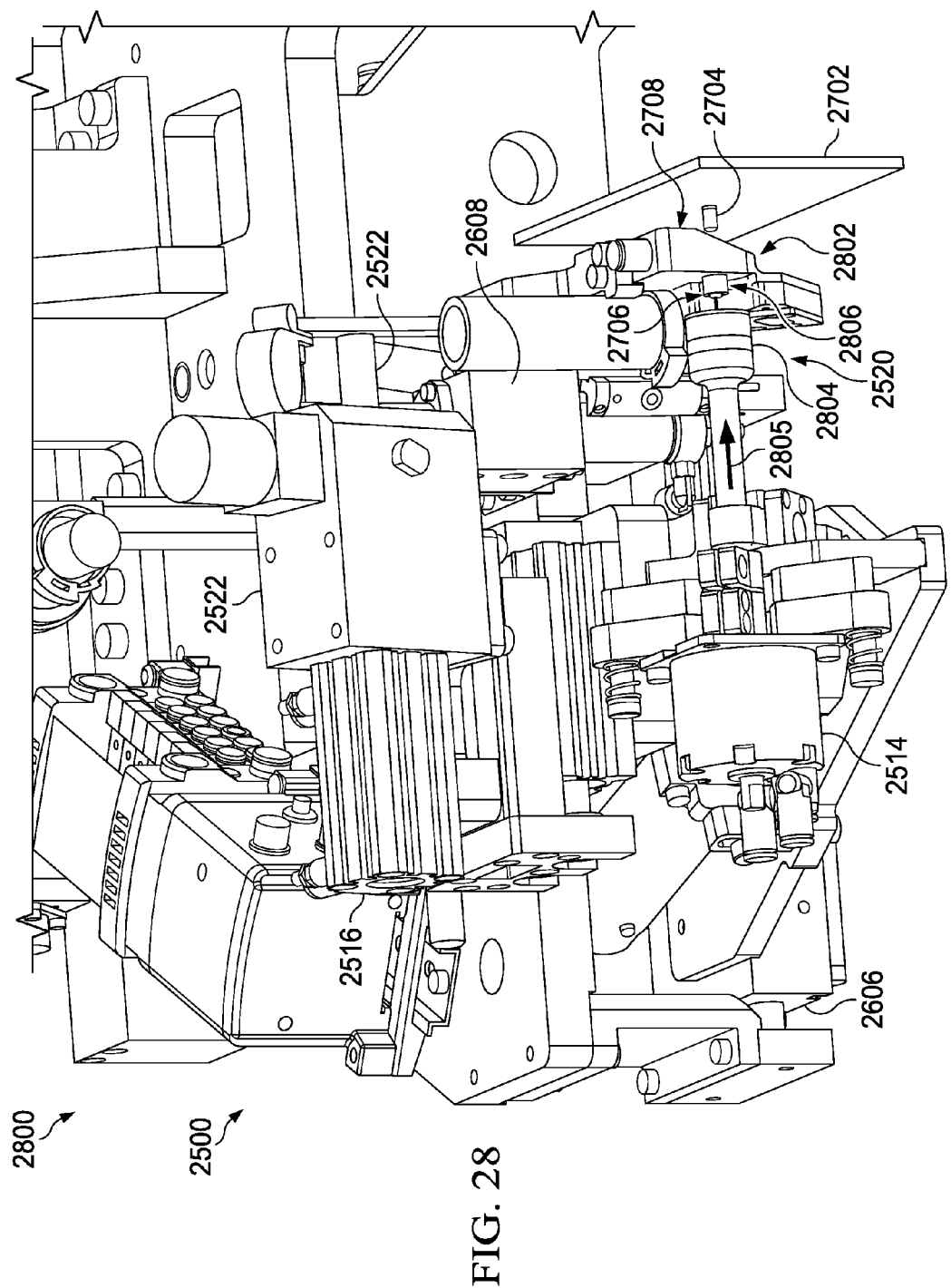
FIG. 28 is an illustration of an isometric side view of an end effector positioned relative to an object in accordance with an illustrative embodiment.

Turning now to FIG. 28, an illustration of an isometric side view of an end effector positioned relative to an object is depicted in accordance with an illustrative embodiment. View 2800 may be another view taken in the direction of lines 27-27 of FIG. 25. In view 2800, object 2702 having fastener 2704 is also present. In view 2800, loading member 2524 is in second position 2802. Second position 2802 may be a physical implementation of second position 2448 of FIG. 24.

When in second position 2802, loading member 2524 may be in a position to provide frangible collar 2706 to rotatable member 2520. Rotatable member 2520 may take the form of socket 2804. Socket 2804 may receive frangible collar 2706 from loading device 2525 when loading member 2524 is in second position 2802. For example, when loading member 2524 is in second position 2802, rotatable member 2520 may be moved towards loading member 2524 in direction 2805 to receive frangible collar 2706. When rotatable member 2520 is socket 2804, rotatable member 2520 may be moved towards loading member 2524 in second position 2802 until socket 2804 encompasses frangible collar 2706. When frangible collar 2706 is positioned in socket 2804, vacuum chuck 2806 of loading member 2524 may be deactivated. In some illustrative examples, when frangible collar 2706 is positioned in socket 2804, a vacuum system, such as vacuum system 2602, may be reversed to provide an air blast to vacuum chuck 2806 to seat frangible collar 2706 within socket 2804. Afterwards, rotatable member 2520 may be moved away from loading member 2524. By moving rotatable member 2520 away from loading member 2524, rotatable member 2520 may remove frangible collar 2706 from loading member 2524.

Figure 29:
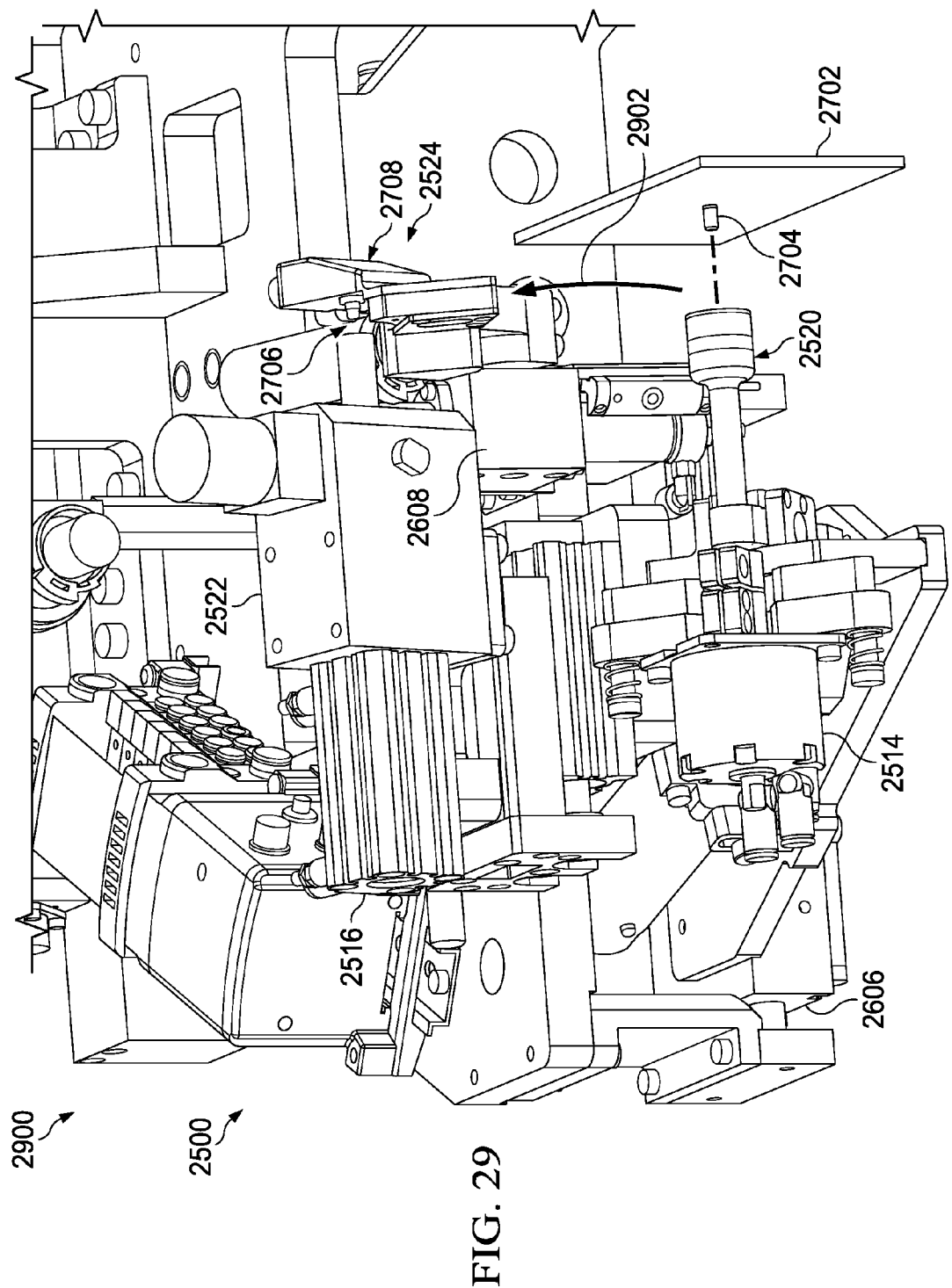
FIG. 29 is an illustration of an isometric side view of an end effector positioned relative to an object in accordance with an illustrative embodiment.

Turning now to FIG. 29, an illustration of an isometric side view of an end effector positioned relative to an object is depicted in accordance with an illustrative embodiment. View 2900 may be another view taken in direction of lines 27-27 of FIG. 25. In view 2900, object 2702 having fastener 2704 is also present. In view 2900, loading member 2524 is moving away from rotatable member 2520. As depicted, loading member 2524 may move in direction 2902 away from second position 2802.

In view 2900, rotatable member 2520 may have been moved away from loading member 2524. By moving rotatable member 2520 away from loading member 2524, rotatable member 2520 may remove frangible collar 2706 from loading member 2524. Accordingly, in view 2900, frangible collar 2706 may be seated within rotatable member 2520.

Figure 30:
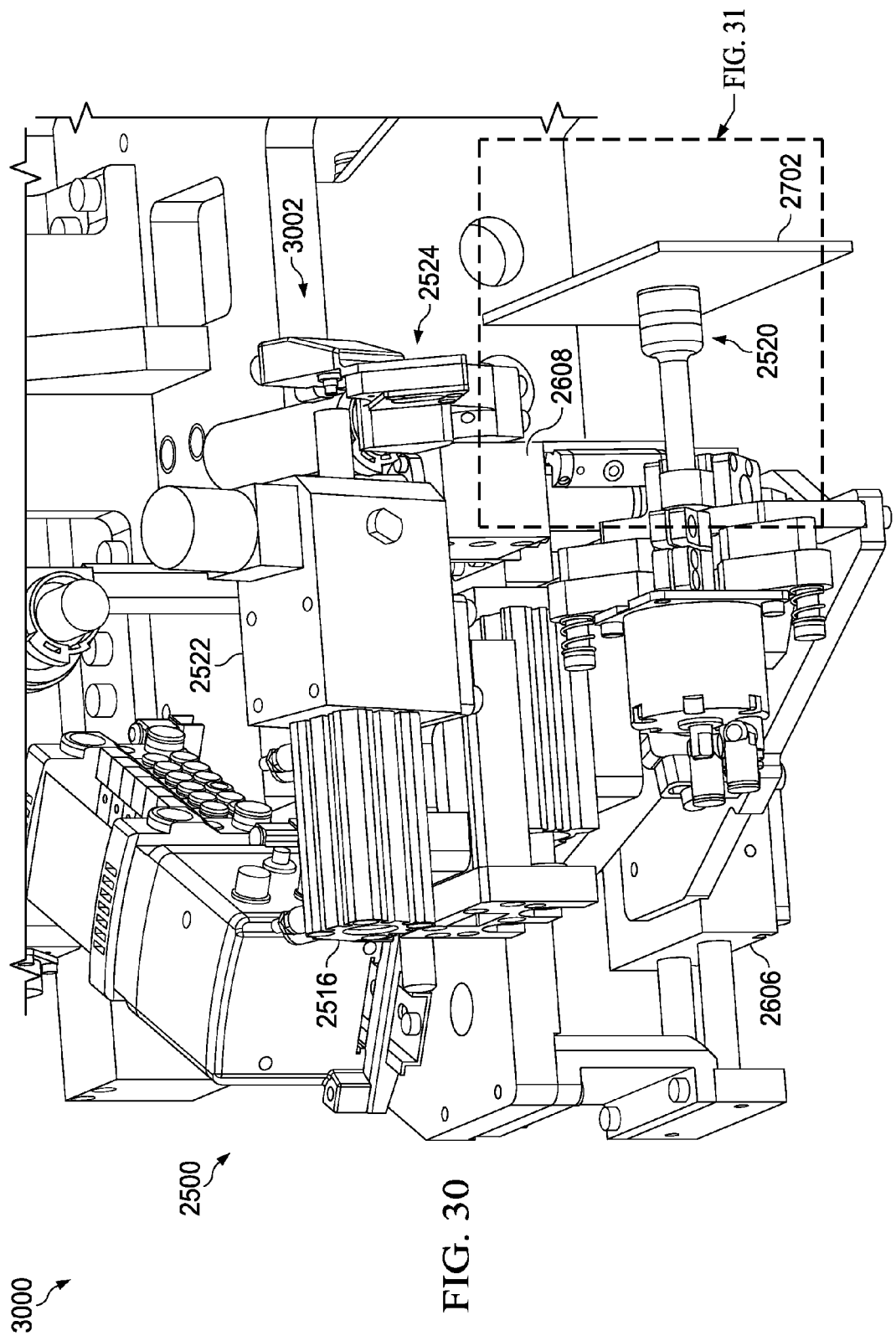
FIG. 30 is an illustration of an isometric side view of an end effector positioned relative to an object in accordance with an illustrative embodiment.

Turning now to FIG. 30, an illustration of an isometric side view of an end effector positioned relative to an object is depicted in accordance with an illustrative embodiment. View 3000 may be another view taken along lines 27-27 of FIG. 25. In view 3000, object 2702 having fastener 2704 (not depicted) is also present. As depicted, rotatable member 2520 has been moved toward object 2702 such that rotatable member 2520 covers a portion of fastener 2704. As depicted, rotatable member 2520 may be installing frangible collar 2706 onto fastener 2704.

In view 3000, loading member 2524 has moved to third position 3002. In third position 3002, loading member 2524 may not obstruct movement of rotatable member 2520 relative to object 2702.

Figure 31:
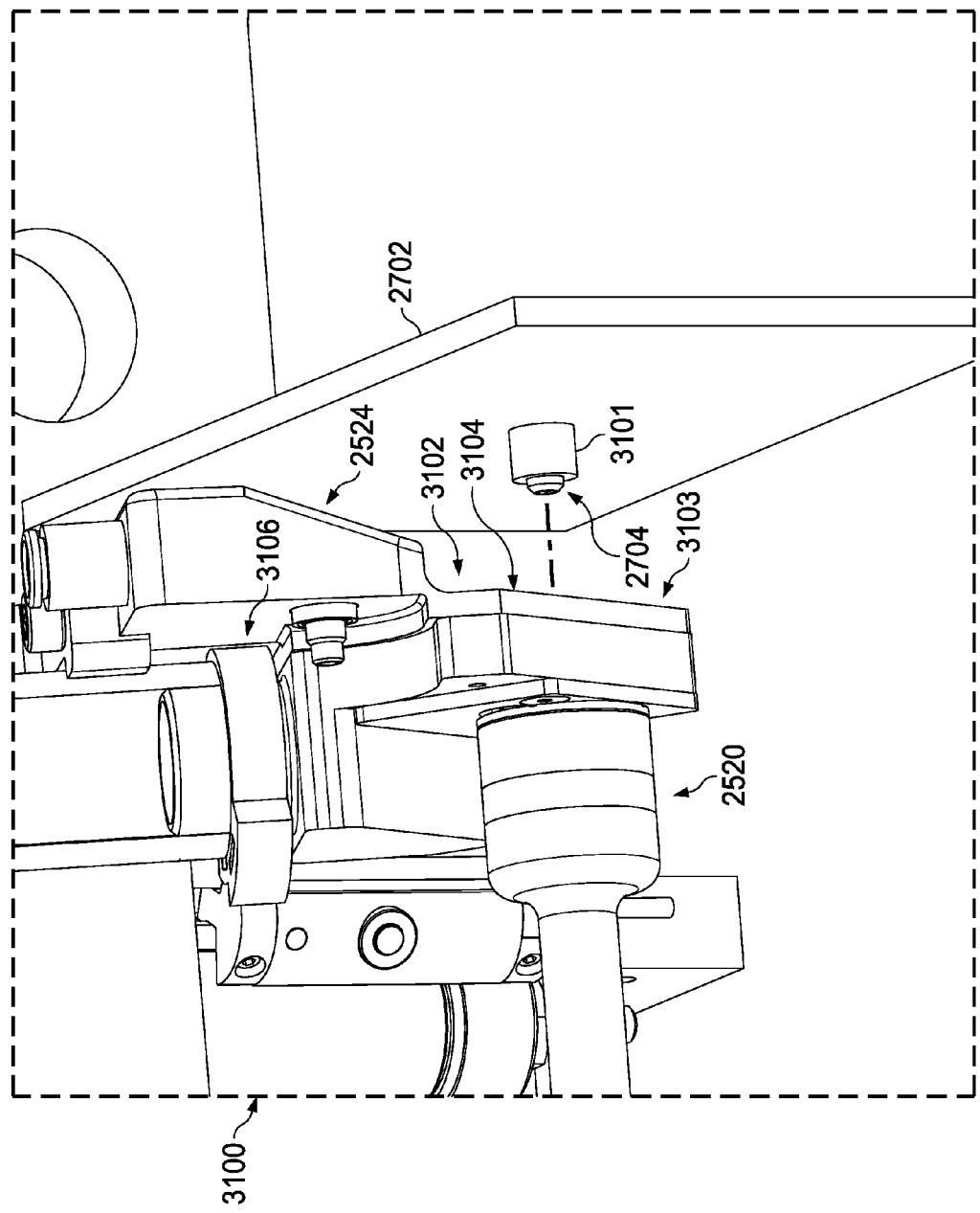
FIG. 31 is an illustration of an isometric side view of an end effector positioned relative to an object in accordance with an illustrative embodiment.

Turning now to FIG. 31, an illustration of an isometric side view of an end effector positioned relative to an object is depicted in accordance with an illustrative embodiment. View 3100 may be a view within box 31 of FIG. 30. In view 3100, object 2702 having fastener 2704 is also present. As depicted, rotatable member 2520 may have installed collar portion 3101 of frangible collar 2706 onto fastener 2704. Nut portion (not depicted) of frangible collar 2706 may be retained within rotatable member 2520. As depicted, loading member 2524 may be in fourth position 3102. Further, rotatable member 2520 may have moved toward unloading system 3103 of loading device 2525. Unloading system 3103 may include vacuum plenum 3104. In some illustrative examples, vacuum plenum 3104 may be activated to remove nut portion (not depicted) of frangible collar 2706 from rotatable member 2520. After removing the nut portion, vacuum plenum 3104 may be used to discard the nut portion. In some illustrative examples, vacuum plenum 3104 may be rotated to another position to discard the nut portion. In this illustrative example, vacuum plenum 3104 may be activated until it is positioned for discarding the nut portion. Vacuum plenum 3104 may then be deactivated to release and discard the nut portion. In some illustrative examples, vacuum plenum 3104 may be associated with vacuum interface 3106 and tubing (not depicted). In these illustrative examples, the tubing may convey the nut portion (not depicted) away from vacuum plenum 3104 while vacuum plenum 3104 is activated.

Figure 32:
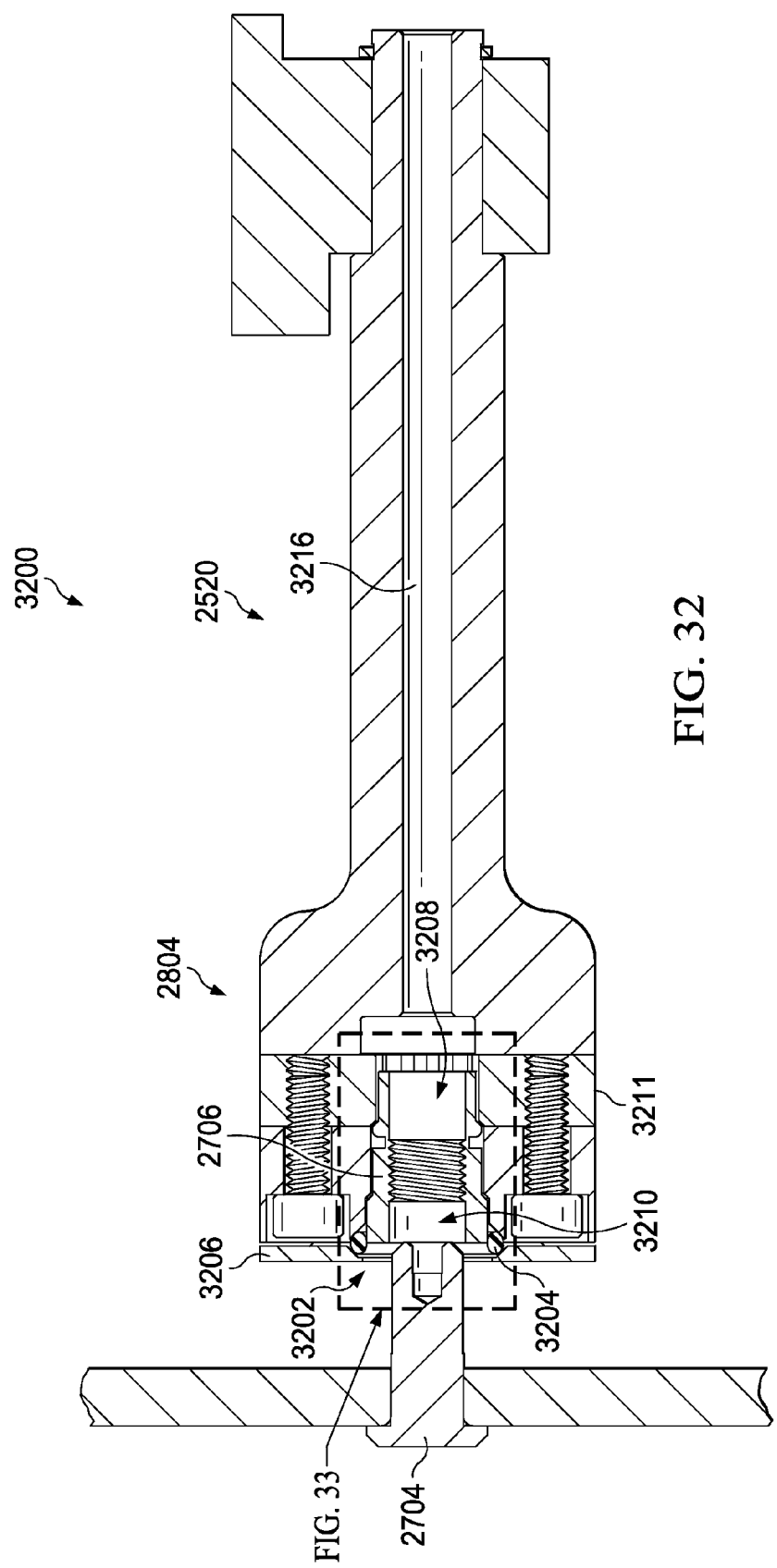
FIG. 32 is an illustration of a cross-sectional view of a collar installing socket and a fastener in accordance with an illustrative embodiment.

Turning now to FIG. 32, an illustration of a cross-sectional view of a collar installing socket and a fastener is depicted in accordance with an illustrative embodiment. View 3200 may be a cross-sectional view of rotatable member 2520 of FIGS. 25-31. View 3200 may be a view of rotatable member 2520 prior to installing frangible collar 2706 onto fastener 2704.

Rotatable member 2520 may include retaining member 3202. Retaining member 3202 may retain frangible collar 2706 within rotatable member 2520. Retaining member 3202 may take the form of o-ring 3204. O-ring 3204 may be positioned between rotatable member 2520 and retaining plate 3206. Frangible collar 2706 may include first portion 3208 and second portion 3210. First portion 3208 may also be called the nut portion of frangible collar 2706. Second portion 3210 may also be called the collar portion of frangible collar 2706. O-ring 3204 may retain frangible collar 2706 by contacting second portion 3210 of frangible collar 2706.

Rotatable member 2520 may include engaging member 3211. Engaging member 3211 may engage first portion 3208. Torque may be transferred from rotatable member 2520 to frangible collar 2706 through engaging member 3211.

While frangible collar 2706 is retained within rotatable member 2520, rotatable member 2520 may be moved towards object 2702. Rotatable member 2450 may be moved towards object 2702 by actuator 2606. Actuator 2606 may be a servo pneumatic actuator or any other desirable type of actuator.

An elongate member (not depicted) may extend through cavity 3216 of rotatable member 2520. The elongate member (not depicted) may engage fastener 2704 prior to rotatable member 2520 installing frangible collar 2706 onto fastener 2704.

Figure 33:
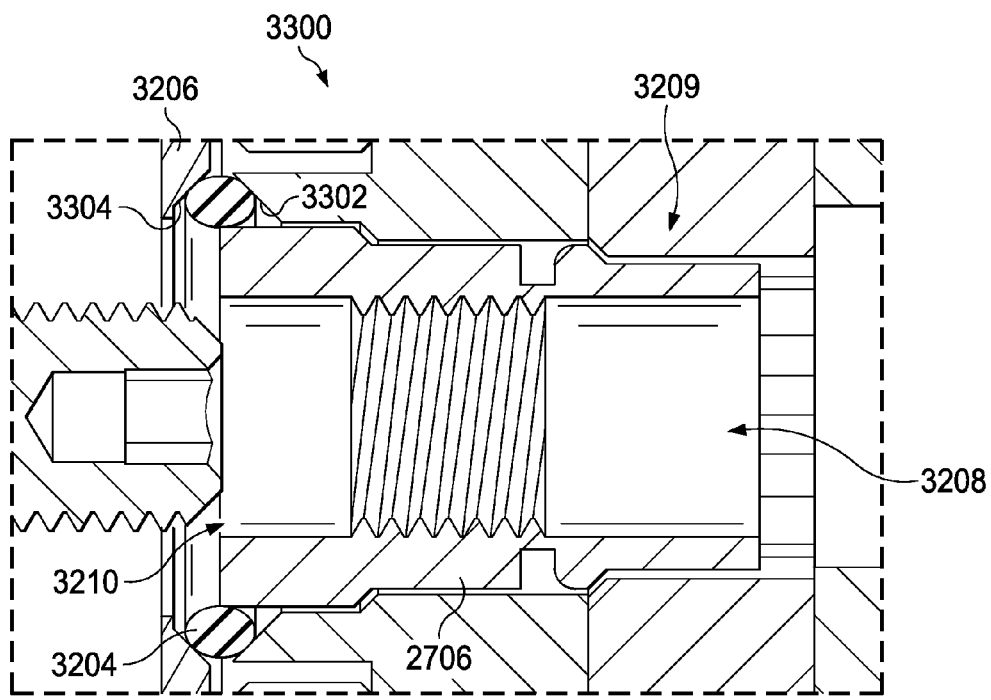
FIG. 33 is an illustration of a cross-sectional view of a collar installing socket and a fastener in accordance with an illustrative embodiment.

Turning now to FIG. 33, an illustration of a cross-sectional view of a collar installing socket and a fastener is depicted in accordance with an illustrative embodiment. View 3300 may be a view within box 33 of FIG. 32.

As depicted, o-ring 3204 may be positioned within bevel 3302 of rotatable member 2520 and bevel 3304 of retaining plate 3206. The diameter of o-ring 3204 may be adjusted by changing at least one of the shape of bevel 3302, the shape of bevel 3304, or the distance between retaining plate 3206 and rotatable member 2520.

Figure 34:
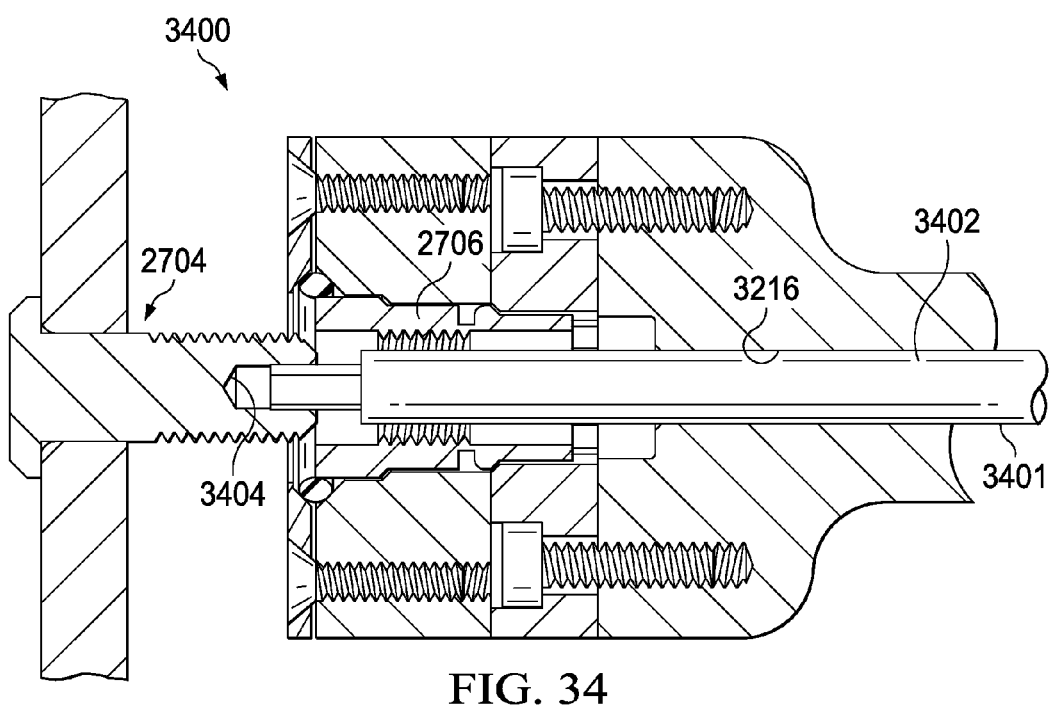
FIG. 34 is an illustration of a cross-sectional view of a collar installing a socket and a hex key engaging a fastener socket in accordance with an illustrative embodiment.

Turning now to FIG. 34, an illustration of a cross-sectional view of a collar installing a socket and a hex key engaging a fastener socket is depicted in accordance with an illustrative embodiment. In view 3400, elongate member 3401 extends through cavity 3216 of rotatable member 2520. Elongate member 3401 may engage fastener 2704 prior to rotatable member 2520 installing frangible collar 2706 onto fastener 2704.

In this illustrative example, elongate member 3401 takes the form of hex key 3402. As depicted, hex key 3402 engages socket 3404 of fastener 2704.

Figure 35:
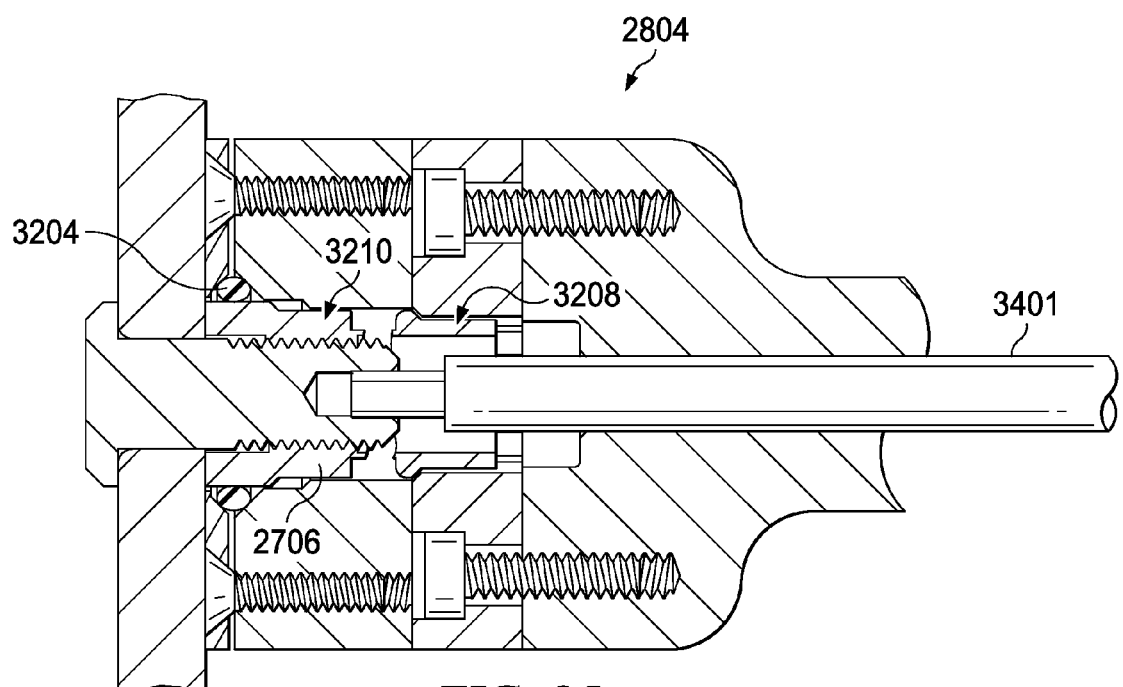
FIG. 35 is an illustration of a cross-sectional view of a collar installing a socket having a sheared nut portion and a fastener having an installed collar portion in accordance with an illustrative embodiment.

Turning now to FIG. 35, an illustration of a cross-sectional view of a collar installing a socket having a sheared nut portion and a fastener having an installed collar portion is depicted in accordance with an illustrative embodiment. Frangible collar 2706 may include first portion 3208 and second portion 3210. First portion 3208 may also be called the nut portion of frangible collar 2706. Second portion 3210 may also be called the collar portion of frangible collar 2706. O-ring 3204 may retain frangible collar 2706 by contacting second portion 3210 of frangible collar 2706.

Figure 36:
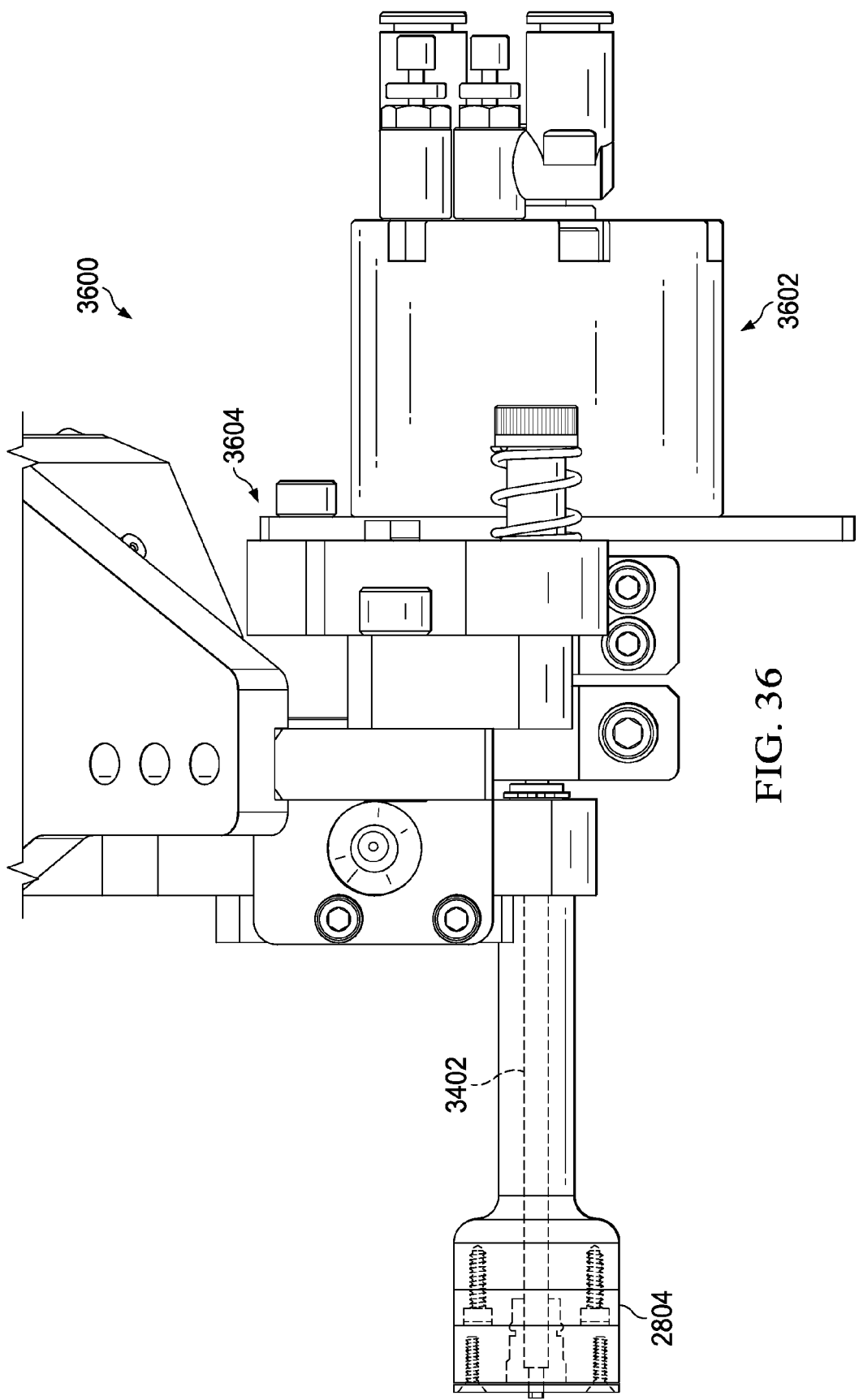
FIG. 36 is an illustration of a side view of a collar installing a socket and associated actuators in accordance with an illustrative embodiment.

Turning now to FIG. 36, an illustration of a side view of a collar installing a socket and associated actuators is depicted in accordance with an illustrative embodiment. Actuation system 3600 may be a physical implementation of at least part of actuation system 2457. As depicted, hex key 3402 and hex key rotary actuator system 3602 are attached to spring loaded mounting plate 3604. Spring loaded mounting plate 3604 may allow hex key 3402 to remain engaged with socket 3404 of fastener 2704. By remaining engaged with socket 3404 of fastener 2704, hex key 3402 may hold fastener 2704 from rotating while the frangible collar (not depicted) and socket 2804 advance. Hex key 3402 may retract relative to socket 2804. As a result, the retraction of hex key 3402 may allow socket 2804 to advance with the frangible collar (not depicted) as it threads onto fastener 2704.

Turning now to FIG. 37, an illustration of an end effector in the form of a block diagram is depicted in accordance with an illustrative embodiment. FIG. 37 may be one illustrative example of end effector 2402. As depicted, end effector 2402 may have the same components as depicted in FIG. 24. For example, end effector 2402 may have movement system 2432, element loader 2430, and element installer 2431. As depicted, platform 2429 of end effector 2402 may have c-shape 3700. C-shape 3700 may have first side 3702 and second side 3704. Movement system 2432, element loader 2430, and element installer 2431 may be associated with first side 3702 of end effector 2402. Fastener installer 3706 may be associated with second side 3704. Fastener installer 3706 may install fastener 2414. Fastener installer 3706 may maintain the position of first end 2471 of fastener 2414 vertically relative to object 2408 until frangible collar 2424 has been installed. Fastener installer 3706 may be separated from element installer 2431 by distance 3708. Thickness of object 2408 may be limited by distance 3708 so that object 2408 may be positioned between element installer 2431 of end effector 2402 and fastener installer 3706 of end effector 2402.

Fastener installer 3706 may be positioned relative to hole 2416 using vision system 3710 of fastener installer 3706. Vision system 3710 may detect emitted radiation from light 3712. Light 3712 may be associated with element installer 2431. In some examples, light 3712 and vision system 3710 may be positioned such that light 3712 shines through hole 2416 to locate hole 2416. In some other examples, light 3712 and vision system 3710 may be positioned such that light 3712 shines through a different hole in object 2408 to position fastener installer 3706.

Fastener installer 3706 may also include sealant application system 3714, fastener placer 3716, and fastener delivery system 3717. Sealant application system 3714 may apply sealant to at least one of object 2408, hole 2416, or fastener 2414 prior to inserting fastener 2414 into hole 2416.

Sealant application system 3714 may include sealant cartridge 3718 and sealant nozzle 3719. Sealant cartridge 3718 may store sealant prior to the sealant being dispensed onto at least one of object 2408, hole 2416, or fastener 2414 prior to inserting fastener 2414 into hole 2416. Sealant application system 3714 may be associated with actuation system 3720. Actuation system 3720 may include actuator 3722 and actuator 3724. Actuator 3722 may move sealant application system 3714 relative to object 2408. In some illustrative examples, actuator 3722 may move sealant application system 3714 relative to other components of fastener installer 3706. Actuator 3724 may provide pressure to at least one of sealant nozzle 3719 or sealant cartridge 3718 until a desirable amount of sealant has been dispensed.

Number of fasteners 3726 may be delivered to fastener installer 3706 through fastener delivery system 3717. Fastener delivery system 3717 may include tubing 3728. Tubing 3728 may be connected to equipment outside of end effector 2402. In some illustrative examples, the equipment may take the form of a vibratory bowl and escapement outside of end effector 2402. A fastener in number of fasteners 3726 may be vibrated in the vibratory bowl until the fastener is facing a desired direction. The fastener may then travel through tubing 3728 under pneumatic pressure to fastener placer 3716. In some illustrative examples, number of fasteners 3726 may be number of hi lok fasteners 3730.

After a fastener is received via fastener delivery system 3717, fastener placer 3716 may place the fastener into a hole in object 2408. For example, fastener placer 3716 may place fastener 2414 into hole 2416. In some illustrative examples, fastener placer 3716 may be called a member placer. In some illustrative examples, the member placer may be configured to associate a member, such as fastener 2414, with object 2408.

Fastener placer 3716 may include placer head 3732 and placer ram 3734. Actuation system 3736 may be associated with fastener placer 3716. Actuation system 3736 may include actuator 3738 and actuator 3740. Actuator 3738 may move placer head 3732 towards hole 2416 in object 2408. By moving fastener 2414 towards hole 2416, placer head 3732 may begin to insert fastener 2414 into hole 2416.

Actuator 3740 may move placer ram 3734 towards object 2408. Placer ram 3734 may push fastener 2414 clear of placer head 3732. Placer ram 3734 may push fastener 2414 fully into hole 2416. Placer ram 3734 may remain extended to hold fastener 2414 within hole 2416. Placer ram 3734 may remain extended while element installer 2431 installs element 2418 onto fastener 2414.

Fastener placer 3716 may be positioned at distance 3742 from platform 2429. Distance 3742 may limit the inward distance of hole 2416 from edge of object 2408.

In the illustrative examples in which end effector 2402 does not include fastener installer 3706, for example, as depicted in FIG. 24, the inward distance of hole 2416 from an edge of object 2408 may not be limited. For example, if a tool or robot separate from end effector 2402 installs and holds fastener 2414 within hole 2416 during installation of element 2418, position of hole 2416 within object 2408 may not be limited by the shape of platform 2429.

Figure 38:
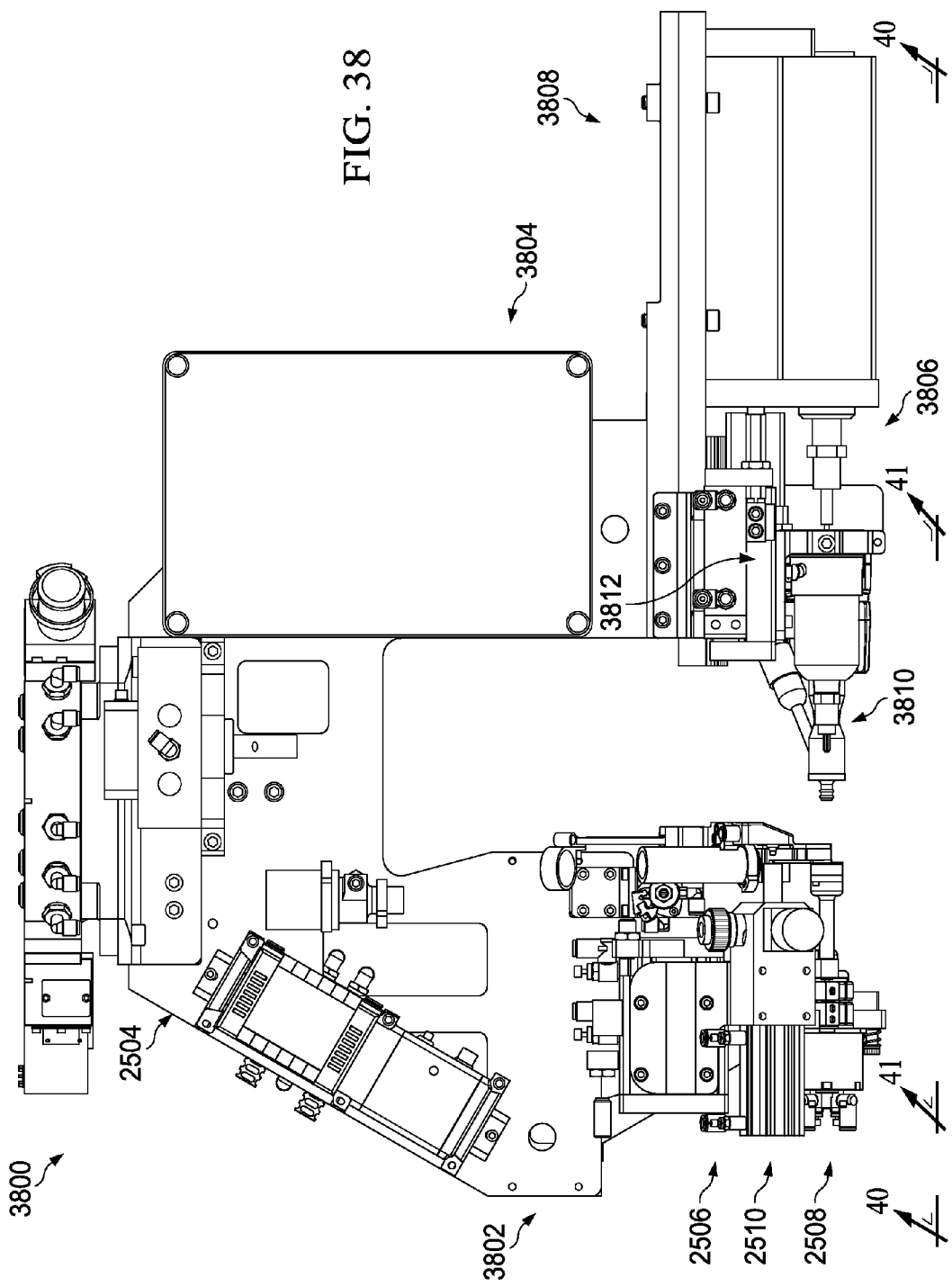
FIG. 38 is an illustration of a side view of an end effector in accordance with an illustrative embodiment.

Turning now to FIG. 38, an illustration of a side view of an end effector is depicted in accordance with an illustrative embodiment. End effector 3800 may be a physical implementation of end effector 2402 of FIG. 37. End effector 3800 may be used in manufacturing environment 100 of FIG. 1.

End effector 3800 may be used to install frangible collar 2424 to hi lok fastener 2470 within hole 2416 having clearance fit 2417 of FIG. 24. End effector 3800 may also be used to install hi lok fastener 2470 within hole 2416 and hold hi lok fastener 2470 within hole 2416 while frangible collar 2424 is installed onto hi lok fastener 2470. End effector 3800 may be connected to robotic device 104 of FIG. 1 via robotic interface feature 2502.

End effector 3800 has platform 2504. Platform 2504 has first side 3802 and second side 3804. First side 3802 of platform 2504 is associated with element loader 2506, element installer 2508, and movement system 2510. Second side 3804 of platform 2504 is associated with sealant application system 3806 and fastener placer 3808. Sealant application system 3806 may include sealant nozzle 3810 and actuator 3812.

Figure 39:
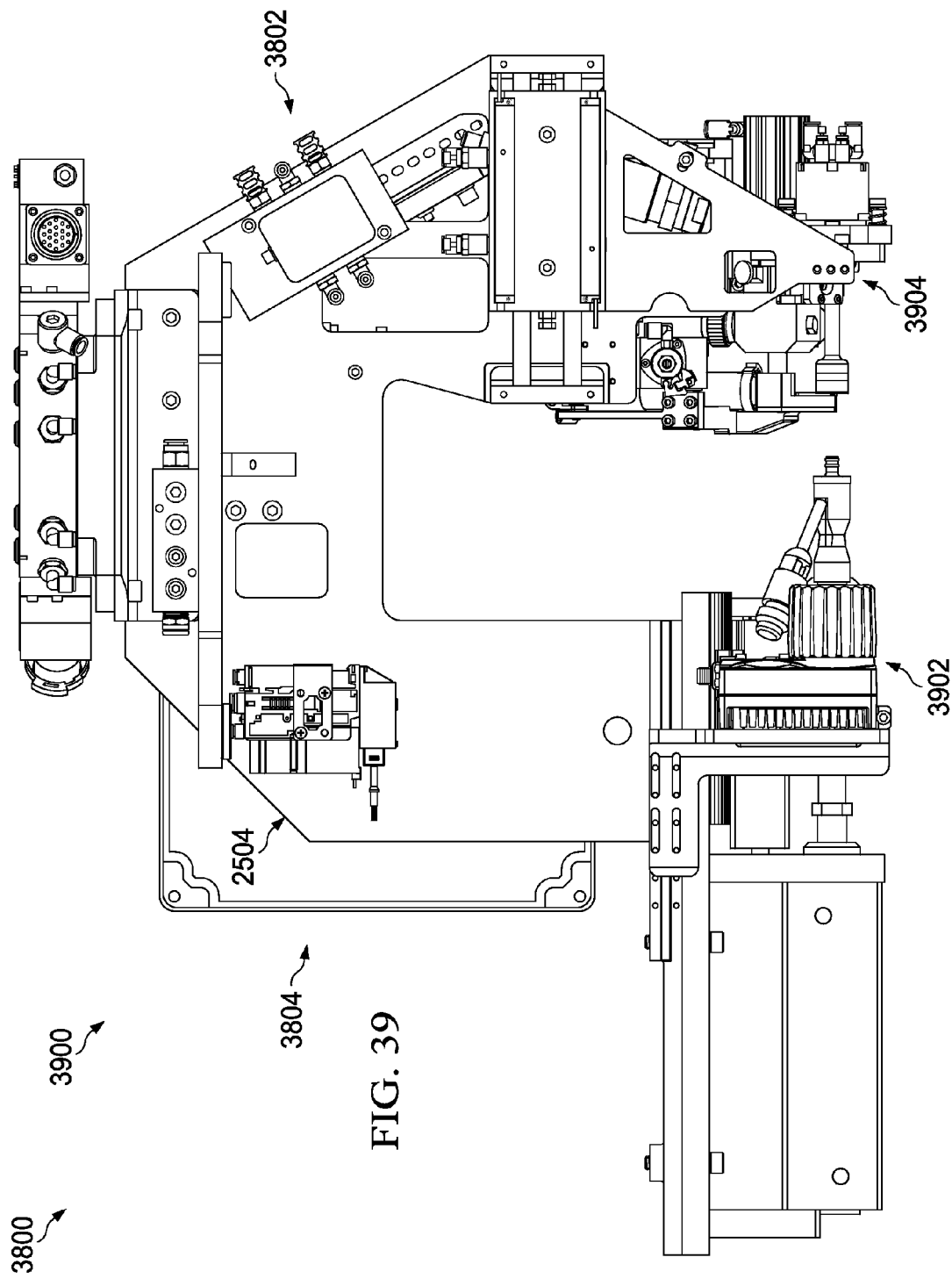
FIG. 39 is an illustration of a side view of an end effector in accordance with an illustrative embodiment.

Turning now to FIG. 39, an illustration of a side view of an end effector is depicted in accordance with an illustrative embodiment. View 3900 may be a view of the opposite side of end effector 3800 of FIG. 38. As depicted, vision system 3902 may be associated with second side 3804 of platform 2504. Light 3904 may be associated with first side 3802 of platform 2504. Light 3904 and vision system 3902 may be used to locate portions of end effector 3800 relative to an object. For example, light 3904 and vision system 3902 may be used to locate fastener placer 3808 with a hole in an object (not depicted).

Figure 40:
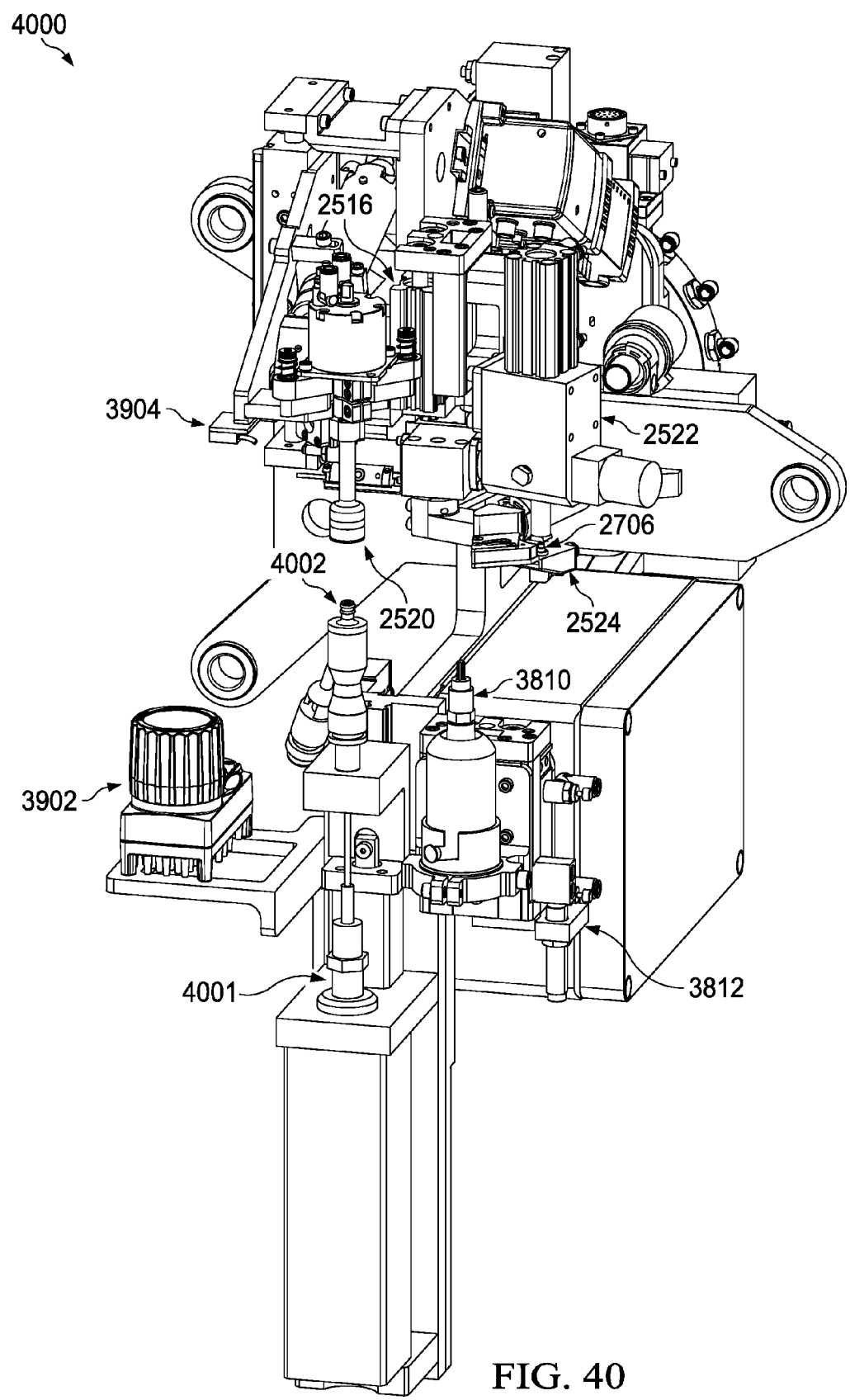
FIG. 40 is an illustration of an isometric view of an end effector in accordance with an illustrative embodiment.

Turning now to FIG. 40, an illustration of an isometric view of an end effector is depicted in accordance with an illustrative embodiment. View 4000 is a view of end effector 3800 from the direction of lines 40-40 of FIG. 38. Fastener placer 3808 may include placer ram 4001 and placer head 4002. Placer head 4002 may grip a fastener and insert the fastener into an opening. Placer ram 4001 may be extended to push the fastener completely into the opening and hold the fastener while an element is installed over the fastener.

Figure 41:
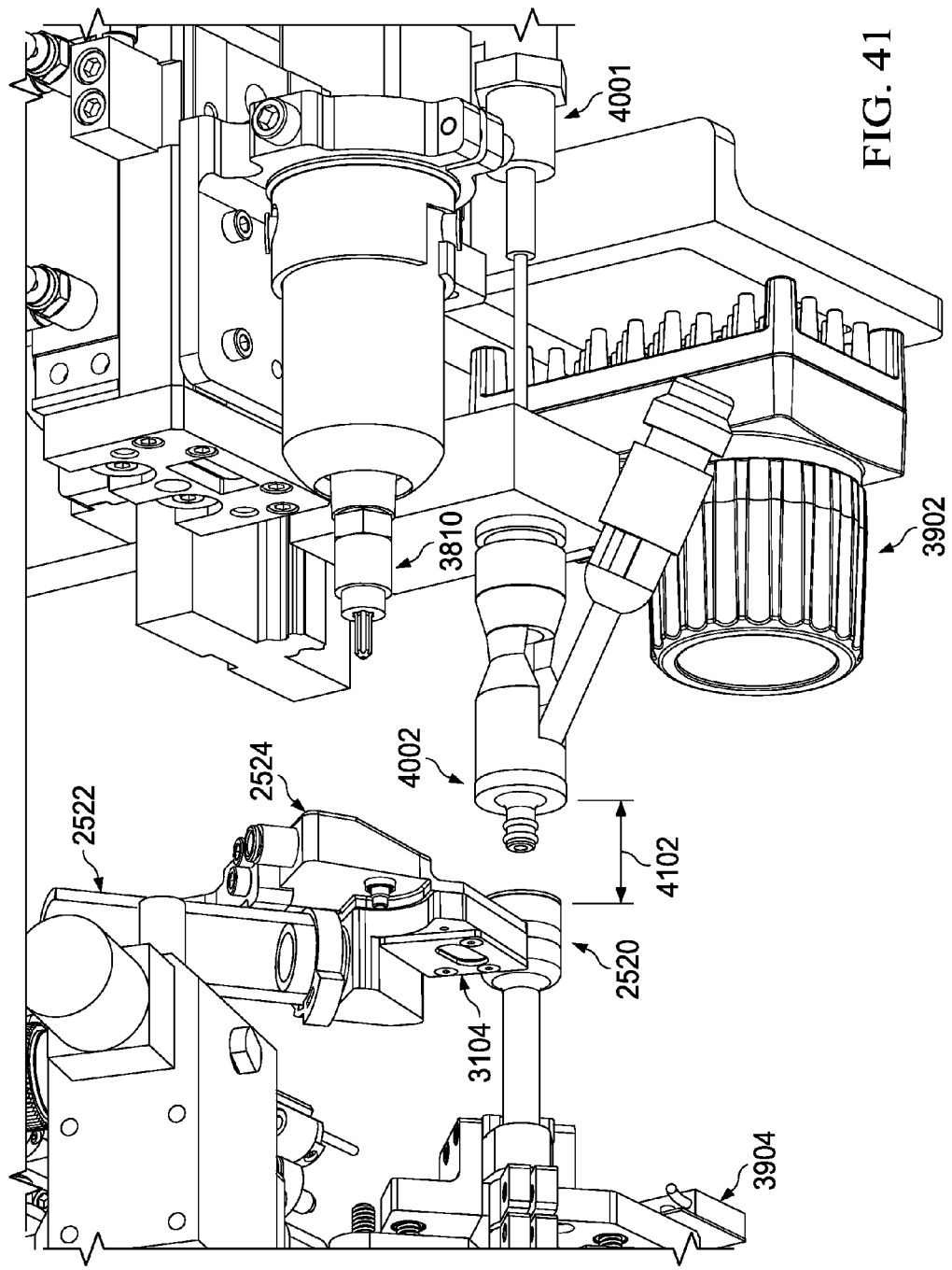
FIG. 41 is an illustration of an isometric view of an end effector in accordance with an illustrative embodiment.

Turning now to FIG. 41, an illustration of an isometric view of an end effector is depicted in accordance with an illustrative embodiment. View 4100 may be a view of end effector 3800 from the direction of lines 41-41 of FIG. 38.

Distance 4102 between placer head 4002 and rotatable member 2520 may be changed during insertion of a fastener or installation of a frangible collar. For example, at least one of placer head 4002 or rotatable member 2520 may be moved towards or away from an object (not depicted) between placer head 4002 and rotatable member 2520 to work on the object.

Figure 42:
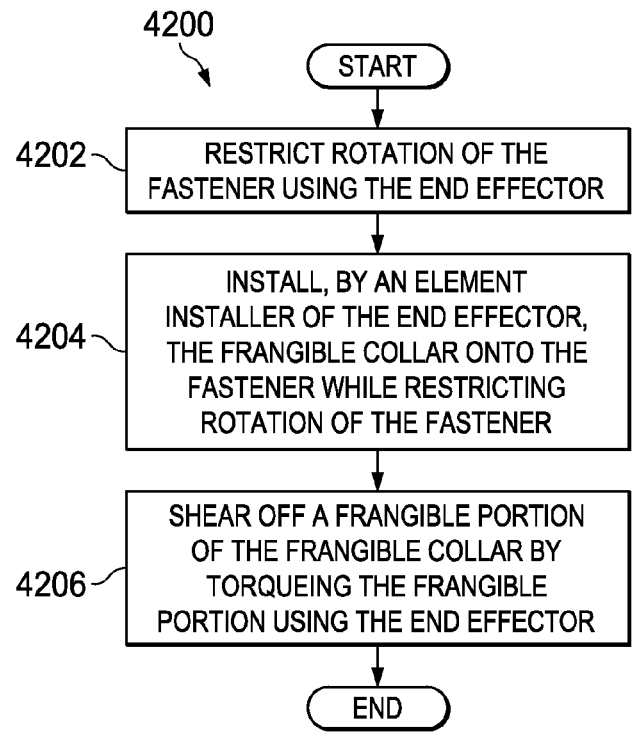
FIG. 42 is an illustration of a flowchart of a process for installing a frangible collar onto a fastener installed in a hole using an end effector in which rotation of the fastener is not restricted by the hole in accordance with an illustrative embodiment.

Turning now to FIG. 42, an illustration of a flowchart of a process for installing a frangible collar onto a fastener installed in a hole using an end effector in which rotation of the fastener is not restricted by the hole, is depicted in accordance with an illustrative embodiment. Process 4200 may be implemented in manufacturing environment 100 in FIG. 1 using at least one of end effector 102, or end effector 2402 of FIG. 24 or FIG. 37. In some illustrative examples, process 4200 may install frangible element 2419 onto fastener 2414 of FIG. 24.

Process 4200 may restrict rotation of the fastener using an end effector (operation 4202). In some illustrative examples, the end effector may restrict rotation of the fastener using a hex key. The hex key may extend through at least a portion of a cavity of a rotatable member. In some illustrative examples, an actuation system may be associated with the hex key. In some illustrative examples, the actuation system comprises a first actuator to move the hex key along a first axis and a second actuator to rotate the hex key. By rotating the hex key, the hex key may be aligned with the socket of the fastener. By moving the hex key along the first axis, the hex key may be inserted into the socket of the fastener when the hex key is aligned with the socket.

Process 4200 may also install, by an element installer of the end effector, a frangible collar onto the fastener while restricting rotation of the fastener (operation 4204). In some illustrative examples, the rotatable member having the cavity may install the frangible collar onto the fastener. Process 4200 may further shear off a frangible portion of the frangible collar by torqueing the frangible portion using the end effector (operation 4206) with the process terminating thereafter. In some illustrative examples, the frangible portion of the frangible collar may be torqued by rotating the rotatable member. The frangible portion may also be referred to as a nut portion in some illustrative examples.

Figure 43:
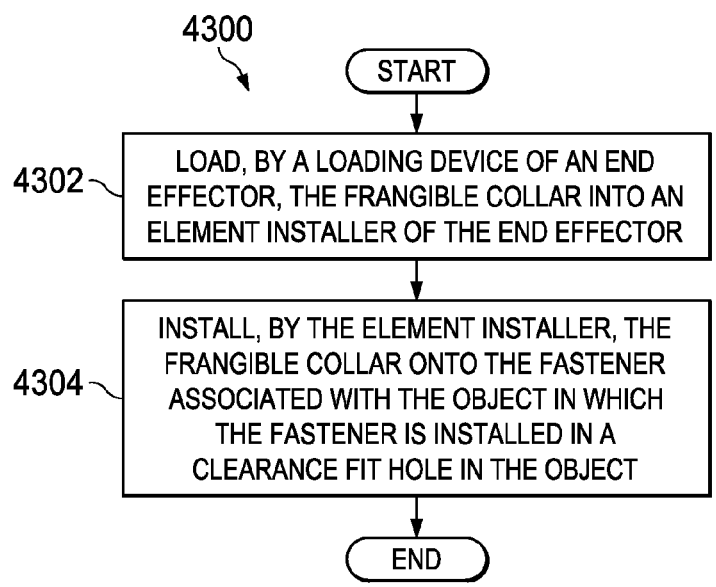
FIG. 43 is an illustration of a flowchart of a process for installing a frangible collar over a fastener associated with an object in accordance with an illustrative embodiment.

Turning now to FIG. 43, an illustration of a flowchart of a process for installing a frangible collar over a fastener associated with an object is depicted in accordance with an illustrative embodiment. Process 4300 may be implemented in manufacturing environment 100 in FIG. 1 using at least one of end effector 102, or end effector 2402 of FIG. 24 or FIG. 37. In some illustrative examples, process 4300 may install frangible element 2419 onto fastener 2414 of FIG. 24.

Process 4300 may load, by a loading device of an end effector, the frangible collar into an element installer of the end effector (operation 4302). In some illustrative examples, loading the frangible collar into the element installer comprises rotating the loading device towards the element installer. In some illustrative examples, loading the frangible collar into the element installer further comprises moving a rotatable member of the element installer towards the loading device. In some illustrative examples, the element loader includes an element placer and a loading device. The element placer may be configured to receive the number of elements from an element delivery system and hold the number of elements. The loading device may be configured to retrieve the element from the element placer and load the element onto the element installer.

Process 4300 may install, by the element installer, the frangible collar onto the fastener associated with the object in which the fastener is installed in a clearance fit hole in the object (operation 4304) with the process terminating thereafter. In some illustrative examples, installing the frangible collar comprises moving a rotatable member of the element installer towards the fastener. In some illustrative examples, installing the frangible collar may also include rotating the rotatable member as the rotatable member moves towards the fastener.

In some illustrative examples, the element installer has a mode of operation in which the element installer applies a torque to the frangible collar to install the frangible collar onto the member. In some illustrative examples, the element installer comprises a rotatable member, a retaining member, an elongate member, and an actuation system. The rotatable member may be configured to rotate the frangible collar when the frangible collar is placed over the fastener to apply the torque to the frangible collar. The retaining member may be configured to retain the frangible collar within the element installer.

In some illustrative examples, the retaining member is an o-ring. The elongate member may have a shape that holds the fastener stationary during installation of the frangible collar. The actuation system may move the elongate member during installation of the frangible collar. In some illustrative examples, the fastener has a socket and the elongate member has a tip having a shape configured to fit within the socket.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 4200 may further remove the frangible portion. In some illustrative examples, removing the frangible portion includes pulling frangible nut portion from a rotatable member of the end effector using a vacuum. In some illustrative examples, the frangible portion may be removed by an unloading system configured to remove the frangible portion of the frangible collar from the rotatable member following the frangible portion breaking off from the collar portion.

As another example, process 4200 may further receive the frangible collar from a delivery system. Process 4200 may also transfer the frangible collar from an element placer of the end effector associated with the delivery system to a loading device of the end effector. In some illustrative examples, process 4200 may also move the loading device holding the frangible collar to a position relative to an element installer of the end effector. Process 4200 may also transfer the frangible collar from the loading device to the element installer. In some illustrative examples, installing a frangible collar onto the fastener while the hex key is inserted in the socket of the fastener comprises moving a rotatable member of the element installer towards the fastener and rotating the rotatable member of the element installer.

In some illustrative examples, process 4200 may also install the fastener into the hole using the end effector. In some illustrative examples, process 4200 further comprises applying sealant to at least one of the fastener, the hole, or an area associated with the hole with the end effector prior to installing the fastener into the hole with the end effector.

In some illustrative examples, process 4300 further comprises installing, by a fastener installer of the end effector, the fastener into a hole in the object, wherein rotation of the fastener is not restricted by the hole. In some illustrative examples, process 4300 may also apply, by a sealant application system of the end effector, sealant to at least one of the fastener or the object prior to installing the fastener into the hole in the object.

The present disclosure provides for automated installation of frangible elements. The disclosed methods and apparatuses may allow flat head hi lok fasteners to be installed with automation in aerodynamic critical locations. These locations may use a hi lok fastener with a hex socket in the fastener shank instead of in the flat head for better air flow over the surface of the head.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for installing a frangible collar onto a fastener installed in a hole such that rotation of the fastener remains unrestricted by the hole, the method comprising:
    receiving, onto an arm of a loading member of a loading device, the frangible collar from an element placer, such that the loading device comprises the loading member connected to an unloading system comprising a vacuum plenum, such that rotating the loading member rotates the unloading system comprising the vacuum plenum;
    rotating, from the element placer to an element installer, the loading member;
    receiving, into the element installer from the loading member, the frangible collar;
    rotating the loading member from the element installer back to the element placer;
    installing, using the element installer, the frangible collar onto the fastener while restricting, using the element installer, rotation of the fastener;
    shearing off a frangible portion of the frangible collar by torqueing, using the element installer, the frangible portion;
    rotating the vacuum plenum and connected loading member from the element placer to the element installer; and
    removing the frangible portion from the element installer via covering an end of the element installer with the vacuum plenum.

2. The method of claim 1 further comprising:
    rotating, via a rotary actuator and independent of rotating a rotatable member of the element installer, an elongate member, terminating in a hex key, of the element installer until aligning the hex key with a socket in the fastener;
    inserting the hex key into the socket; and
    restricting rotation of the fastener via the rotary actuator holding stationary the hex key.

3. The method of claim 1, further comprising retaining the frangible collar within the element installer via a vacuum pressure within an engaging member of the element installer.

4. The method of claim 1 further comprising:
    placing the frangible collar on a vacuum chuck on the loading member with the loading member in a first position aligning the loading member with the element placer located on a first side of a platform that comprises a C-shape;
    moving the loading member to a second position, between the element installer and the fastener, aligning the vacuum chuck on the loading member with a rotatable member;
    reversing a vacuum connected to the vacuum chuck on the loading member and thereby blasting air from the vacuum chuck and thus seating the frangible collar into a socket of the rotatable member of the element installer located on the first side;
    moving the loading member to a third position, allowing moving the element installer toward the fastener;
    moving the loading member to a fourth position allowing removing the frangible portion from the element installer via contacting the element installer to the unloading system and vacuuming the frangible portion into an opening in the unloading system.

5. The method of claim 4, wherein removing the frangible portion includes pulling the frangible portion from the rotatable member of the element installer using a vacuum connected to the unloading system.

6. The method of claim 1 further comprising:
    receiving the frangible collar from an element delivery system associated with the element placer.

7. The method of claim 4, wherein seating the frangible collar comprises:
    moving the rotatable member of the element installer towards the fastener; and
    rotating the rotatable member of the element installer.

8. The method of claim 1 further comprising:
    installing the fastener into the hole using an end effector that comprises the loading device and the element installer.

9. The method of claim 8 further comprising:
    applying sealant to at least one of the fastener, the hole, or an area associated with the hole with the end effector prior to installing the fastener into the hole with the end effector.

10. A method for installing a frangible collar over a fastener associated with an object, the method comprising:

rotating a loading device, of an end effector, to four positions to and from an element delivery system and an element installer, such that the end effector comprises an element loader that comprises: the element delivery system, an element placer, a loading member connected to an unloading system that comprises a vacuum plenum, such that rotating the loading device rotates the unloading system;

receiving, onto the loading member with the loading device in a first position, the frangible collar from the element delivery system;

loading, using the loading device in a second position, the frangible collar into a rotatable member in the element installer of the end effector;

installing, by the element installer via rotating the loading device away from the element installer to a third position, and rotating the frangible collar inside the rotatable member onto the fastener installed in a clearance fit hole in the object;

retaining a frangible portion of the frangible collar in the rotatable member while retracting the element installer from the fastener; and removing the frangible portion from the rotatable member via rotating the unloading system to a fourth position abutting an end of the rotatable member.

11. The method of claim 10, wherein installing the frangible collar comprises:

rotating, via a rotary actuator and independent of rotating a rotatable member on the end effector, an elongate member, of the end effector until aligning the elongate member with a socket in the fastener; and inserting the elongate member into the socket;

restricting rotation of the fastener via holding stationary the rotary actuator and the elongate member;

moving the rotatable member of the element installer towards the fastener; and rotating the rotatable member as the rotatable member moves towards the fastener.

12. The method of claim 10, wherein loading the frangible collar into the element installer comprises:

adjusting a diameter of a retaining member, located between an end of a rotatable member of the element installer and a retaining plate, via changing a distance between the end of the rotatable member and the retaining plate, the element installer and the retaining plate both being located on a first side of a platform that comprises a C-shape; and rotating the loading device towards the element installer and reversing a vacuum connected to a vacuum chuck on the loading member, located on the first side of the platform, of the end effector and blasting air from the vacuum chuck and thus seating the frangible collar into a socket of the rotatable member of the element installer located on the first side.

13. The method of claim 12, wherein loading the frangible collar into the element installer further comprises:

moving the rotatable member of the element installer towards the loading device.

14. The method of claim 10 further comprising:

installing, by a fastener installer of the end effector, the fastener into a hole in the object, wherein rotation of the fastener is not restricted by the hole.

15. The method of claim 12 further comprising:

applying, by a sealant application system, located on a second side of the platform of the end effector, sealant to at least one of the fastener or the object prior to installing the fastener into the clearance fit hole in the object; and rotating the loading device to a fourth position allowing contacting the element installer to the unloading system and vacuuming a frangible portion of the frangible collar into an opening in the unloading system via applying a vacuum, to the element installer, through the opening in the unloading system.

16. An apparatus that comprises:

an end effector that comprises an element loader that comprises a loading device that comprises: an element delivery system, an element placer, a loading member connected to an unloading system that comprises a vacuum plenum, the loading member configured to rotate to and from the element delivery system and an element installer, to four positions, such that the vacuum plenum and the unloading system rotate with the loading member, the element loader configured to:

hold a number of elements; and place, with the element loader in a first position that abuts the element placer, an element of the number of elements onto the loading member;

rotate to a second position t to the element installer;

rotate back to a third position retracted from the element installer;

the element installer configured to install, with the element loader in the third position, the element onto a member associated with an object; and the unloading system configured to rotate to a fourth position such that the vacuum plenum abuts the element installer;

the vacuum plenum configured to remove a frangible portion of the element from within the element installer.

17. The apparatus of claim 16, further comprising:

the element loader located on a first side of a platform that comprises a C-shape;

a vacuum chuck on the loading member on the first side of the platform, the vacuum chuck configured to fit, with the element loaded onto the vacuum chuck and the element loader in a second position, the element into an engaging member of a rotatable member of the element installer; and the element installer configured to comprise a mode of operation that comprises the element installer configured to apply a torque to the element to install the element onto the member.

18. The apparatus of claim 17, wherein the element is a frangible element that comprises:

a first portion; and a second portion, wherein the first portion breaks off from the second portion when the torque being applied to the frangible element reaches a selected threshold during installation of the frangible element.

19. The apparatus of claim 18 further comprising:

the unloading system configured to remove the first portion of the frangible element from the element installer following the first portion breaking off from the second portion, with the element loader in a fourth position that comprises the rotatable member contacting the unloading system, from an opening in the rotatable member and into an opening, configured to provide a vacuum pressure onto the first portion, in the unloading system.

20. The apparatus of claim 18, wherein the element installer comprises:

the rotatable member configured to rotate the frangible element when the frangible element is placed over the member to apply the torque to the frangible element.

21. The apparatus of claim 18, wherein the element installer comprises:
a retaining member, located between an end of the rotatable member of the element installer and a retaining plate, that comprises a diameter configured to change via a change in a distance between the end of the rotatable member and the retaining plate, the element installer and the retaining plate both being located on the first side of the platform, the retaining member configured to retain the frangible element within the element installer, wherein the retaining member.

22. The apparatus of claim 16, wherein the element installer comprises:
an elongate member that comprises a shape that holds the member stationary during an installation of the element via a rotary actuator configured to rotate, independent of a rotatable member of the element installer, and align the shape with the member, and hold stationary the elongate member as the rotatable member rotates; and
an actuation system configured to move the elongate member linearly during the installation of the element.

23. The apparatus of claim 22, wherein the member comprises a socket and the elongate member comprises a tip that comprises the shape configured to fit within the socket.

24. The apparatus of claim 16, wherein the element loader comprises:
the element placer configured to receive the number of elements from the element delivery system and hold the number of elements; and
the loading device configured to retrieve the element from the element placer and load the element onto the element installer.

25. The apparatus of claim 16 further comprising:
an actuation system configured to move the element installer towards and away from the element loader.

26. The apparatus of claim 16 further comprising:
a sealant application system configured to apply sealant onto at least one of the object or the member; and
a member placer configured to associate the member with the object.

27. The apparatus of claim 26, wherein the element loader and element installer are associated with a first side of a platform of the end effector, and wherein the sealant application system and the member placer are associated with a second side of the platform.

28. An end effector that comprises:
an element loader that comprises a loading device that comprises: an element delivery system, an element placer, a loading member connected to an unloading system that comprises a vacuum plenum, the loading member configured to rotate to and from the element delivery system and an element installer, to four positions, such that the vacuum plenum and the unloading system rotate with the loading member;
the element installer comprising a rotatable member configured to move: axially relative to a fastener, and to rotate about an axis of the fastener, the rotatable member configured to: encompass an element to install on the fastener, and to release, subject to the vacuum plenum being in a fourth position that abuts the rotatable member, a frangible portion of the element into the vacuum plenum.

29. The end effector of claim 28, wherein:
the element installer further comprises a retaining member, the retaining member comprising an O-ring.

30. The end effector of claim 28, wherein the element installer further comprises an actuation system configured to move the rotatable member along the axis of the fastener; and
a rotary actuator configured:
to rotate, independent of rotation of the rotatable member, an elongate member of the element installer; and
responsive to an engagement of the elongate member with the fastener, hold stationary the elongate member and thus hold stationary the fastener.

31. The end effector of claim 28, wherein the loading device comprises:
the loading member configured to engage with the element placer and the element installer; and
the unloading system configured comprising a mode of operation to unload a first portion of the element from the element installer, following the first portion breaking off a second portion of the element, with the unloading system in a position that contacts the element installer.

32. The end effector of claim 28 further comprising:
a sealant application system; and
a fastener placer.

33. The end effector of claim 32, wherein the element loader and element installer are associated with a first side of a platform of the end effector, and wherein the sealant application system and the fastener placer are associated with a second side of the platform.

34. An end effector that comprises:
an element loader that comprises a loading device that comprises: an element delivery system, an element placer, a loading member connected to an unloading system that comprises a vacuum plenum, the loading member configured to rotate to and from the element delivery system and an element installer, to four positions, such that the vacuum plenum and the unloading system rotate with the loading member;
a rotatable member, of the element installer, that comprises a cavity configured to release a frangible portion of an element into the vacuum plenum in a fourth position that abuts the rotatable member;
a hex key extending through at least a portion of the cavity; and
an actuation system associated with the hex key.

35. The end effector of claim 34 further comprising:
a placing member associated with the element delivery system; and
the loading device configured as being rotatable relative to the rotatable member and the placing member, the loading device having the loading member configured to engage with the placing member and the rotatable member.

36. The end effector of claim 34, further comprising:
the actuation system comprising a first actuator configured to move the hex key along a first axis and a second actuator configured to rotate the hex key; and
a retaining member fixed between an end of the rotatable member of the element installer and a retaining plate, such that the retaining member comprises a diameter configured to change via a change in a distance between the end of the rotatable member and a retaining plate, the element installer and the retaining plate both being located on a first side of a platform that comprises a C-shape.

37. The end effector of claim 34, wherein the rotatable member, the hex key, and the actuation system are associated with a first side of a platform of the end effector, and the end effector further comprising:
- a sealant application system; and
- a fastener placer, wherein the sealant application system and the fastener placer are associated with a second side of the platform.

* * * * *